(12) United States Patent
Isogawa et al.

(10) Patent No.: US 9,248,347 B2
(45) Date of Patent: Feb. 2, 2016

(54) GOLF BALL

(71) Applicant: DUNLOP SPORTS CO. LTD., Kobe-shi, Hyogo (JP)

(72) Inventors: Kazuhiko Isogawa, Kobe (JP); Kosuke Tachibana, Kobe (JP); Takahiro Sajima, Kobe (JP); Toshiyuki Tarao, Kobe (JP)

(73) Assignee: DUNLOP SPORTS CO. LTD., Kobe-shi (JP)

( * ) Notice: Subject to any disclaimer, the term of this patent is extended or adjusted under 35 U.S.C. 154(b) by 215 days.

(21) Appl. No.: 13/906,476

(22) Filed: May 31, 2013

(65) Prior Publication Data
US 2013/0324318 A1 Dec. 5, 2013

(30) Foreign Application Priority Data
Jun. 1, 2012 (JP) .................................. 2012-126602

(51) Int. Cl.
*A63B 37/14* (2006.01)
*A63B 37/00* (2006.01)
(Continued)

(52) U.S. Cl.
CPC .......... *A63B 37/0076* (2013.01); *A63B 37/0003* (2013.01); *A63B 37/0004* (2013.01); *A63B 37/0006* (2013.01); *A63B 37/0018* (2013.01); *A63B 37/0021* (2013.01); *A63B 37/0033* (2013.01); *A63B 37/0038* (2013.01); *A63B 37/0039* (2013.01); *A63B 37/0044* (2013.01); *A63B 37/0045* (2013.01);
(Continued)

(58) Field of Classification Search
CPC ........... A63B 37/0022; A63B 37/0075; A63B 37/0003; A63B 37/0044; A63B 37/00063; A63B 37/0004; A63B 37/0008; A63B 37/0021; C08K 5/21; C08K 5/29; C08K 5/34; C08K 5/2432
See application file for complete search history.

(56) References Cited

U.S. PATENT DOCUMENTS 5,403,010 A 4/1995 Yabuki et al.
6,659,888 B2 * 12/2003 Endo et al. .................... 473/371
(Continued)

FOREIGN PATENT DOCUMENTS

CN 1978006 A 6/2007
JP 61-37178 A 2/1986
(Continued)

OTHER PUBLICATIONS

Extended European Search Report, issued Aug. 5, 2014, for European Application No. 13169602.3.

*Primary Examiner* — John E Simms, Jr.
(74) *Attorney, Agent, or Firm* — Birch Stewart Kolasch & Birch, LLP

(57) ABSTRACT

The present invention provides a golf ball comprising a golf ball body with a spherical core having one or more layers, an intermediate layer disposed outside the spherical core and a cover disposed outside the intermediate layer and a paint film formed on a surface of the golf ball body, and having a friction coefficient calculated using a contact force tester of 0.35 or more and 0.60 or less, wherein the golf ball body has specific plurality of dimples on the surface thereof, at least one layer of the spherical core is a rubber layer having a specific hardness distribution, and the rubber layer has a hardness at the outermost point which is greater than a hardness at the innermost point, and the intermediate layer has a slab hardness (Hm) which is greater than a slab hardness (Hc) of the cover.

25 Claims, 51 Drawing Sheets

(51) Int. Cl.
　　　*C09D 175/04*　　(2006.01)
　　　*C08K 5/09*　　(2006.01)
　　　*C08K 5/098*　　(2006.01)

(52) U.S. Cl.
　　　CPC ........ *A63B 37/0062* (2013.01); *A63B 37/0063* (2013.01); *A63B 37/0075* (2013.01); *A63B 37/0077* (2013.01); *A63B 37/0092* (2013.01); *C08K 5/09* (2013.01); *C08K 5/098* (2013.01); *C09D 175/04* (2013.01)

(56) References Cited

U.S. PATENT DOCUMENTS

| | | |
|---|---|---|
| 2005/0101412 A1 | 5/2005 | Sajima et al. |
| 2006/0135287 A1 | 6/2006 | Kennedy et al. |
| 2006/0252579 A1* | 11/2006 | Umezawa et al. ............ 473/371 |
| 2007/0129174 A1 | 6/2007 | Higuchi |
| 2007/0173607 A1 | 7/2007 | Kennedy et al. |
| 2007/0202965 A1* | 8/2007 | Shindo et al. ................. 473/351 |
| 2007/0265113 A1 | 11/2007 | Hirau et al. |
| 2008/0194357 A1 | 8/2008 | Higuchi |
| 2008/0194359 A1 | 8/2008 | Higuchi et al. |
| 2008/0214324 A1 | 9/2008 | Nanba et al. |
| 2009/0124757 A1 | 5/2009 | Shindo et al. |
| 2009/0170636 A1 | 7/2009 | Kamino et al. |
| 2009/0247328 A1* | 10/2009 | Kamino et al. ............... 473/383 |
| 2010/0052219 A1* | 3/2010 | Sajima ......................... 264/299 |
| 2010/0273575 A1 | 10/2010 | Watanabe |
| 2011/0053708 A1* | 3/2011 | Isoagawa et al. ............. 473/376 |
| 2011/0224020 A1* | 9/2011 | Tachibana et al. ............ 473/373 |
| 2012/0088604 A1* | 4/2012 | Matsuyama et al. .......... 473/376 |

FOREIGN PATENT DOCUMENTS

| | | |
|---|---|---|
| JP | 61-113475 A | 5/1986 |
| JP | 6 -253079 A | 11/1986 |
| JP | 6-154357 A | 6/1994 |
| JP | 2008-523952 A | 7/2008 |
| JP | 2008-194471 A | 8/2008 |
| JP | 2008-194473 A | 8/2008 |
| JP | 2008-212681 A | 9/2008 |
| JP | 2009-119256 A | 6/2009 |
| JP | 2010-253268 A | 11/2010 |

* cited by examiner (a)

(b)

GOLF BALL

FIELD OF THE INVENTION

The present invention relates to a golf ball, in particular, to a golf ball traveling a great flight distance and having an excellent approach performance and durability.

DESCRIPTION OF THE RELATED ART

As a method for improving flight distance on driver shots, for example, there are methods of using a core having high resilience and using a core having a hardness distribution in which the hardness increases toward the surface of the core from the center thereof. The former method has an effect of enhancing an initial speed, and the latter method has an effect of a higher launch angle and a lower spin rate. A golf ball having a higher launch angle and a low spin rate travels a great distance.

For example, Japanese Patent Publications Nos. S61-37178 A, S61-113475 A, S61-253079 A, 2008-212681 A, 2008-523952 T and 2009-119256 A disclose a technique of enhancing resilience of the core. Japanese Patent Publication No. S61-37178 A and S61-113475 A disclose a solid golf ball having an inner core where zinc acrylate as a co-crosslinking agent, palmitic acid, stearic acid, or myristic acid as a co-crosslinking activator, zinc oxide as another co-crosslinking activator, and a reaction rate retarder are blended.

Japanese Patent Publication No. S61-253079 A discloses a solid golf ball formed from a rubber composition containing an α,β-unsaturated carboxylic acid in an amount of 15 parts to 35 parts by weight, a metal compound to react with the α,β-unsaturated carboxylic acid and form a salt thereof in an amount of 7 parts to 60 parts by weight, and a high fatty acid metal salt in an amount of 1 part to 10 parts by weight with respect to 100 parts by weight of a base rubber.

Japanese Patent Publication No. 2008-212681 A discloses a golf ball comprising, as a component, a molded and crosslinked product obtained from a rubber composition essentially comprising a base rubber, a filler, an organic peroxide, an α,β-unsaturated carboxylic acid and/or a metal salt thereof, a copper salt of a saturated or unsaturated fatty acid.

Japanese Patent Publication No. 2008-523952 T discloses a golf ball, or a component thereof, molded from a composition comprising a base elastomer selected from the group consisting of polybutadiene and mixtures of polybutadiene with other elastomers, at least one metallic salt of an unsaturated monocarboxylic acid, a free radical initiator, and a non-conjugated diene monomer.

Japanese Patent Publication No. 2009-119256 A discloses a method of manufacturing a golf ball, comprising preparing a masterbatch of an unsaturated carboxylic acid and/or a metal salt thereof by mixing the unsaturated carboxylic acid and/or the metal salt thereof with a rubber material ahead, using the masterbatch to prepare a rubber composition containing the rubber material, and employing a heated and molded product of the rubber composition as a golf ball component, wherein the masterbatch of the unsaturated carboxylic acid and/or the metal salt thereof comprises; (A) from 20 wt % to 100 wt % of a modified polybutadiene obtained by modifying a polybutadiene having a vinyl content of from 0 to 2%, a cis-1,4 bond content of at least 80% and active terminals, the active terminal being modified with at least one type of alkoxysilane compound, and (B) from 80 wt % to 0 wt % of a diene rubber other than (A) the above rubber component [the figures are represented by wt % in the case that a total amount of (A) and (B) equal to 100 wt %] and (C) an unsaturated carboxylic acid and/or a metal salt thereof.

For example, Japanese Patent Publications Nos. H6-154357 A, 2008-194471 A, 2008-194473 A and 2010-253268 A disclose a core having a hardness distribution. Japanese Patent Publication No. H6-154357 A discloses a two-piece golf ball comprising a core formed of a rubber composition containing a base rubber, a co-crosslinking agent, and an organic peroxide, and a cover covering said core, wherein the core has the following hardness distribution according to JIS-C type hardness meter readings: (1) hardness at center: 58-73, (2) hardness at 5 to 10 mm from center: 65-75, (3) hardness at 15 mm from center: 74-82, (4) surface hardness: 76-84, wherein hardness (2) is almost constant within the above range, and the relation (1)<(2)<(3)≤(4) is satisfied.

Japanese Patent Publication No. 2008-194471 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, an inorganic filler, and an antioxidant; the solid core has a deformation from 2.0 mm to 4.0 mm, when applying a load from an initial load of 10 kgf to a final load of 130 kgf and has the hardness distribution shown in the following table.

TABLE 1

| Hardness distribution in solid core | Shore D hardness |
| --- | --- |
| Center | 30 to 48 |
| Region located 4 mm from center | 34 to 52 |
| Region located 8 mm from center | 40 to 58 |
| Region located 12 mm from center (Q) | 43 to 61 |
| Region located 2 to 3 mm inside of surface (R) | 36 to 54 |
| Surface (S) | 41 to 59 |
| Hardness difference [(Q) − (S)] | 1 to 10 |
| Hardness difference [(S) − (R)] | 3 to 10 |

Japanese Patent Publication No. 2008-194473 A discloses a solid golf ball comprising a solid core and a cover layer that encases the core, wherein the solid core is formed of a rubber composition composed of 100 parts by weight of a base rubber that includes from 60 to 100 parts by weight of a polybutadiene rubber having a cis-1,4 bond content of at least 60% and synthesized using a rare-earth catalyst, from 0.1 to 5 parts by weight of an organosulfur compound, an unsaturated carboxylic acid or a metal salt thereof, and an inorganic filler; the solid core has a deformation from 2.0 mm to 4.0 mm, when applying a load from an initial load of 10 kgf to a final load of 130 kgf and has the hardness distribution shown in the following table.

TABLE 2

| Hardness distribution in solid core | Shore D hardness |
| --- | --- |
| Center | 25 to 45 |
| Region located 5 to 10 mm from center | 39 to 58 |
| Region located 15 mm from center | 36 to 55 |
| Surface (S) | 55 to 75 |
| Hardness difference between center and surface | 20 to 50 |

Japanese Patent Publication No. 2010-253268 A discloses a multi-piece solid golf ball comprising a core, an envelope layer encasing the core, an intermediate layer encasing the envelope layer, and a cover which encases the intermediate layer and has formed on a surface thereof a plurality of dimples, wherein the core is formed primarily of a rubber material and has a hardness which gradually increases from a center to a surface thereof, the hardness difference in JIS-C hardness units between the core center and the core surface being at least 15 and, letting (I) be the average value for cross-sectional hardness at a position about 15 mm from the core center and at the core center and letting (II) be the cross-sectional hardness at a position about 7.5 mm from the core center, the hardness difference (I)-(II) in JIS-C units being within ±2; and the envelope layer, intermediate layer and cover have hardness which satisfy the condition: cover hardness>intermediate layer hardness>envelope layer hardness.

SUMMARY OF THE INVENTION

Golfers prefer golf balls traveling a great flight distance on driver shots. However, it is needless to say that not only the flight distance on driver shots but also the accuracy of approach shots is important for score-making. The golf ball employing a relatively soft thermoplastic polyurethane as the cover material is excellent in controllability on 40-yard to 100-yard approach shots. However, controllability on approach shots less than 40-yard, especially 10-yard to 20-yard approach shots around the green have been hardly examined. The present invention has been achieved in view of the above circumstances. An object of the present invention is to provide a golf ball traveling a great flight distance on driver shots, and having high controllability on 40-yard to 100-yard approach shots as well as approach shots around the green, with excellent durability.

The present invention provides a golf ball comprising a golf ball body having a spherical core composed of at least one layer, an intermediate layer disposed outside the spherical core, a cover disposed outside the intermediate layer, and a paint film formed on a surface of the golf ball body, wherein the golf ball has a coefficient of friction calculated using a contact force tester of 0.35 or more and 0.60 or less; the golf ball has a plurality of dimples on a surface thereof, the dimples satisfying a following mathematical formula (I);

$$Y \leq 3.8 \cdot X - 2.894 \qquad (I)$$

(In the mathematical formula (I), X represents a ratio of a total area of all the dimples to a surface area of a phantom sphere of the golf ball, and Y represents a standard deviation (mm) of diameters of all the dimples), at least one layer of the spherical core is a rubber layer formed from a rubber composition, the rubber layer is such that $R^2$ of a linear approximation curve obtained from a least square method is 0.95 or higher, when JIS-C hardness, which is measured at nine points obtained by dividing a thickness of the rubber layer into equal parts having 12.5% intervals in a radius direction of the spherical core, is plotted against distance (%) from an innermost point of the rubber layer; and the rubber layer has a hardness at an outermost point which is greater than a hardness at the innermost point; and the intermediate layer has a slab hardness (Hm) which is greater than a slab hardness (Hc) of the cover.

The golf ball of the present invention has a coefficient of friction calculated using a contact force tester of 0.35 or more and 0.60 or less, and better controllability on approach shots around the green. The golf ball having dimples satisfying the formula (I) reduces a spin rate on driver shots, thereby providing a great flight distance. The spherical core having the rubber layer where the hardness increases linearly or almost linearly from the center side of the core toward the surface side thereof reduces a spin rate on driver shots, thereby providing a great flight distance. The spherical core is not distorted locally when the golf ball is hit, and thus improves the durability of the golf ball. The golf ball having a cover whose slab hardness (Hc) is smaller than the slab hardness (Hm) of the intermediate layer is excellent in controllability on 40-yard to 100-yard approach shots without lowering the resilience.

According to the present invention, it is possible to provide a golf ball traveling a great flight distance on driver shots, and having high controllability on 40-yard to 100-yard approach shots as well as approach shots around the green, with excellent durability.

DESCRIPTION OF THE PREFERRED EMBODIMENT

The present invention is directed to a golf ball comprising a golf ball body having a spherical core composed of at least one layer, an intermediate layer disposed outside the spherical core, a cover disposed outside the intermediate layer, and a paint film formed on a surface of the golf ball body, wherein the golf ball has a coefficient of friction calculated using a contact force tester of 0.35 or more and 0.60 or less; the golf ball has a plurality of dimples on a surface thereof, the dimples satisfying a following mathematical formula (I);

$$Y \leq 3.8*X - 2.894 \quad (I)$$

(In the mathematical formula (I), X represents a ratio of a total area of all the dimples to a surface area of a phantom sphere of the golf ball, and Y represents a standard deviation (mm) of diameters of all the dimples), at least one layer of the spherical core is a rubber layer formed from a rubber composition, the rubber layer is such that $R^2$ of a linear approximation curve obtained from a least square method is 0.95 or higher, when JIS-C hardness, which is measured at nine points obtained by dividing a thickness of the rubber layer into equal parts having 12.5% intervals in a radius direction of the spherical core, is plotted against distance (%) from an innermost point of the rubber layer; and the rubber layer has a hardness at an outermost point which is greater than a hardness at the innermost point; and the intermediate layer has a slab hardness (Hm) which is greater than a slab hardness (Hc) of the cover.

(1) Golf Ball Construction

The golf ball of the present invention is not limited, as long as it comprises a golf ball body having a spherical core composed of at least one layer, an intermediate layer disposed outside the spherical core, and a cover disposed outside the intermediate layer; and a paint film formed on a surface of the golf ball body.

The golf ball of the present invention includes, for example, a three-piece golf ball comprising a single-layered spherical core, an intermediate layer disposed outside the single-layered spherical core, and a cover disposed outside the intermediate layer; a four-piece golf ball comprising a spherical core composed of a spherical inner core layer and an outer core layer covering the spherical inner core layer, an intermediate layer disposed outside the spherical core, and a cover disposed outside the intermediate layer; or a multi-piece golf ball (five-piece or more) comprising a spherical core composed of a spherical inner core layer and an outer core layer covering the spherical inner core layer, an intermediate layer composed of two or more layers and disposed outside the spherical core, and a cover disposed outside the intermediate layer.

Figure 1:
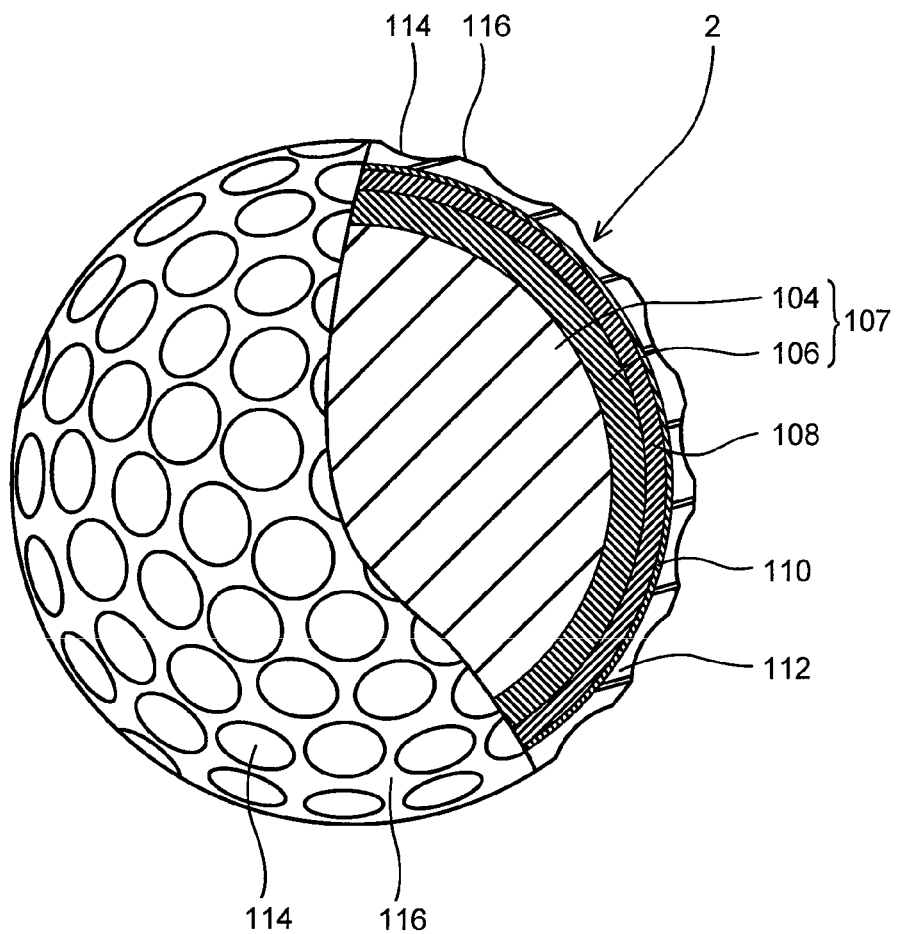
FIG. 1 is a partially cutaway view illustrating the golf ball of the preferred embodiment of the present invention.

Hereinafter, the golf ball of the present invention will be described based on the preferred embodiment with reference to the drawings when appropriate. FIG. 1 is a partially cut-away sectional view showing the golf ball 2 according to the preferable embodiment of the present invention. A spherical core 107 of the golf ball 2 comprises a spherical inner core layer 104 and an outer core layer 106 disposed outside the spherical inner core layer 104. The golf ball 2 comprises the spherical core 107, an intermediate layer 108 disposed outside the spherical core 107, and a cover 112 disposed outside the intermediate layer 108. A reinforcing layer 110 may be formed between the intermediate layer 108 and the cover 112 to improve the adhesion between the intermediate layer 108 and the cover 112. Plurality of dimples 114 are formed on a surface of the cover 112. Other portions than dimples 114 on the surface of the golf ball 2 are referred to as "land 116". The golf ball 2 is provided with a paint layer and a mark layer outside the cover 12, but these layers are not depicted.

The golf ball of the present invention has a spherical core composed of at least one layer. The at least one layer of the spherical core is a rubber layer formed from a rubber composition and the rubber layer is such that $R^2$ of a linear approximation curve obtained by a least square method is 0.95 or higher, when JIS-C hardness, which is measured at nine points obtained by dividing a thickness of the rubber layer into equal parts having 12.5% intervals in a radius direction of the spherical core, is plotted against distance (%) from an innermost point of the rubber layer.

The hardness of the rubber layer is JIS-C hardness measured at nine points obtained by dividing a thickness of the rubber layer into equal parts having 12.5% intervals. That is, letting the innermost point of the rubber layer be 0% and the outermost point of the rubber layer be 100%, respectively, JIS-C hardness is measured at nine points, namely at distances of 0%, 12.5%, 25%, 37.5%, 50%, 62.5%, 75%, 87.5%, 100% (outermost point of the rubber layer) from the innermost point of the rubber layer. The innermost point of the rubber layer is a point that exists in the rubber layer, and a point that is the nearest point to the center of the spherical core in a radius direction of the spherical core. The outermost point of the rubber layer is a point that exists in the rubber layer, and a point that is the furthermost point from the center of the spherical core in a radius direction of the spherical core. The innermost point and the outermost point of the rubber layer exist in the same radius of the spherical core, and the distance therebetween corresponds to the thickness of the rubber layer. Next, the measurement results are plotted to make a graph having JIS-C hardness measured above as a vertical axis and distances (%) from the innermost point as a horizontal axis. In the present invention, $R^2$ of a linear approximation curve obtained from this graph by the least square method is preferably 0.95 or higher. $R^2$ of the linear approximation curve obtained by the least square method indicates the linearity of the obtained plot. In the present invention, $R^2$ of 0.95 or more means that the rubber layer has the hardness distribution where the hardness increases linearly or almost linearly. The spherical core having the rubber layer with the hardness distribution where the hardness increases linearly or almost linearly reduces the spin rate on driver shots, thereby providing a great flight distance. If the spherical core having the rubber layer with the hardness distribution where the hardness increases linearly or almost linearly is used for the golf ball, a load is not applied locally even when the golf ball is distorted by hitting. Therefore, the durability of the obtained golf ball improves. From this aspect, $R^2$ of the linear approximation curve is preferably 0.96 or more, more preferably 0.97 or more. The higher linearity provides the better durability. Hereinafter, in the description of the present invention, the rubber layer with the above hardness distribution sometimes may be merely referred to as "the rubber layer having linear hardness distribution".

In the golf ball of the preset invention, the hardness at the outermost point of the rubber layer is larger than the hardness at the innermost point thereof. The spherical core with the rubber layer where the hardness at the outermost point is larger than the hardness at the innermost point thereof has an outer-hard inner-soft structure. The spherical core having the outer-hard inner-soft structure reduces the spin rate on driver shots, thereby providing a great flight distance. From the aspect of this point, the hardness difference between the hardness at the outermost point and the hardness at the innermost point in the rubber layer is preferably 15 or more, more preferably 20 or more, and even more preferably 26 or more.

The spherical core of the golf ball of the present invention is not limited, as long as the spherical core is composed of at least one layer. The spherical core includes, for example, a single-layered structure and multi-layered structure. In the case that the spherical core has the single-layered structure, the spherical core is preferably formed from a rubber composition and is preferably such that $R^2$ of a linear approximation curve obtained from a least square method is 0.95 or higher, when JIS-C hardness, which is measured at nine points obtained by dividing a radius of the spherical core into equal parts having 12.5% intervals therebetween, is plotted against distance (%) from a core center.

In the case that the spherical core of the golf ball of the present invention has the multi-layered structure, the spherical core is preferably a spherical core composed of a two-layered structure having a spherical inner core layer and an outer core layer covering the spherical inner core layer. The outer core layer is preferably formed to cover the inner core as a whole. In this case, the rubber layer having the linear hardness distribution preferably has the following embodiments.

(1) The spherical inner core layer is the rubber layer having the linear hardness distribution. That is, the spherical inner core layer is such that $R^2$ of a linear approximation curve obtained from a least square method is 0.95 or higher, when JIS-C hardness, which is measured at nine points obtained by dividing a radius of the spherical inner core layer into equal parts having 12.5% intervals therebetween, is plotted against distance (%) from an inner core center.

(2) The outer core layer is the rubber layer having the linear hardness distribution. That is, the outer core layer is such that $R^2$ of a linear approximation curve obtained from a least square method is 0.95 or higher, when JIS-C hardness, which is measured at nine points obtained by dividing a thickness of the outer core layer into equal parts having 12.5% intervals in a radius direction of the spherical core, is plotted against distance (%) from an innermost point (border point between the inner core layer and the outer core layer) of the outer core layer; and (3) The spherical inner core layer and the outer core layer are both the rubber layers having the linear hardness distribution. That is, the spherical inner core layer is such that $R^2$ of a linear approximation curve obtained from a least square method is 0.95 or higher, when JIS-C hardness, which is measured at nine points obtained by dividing a radius of the spherical inner core layer into equal parts having 12.5% intervals therebetween, is plotted against distance (%) from an inner core center; and the outer core layer is such that $R^2$ of a linear approximation curve obtained from a least square method is 0.95 or higher, when JIS-C hardness, which is measured at nine points obtained by dividing a thickness of the outer core layer into equal parts having 12.5% intervals in a radius direction of the spherical core, is plotted against distance (%) from an innermost point (border point between the inner core layer and the outer core layer) of the outer core layer.

In the case that the spherical inner core is the rubber layer having the linear hardness distribution, the hardness of the spherical inner core is JIS-C hardness measured at nine points obtained by dividing a radius of the spherical inner core into equal parts having 12.5% interval. That is, JIS-C hardness is measured at nine points, namely at distances of 0% (inner core center), 12.5%, 25%, 37.5%, 50%, 62.5%, 75%, 87.5%, 100% (inner core surface) from the inner core center. Next, the measurement results are plotted to make a graph having JIS-C hardness as a vertical axis and distances (%) from the inner core center as a horizontal axis. In the present invention, $R^2$ of a linear approximation curve obtained from this graph by the least square method is preferably 0.95 or higher. $R^2$ of the linear approximation curve obtained by the least square method indicates the linearity of the obtained plot. In the present invention, $R^2$ of 0.95 or more means that the inner core has the hardness distribution where the hardness increases linearly or almost linearly. If the inner core having the hardness distribution where the hardness increases linearly or almost linearly is used for the golf ball, the spin rate on driver shots decrease. As a result, the flight distance on driver shots increases. $R^2$ of the linear approximation curve is preferably 0.96 or more. The higher linearity provides a greater flight distance on driver shots.

In the case that the outer core layer is the rubber layer having the linear hardness distribution, the hardness of the outer core layer is JIS-C hardness measured at nine points obtained by dividing a thickness of the outer core layer into equal parts having 12.5% intervals in a radius direction of the spherical core. That is, JIS-C hardness is measured at nine points, namely at distances of 0% (border point), 12.5%, 25%, 37.5%, 50%, 62.5%, 75%, 87.5%, 100% (outermost point of the outer core layer) from the innermost point (border point between the inner core layer and the outer core layer) of the outer core layer. Next, the measurement results are plotted to make a graph having JIS-C hardness as a vertical axis and distances (%) from the innermost point as a horizontal axis. In the present invention, $R^2$ of a linear approximation curve obtained from this graph by the least square method is preferably 0.95 or higher. $R^2$ of the linear approximation curve obtained by the least square method indicates the linearity of the obtained plot. In the present invention, $R^2$ of 0.95 or more means that the outer core layer has the hardness distribution where the hardness increases linearly or almost linearly. If the outer core layer having the hardness distribution where the hardness increases linearly or almost linearly is used for the golf ball, the golf ball has excellent durability. From this aspect, $R^2$ of the linear approximation curve is preferably 0.96 or more, more preferably 0.97 or more. The higher linearity provides the golf ball with a higher durability.

The spherical core composed of at least one layer preferably has the center hardness (Ho) of 40 or more, more preferably 45 or more, even more preferably 50 or more in JIS-C hardness. If the center hardness (Ho) is 40 or more in JIS-C hardness, the resilience improves. Further, from the aspect of suppression of the spin rate upon driver shots, the spherical core has the center hardness (Ho) of 70 or less, more preferably 68 or less, even more preferably 65 or less in JIS-C hardness.

The spherical core preferably has the surface hardness (Hs) of 78 or more, more preferably 80 or more, and even more preferably 82 or more in JIS-C hardness. If the surface hardness (Hs) is 78 or more in JIS-C hardness, the spherical core has an outer-hard inner-soft structure. The spherical core having the outer-hard inner-soft structure reduces the spin rate on driver shots. From the aspect of the durability, the spherical core preferably has the surface hardness (Hs) of 96 or less, more preferably 94 or less, and even more preferably 92 or less in JIS-C hardness.

The spherical core of the golf ball of the present invention preferably has a hardness difference (Hs−Ho) between the surface hardness (Hs) and the center hardness (Ho) of 15 or more, more preferably 20 or more, even more preferably 26 or more, and preferably has a hardness difference of 45 or less, more preferably 42 or less, even more preferably 40 or less in JIS-C hardness. If the hardness difference between the center hardness (Ho) and the surface hardness (Hs) is within the above range, the golf ball having a great flight distance due to the high launch angle and low spin rate is obtained.

The spherical core preferably has a diameter of 38.0 mm or more, more preferably 39.0 mm or more, and even more preferably 39.5 mm or more. If the spherical core has the diameter of 38.0 mm or more, for example, the inner core layer can have a larger diameter, thereby improving resilience performance of the golf ball. The spherical core preferably has a diameter of 41.2 mm or less, more preferably 40.8 mm or less, and even more preferably 40.4 mm or less. If the spherical core has the diameter of 41.2 mm or less, the durability does not deteriorate.

When the spherical core has a diameter from 38.0 mm to 41.2 mm, a compression deformation amount (shrinking deformation amount of the spherical core along the compression direction) of the spherical core when applying a load from an initial load of 98 N to a final load of 1275 N is preferably 2.2 mm or more, more preferably 2.5 mm or more, and is preferably 4.0 mm or less, more preferably 3.5 mm or less. If the compression deformation amount is 2.2 mm or more, the shot feeling of the golf ball becomes better. If the compression deformation amount is 4.0 mm or less, the resilience of the golf ball becomes better.

If the spherical core in the preset invention is composed of the spherical inner core layer and the outer core layer covering the spherical inner core layer, the inner core layer preferably has the center hardness (Ho) of 40 or more, more preferably 50 or more, even more preferably 60 or more in JIS-C hardness. If the center hardness is 40 or more in JIS-C hardness, the resilience improves. Further, from the aspect of suppression of the spin rate on driver shots, the inner core layer preferably has the center hardness (Ho) of 80 or less, more preferably 76 or less, even more preferably 72 or less in JIS-C hardness.

The surface hardness (Hs1) of the inner core layer is preferably 80 or more, more preferably 82 or more, and even more preferably 84 or more in JIS-C hardness. If the surface hardness is 80 or more in JIS-C hardness, the spin rate on driver shots is reduced, and thus the flight distance is enhanced. From the aspect of the durability, the surface hardness is preferably 96 or less, more preferably 94 or less, even more preferably 92 or less in JIS-C hardness.

The hardness difference (Hs1−Ho) between the surface hardness (Hs1) and the center hardness (Ho) of the inner core layer is preferably 1 or more, more preferably 2 or more, and even more preferably 3 or more, and is preferably 30 or less, more preferably 25 or less, even more preferably 20 or less in JIS-C hardness. The inner core layer having the outer-hard inner-soft structure reduces the spin rate on driver shots, thereby providing a great flight distance.

The inner core layer preferably has a diameter of 10.0 mm or greater, more preferably 12.0 mm or greater, and even more preferably 14.0 mm or greater. Using the inner core layer having the diameter of 10.0 mm or greater further reduces the spin rate on driver shots. The inner core layer preferably has a diameter of 25.0 mm or less, more preferably 22.0 mm or less, and even more preferably 19.0 mm or less. Using the inner core layer having the diameter of 25.0 mm or less further improves resilience performance of the golf ball.

The hardness (Hs2) of the outermost point of the outer core layer is preferably 80 or more, more preferably 82 or more, and even more preferably 84 or more in JIS-C hardness. If the hardness (Hs2) of the outermost point of the outer core layer is 80 or more in JIS-C hardness, the spin rate on driver shots are further reduced. From the aspect of the durability, the hardness (Hs2) of the outermost point of the outer core layer is preferably 96 or less, more preferably 94 or less, and even more preferably 92 or less in JIS-C hardness. The hardness (Hs2) of the outermost point of the outer core layer is not a hardness which is measured in a cross section, but a hardness measured at the surface of the outer core layer.

The hardness (Hb) at the innermost point (a border point between the outer core layer and the inner core layer) of the outer core layer is preferably 45 or more, more preferably 50 or more, and even more preferably 55 or more in JIS-C hardness. If the hardness at the innermost point of the outer core layer is 45 or more in JIS-C hardness, the ball speed improves. From the aspect of lowering the spin rate, the hardness (Hb) at the innermost point of the outer core layer is preferably 80 or less, more preferably 75 or less, and even more preferably 70 or less in JIS-C hardness.

The hardness difference (Hs2−Hb) between the surface hardness (Hs2) of the outer core layer and the hardness (Hb) at the border point between the outer core layer and the inner core layer is preferably 20 or more, more preferably 23 or more, and even more preferably 26 or more, and is preferably 45 or less, more preferably 40 or less, even more preferably 35 or less in JIS-C hardness. If the hardness difference (Hs2-Hb) is 20 or more in JIS-C hardness, it is possible to lower the spin rate. If the hardness difference (Hs2-Hb) is 45 or less, the durability does not deteriorate.

The outer core layer preferably has a thickness of 6 mm or more, more preferably 8 mm or more, and even more preferably 11 mm or more, and preferably has a thickness of 16 mm or less, more preferably 15 mm or less, and even more preferably 13 mm or less. If the thickness is 6 mm or more, it is possible to suppress the decrease in the ball speed. If the thickness is 16 mm or less, it is possible to impart the effect of lowering the spin rate.

The golf ball of the preset invention further comprises the intermediate layer disposed outside the spherical core and the cover disposed outside the intermediate layer. The intermediate layer is formed between the spherical core and the cover. The intermediate layer may have at least one layer, and may have two or more layers. The cover is formed as the outermost layer of the golf ball body.

The slab hardness (Hm) of the intermediate layer is higher than the slab hardness (Hc) of the cover. This configuration strikes a balance between a great flight distance and an approach performance. The hardness difference (Hm-Hc) between the slab hardness (Hm) of the intermediate layer and the slab hardness (Hc) of the cover is preferably 30 or more, more preferably 31 or more, even more preferably 32 or more, and is preferably 40 or less, more preferably 39 or less, even more preferably 38 or less in Shore D hardness. If the hardness difference (Hm-Hc) falls within the above range, it is possible to produce a low spin rate on driver shots and high spin rate on iron shots. Further, in the case that the intermediate layer is composed of at least two layers, the hardness difference between the cover and the intermediate layer adjacent to the cover is adjusted to fall within the above range.

The intermediate layer has a slab hardness (Hm) of 55 or more, more preferably 60 or more, even more preferably 63 or more, and preferably has a slab hardness (Hm) of 70 or less, more preferably 68 or less, even more preferably 67 or less in Shore D hardness. If the slab hardness of the intermediate layer is 55 or more in Shore D hardness, the degree of outer-hard inner-soft of the golf ball (except the cover) is enhanced, thereby producing a much lower spin rate. If the slab hardness of the intermediate layer is 70 or less in Shore D hardness, the approach performance becomes much better.

The intermediate layer preferably has a thickness of 0.5 mm or more, more preferably 0.7 mm or more, and even more preferably 0.8 mm or more. If the thickness is 0.5 mm or more, the durability becomes better. The intermediate layer preferably has a thickness of 1.6 mm or less, more preferably 1.3 mm or less, and even more preferably 1.1 mm or less. If the thickness is 1.6 mm or less, it is possible to relatively enlarge a diameter of the spherical core, and thus the resilience of the golf ball improves.

The cover preferably has a slab hardness (Hc) of 48 or less, more preferably 40 or less, even more preferably 32 or less in Shore D hardness. If the slab hardness of the cover is 48 or less in Shore D hardness, the spin rate on approach shots increases, thereby improving controllability. The cover preferably has a slab hardness (Hc) of 20 or more, more preferably 22 or more, even more preferably 24 or more in Shore D hardness. If the slab hardness of the cover is 20 or more in Shore D hardness, the abrasion resistance of the cover improves.

The cover preferably has a thickness of 0.8 mm or less, more preferably 0.6 mm or less. If the thickness is 0.8 mm or less, the spin rate on driver shots is further reduced. The cover preferably has a thickness of 0.1 mm or more, more preferably 0.2 mm or more, and even more preferably 0.3 mm or more. If the cover is too thin, it tends to be difficult to mold the cover.

The golf ball of the present invention may have a reinforcing layer between the intermediate layer and the cover. The reinforcing layer adheres firmly to the intermediate layer as well as to the cover. The reinforcing layer suppresses delamination of the cover from the intermediate layer. In particular, when the golf ball with a thin cover is hit with an edge of a clubface, a wrinkle easily generates. The reinforcing layer suppresses the generation of the wrinkle.

From the aspect of suppressing the wrinkle, the reinforcing layer preferably has a thickness of 3 μm or greater, and more preferably 5 μm or greater. In order to facilitate the formation of the reinforcing layer, the reinforcing layer preferably has a thickness of 15 μm or less, more preferably 12 μm or less, and even more preferably 10 μm or less. The thickness is measured by observing a cross section of the golf ball with a microscope. When the intermediate layer has concavities and convexities on its surface by surface roughening, the thickness of the reinforcing layer is measured at the top of the convex part.

From the aspect of suppressing the wrinkle, the reinforcing layer preferably has a pencil hardness of 4B or harder, and more preferably B or harder. From the aspect of reducing the loss of the power transmission from the cover to the intermediate layer upon a hit of the golf ball, the reinforcing layer preferably has a pencil hardness or 3H or softer. The pencil hardness is measured according to the standard of "JIS K5400".

The golf ball according to the present invention has a large number of dimples on a surface thereof. As shown in FIGS. 2 to 7, the contour of each dimple is circular. The dimples whose contours are circular have excellent aerodynamic symmetry. The golf ball 2 has dimples A each having a diameter of 4.50 mm; dimples B each having a diameter of 4.40 mm; dimples C each having a diameter of 4.30 mm; and dimples D each having a diameter of 4.15 mm. The number of types of the dimples is four.

The number of the dimples A is 28; the number of the dimples B is 122; the number of the dimples C is 100; and the number of the dimples D is 74. The total number N of the dimples is 324. The average of the diameters of all the dimples is 4.321 mm.

The area s of each dimple is the area of a region surrounded by the contour line when the center of the golf ball 2 is viewed at infinity. In the case of a circular dimple, the area s is calculated by the following mathematical formula.

$$s=(Dm/2)^2*\pi$$

In this mathematical formula, Dm represents the diameter of the dimple. In the golf ball 2 shown in FIGS. 2 to 7, the area of each dimple A is 15.90 mm$^2$; the area of each dimple B is 15.21 mm$^2$; the area of each dimple C is 14.52 mm$^2$; and the area of each dimple D is 13.53 mm$^2$.

The ratio of the sum of the areas s of all the dimples to the surface area of the phantom sphere of the golf ball is referred to as an occupation ratio X. From the aspect of turbulization, the occupation ratio X is preferably 0.78 or more, more preferably 0.79 or more, and particularly preferably 0.80 or more. The occupation ratio X is preferably 0.95 or less. In the golf ball 2 shown in FIGS. 2 to 7, the total area of all the dimples is 4753.5 mm$^2$. The surface area of the phantom sphere of the golf ball 2 is 5728.0 mm$^2$, and thus the occupation ratio X is 0.830.

The standard deviation Y of the diameters of all the dimples is preferably 0.30 or less. In the golf ball 2 in which the standard deviation Y is 0.30 or less, turbulization is prompted. From this respect, the standard deviation Y is more preferably 0.29 or less, and even more preferably 0.28 or less. The standard deviation Y may be zero. The standard deviation Y of the golf ball 2 shown in FIGS. 2 to 7 is calculated by the following mathematical formula.

$$Y=(((4.500-4.321)^2*28+(4.400-4.321)^2*122+(4.300-4.321)^2*100+(4.150-4.321)^2*74)/324)^{1/2}$$

The standard deviation Y of the golf ball 2 is 0.109.

Figure 8:
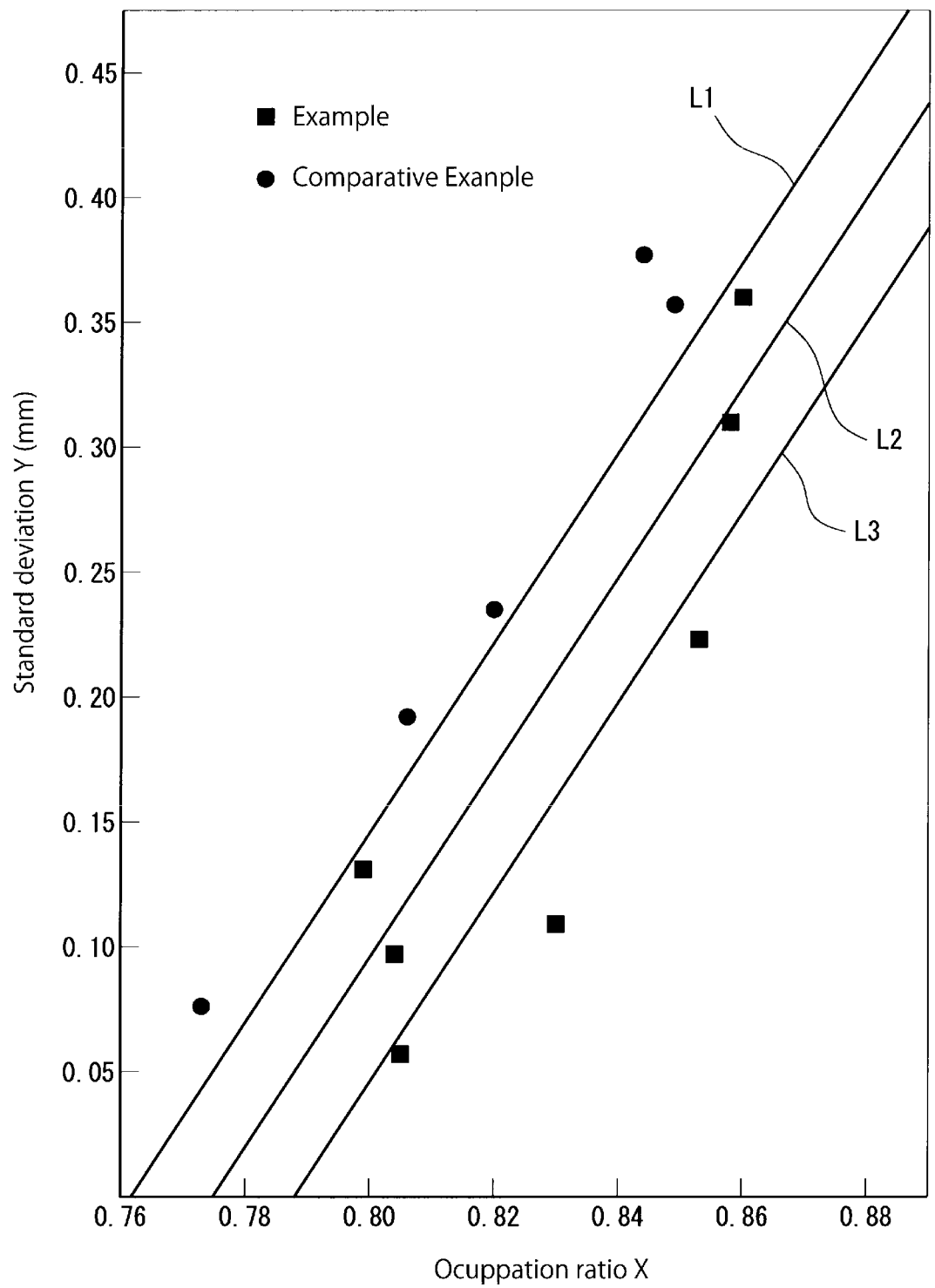
FIG. 8 is a graph showing the relation between the occupation ratio X and standard deviation Y.

In the graph of FIG. 8, the horizontal axis indicates an occupation ratio, and the vertical axis indicates a standard deviation Y. A straight line indicated by a reference sign L1 in the graph of FIG. 8 is represented by the following mathematical formula.

$$Y=3.8*X-2.894$$

The golf ball 2 whose coordinates (X, Y) are on or below the straight line L1 has excellent flight performance. In other words, the golf ball 2 that meets the following mathematical formula (I) has a low spin rate upon driver shots to provide a great flight distance. The reason is inferred to be that turbulization is prompted.

$$Y \leq 3.8*X-2.894 \tag{I}$$

A straight line indicated by a reference sign L2 in the graph of FIG. 8 is represented by the following mathematical formula.

$$Y=3.8*X-2.944$$

The golf ball 2 whose coordinates (X, Y) are on or below the straight line L2 has more excellent flight performance. In other words, the golf ball 2 that meets the following mathematical formula (II) has a lower spin rate upon driver shots to provide a greater flight distance. The reason is inferred to be that turbulization is more prompted.

$$Y \leq 3.8*X-2.944 \tag{II}$$

A straight line indicated by a reference sign L3 in the graph of FIG. 8 is represented by the following mathematical formula.

$$Y=3.8*X-2.994$$

The golf ball 2 whose coordinates (X, Y) are on or below the straight line L3 has Particularly excellent flight performance. In other words, the golf ball 2 that meets the following mathematical formula (III) has a much lower spin rate upon driver shots to provide a much greater flight distance. The reason is inferred to be that turbulization is further prompted.

$$Y \leq 3.8*X-2.994 \tag{III}$$

When arranging the dimples, in many cases, a designer initially designs an arrangement of basic dimples and then arranges small dimples in narrow zones each surrounded by a plurality of the dimples, in order to further increase the occupation ratio. However, the small dimples contribute to the effect of increasing the occupation ratio but impair the effect of decreasing the standard deviation. The arrangement of the small dimples does not correspond to the purport of the present invention. In designing a dimple pattern according to the present embodiment, the designer focuses on the center-to-center distance between adjacent dimples from the stage of designing the basic dimples. The designer designs the pattern, taking it into consideration to make the center-to-center distance between the adjacent dimples as small as possible. Therefore, even when no small dimple is arranged, the occupation ratio can be increased.

Figure 9:
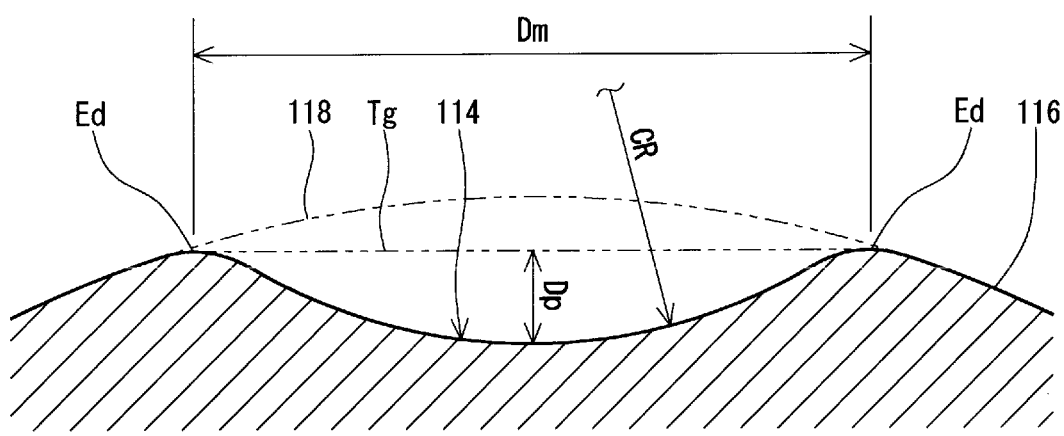
FIG. 9 is a partially enlarged cutaway view of the golf ball shown in FIG. 1.

FIG. 9 shows a cross section along a plane passing through the center of the dimple 114 and the center of the golf ball 2. In FIG. 9, the vertical direction is the depth direction of the dimple 114. In FIG. 9, a chain double-dashed line 118 indicates the phantom sphere. The surface of the phantom sphere is the surface of the golf ball 2 when it is assumed that no dimple 114 exists. The dimple 114 is recessed from the surface of the phantom sphere. The land 116 coincides with the surface of the phantom sphere. In the present embodiment, the cross-sectional shape of each dimple 114 is substantially a circular arc.

In FIG. 9, a double ended arrow Dm indicates the diameter of the dimple 114. The diameter Dm is the distance between one tangent point Ed and another tangent point Ed appearing on a tangent line Tg that is drawn tangent to the far opposite ends of the dimple 114. Each tangent point Ed is also the edge of the dimple 114. The edge Ed defines the contour of the dimple 114. In FIG. 9, a double ended arrow Dp indicates the depth of the dimple 114. The depth Dp is the distance between the deepest part of the dimple 114 and the tangent line Tg.

The diameter Dm of each dimple is preferably 2.0 mm or more, and is preferably 6.0 mm or less. The dimple having a diameter Dm of 2.0 mm or more contributes to turbulization. From this aspect, the diameter Dm is more preferably 2.2 mm or more, and even more preferably 2.4 mm or more. The dimple having a diameter Dm of 6.0 mm or less does not impair a fundamental feature of the golf ball 2 being substantially a sphere. From this respect, the diameter Dm is more preferably 5.8 mm or less, and even more preferably 5.6 mm or less.

In FIG. 9, an arrow CR indicates the curvature radius of the dimple 114. The curvature radius CR is calculated by the following mathematical formula (I).

$$CR=(Dp^2+Dm^2/4)/(2*Dp) \tag{1}$$

Also in the case of a dimple 114 whose cross-sectional shape is not a circular arc, the curvature radius CR is approximately calculated on the basis of the above mathematical formula (1).

From the standpoint that a sufficient occupation ratio X is achieved, the total number N of the dimples is preferably 300 or more, more preferably 310 or more, and even more preferably 320 or more. From the standpoint that each dimple can contribute to turbulization, the total number N is preferably 400 or less, more preferably 390 or less, and particularly preferably 380 or less.

In the present invention, the "volume of the dimple" means the volume of the portion surrounded by the surface of the dimple and the plane including the contour of the dimple. From the aspect of suppression of excessive rising of the golf ball 2 during flight, the total volume of all the dimples is preferably 250 mm³ or more, more preferably 260 mm³ or more and even more preferably 270 mm³ or more. From the aspect of suppression of dropping of the golf ball 2 during flight, the total volume is preferably 400 mm³ or less, more preferably 390 mm³ or less, and even more preferably 380 mm³ or less.

From the aspect of suppression of excessive rising of the golf ball 2 during flight, the depth Dp of each dimple 114 is preferably 0.05 mm or more, more preferably 0.08 mm or more, and even more preferably 0.10 mm or more. From the aspect of suppression of dropping of the golf ball 2 during flight, the depth Dp is preferably 0.60 mm or less, more preferably 0.45 mm or less, and even more preferably 0.40 mm or less.

When the golf ball of the present invention has a diameter in a range from 40 mm to 45 mm, a compression deformation amount of the golf ball (shrinking amount of the golf ball in the compression direction thereof) when applying a load from an initial load of 98 N to a final load of 1275 N to the golf ball is preferably 1.8 mm or more, more preferably 2.0 mm or more, even more preferably 2.3 mm or more, most preferably 2.4 mm or more, and is preferably 3.6 mm or less, more preferably 3.3 mm or less. If the compression deformation amount is 1.8 mm or more, the golf ball does not become excessively hard, and thus exhibits the good shot feeling. On the other hand, if the compression deformation amount is 3.6 mm or less, the resilience is enhanced.

(2) Golf Ball Materials

The golf ball of the present invention has the rubber layer having the linear hardness distribution, wherein the rubber layer is preferably formed from a rubber composition containing (a) a base rubber, (b-1) an α,β-unsaturated carboxylic acid having 3 to 8 carbon atoms and/or (b-2) a metal salt thereof as (b) a co-crosslinking agent, (c) a crosslinking initiator, and (d) an acid and/or a salt thereof. The rubber layer formed from the above rubber composition has hardness distribution where the hardness tends to increase linearly or almost linearly from the center side of the core toward the surface side thereof.

The reason why the hardness of the rubber layer increases linearly or almost linearly from the center side of the core toward the surface side thereof is considered as follows. (b2) The metal salt of the α,β-unsaturated carboxylic acid having 3 to 8 carbon atoms blended in the rubber composition is considered to form an ion cluster in the rubber layer, thereby crosslinking the rubber molecules with metals. By blending (d) the acid and/or the salt thereof into this rubber composition, (d) the acid and/or the salt thereof exchanges a cation with the ion cluster formed from (b2) the metal salt of the α,β-unsaturated carboxylic acid having 3 to 8 carbon atoms, thereby breaking the metal crosslinking by the metal salt of the α,β-unsaturated carboxylic acid having 3 to 8 carbon atoms. This cation exchange reaction easily occurs at the core central side where the internal temperature is high and less occurs toward the core surface. When molding a core, the internal temperature of the rubber layer is high at the core center side and decreases toward the core surface side, since reaction heat from a crosslinking reaction of the base rubber accumulates at the core center side. In other words, the breaking of the metal crosslinking by (d) the carboxylic acid and/or the salt thereof easily occurs at the core center side, but less occurs toward the surface side. As a result, it is conceivable that since a crosslinking density in the rubber layer increases from the center side of the core toward the surface side thereof, the hardness increases linearly or almost linearly from the center side of the core toward the surface side thereof.

Hereinafter, the rubber composition will be described in detail. As (a) the base rubber used in the present invention, natural rubber and/or synthetic rubber can be used. For example, polybutadiene rubber, natural rubber, polyisoprene rubber, styrene polybutadiene rubber, ethylene-propylene-diene rubber (EPDM), or the like can be used. These rubbers may be used solely or two or more of these rubbers may be used in combination. Among them, typically preferred is the high cis-polybutadiene having a cis-1,4 bond in a proportion of 40% or more, more preferably 80% or more, even more preferably 90% or more in view of its superior resilience property.

The high-cis polybutadiene preferably has a 1,2-vinyl bond in a content of 2 mass % or less, more preferably 1.7 mass % or less, and even more preferably 1.5 mass % or less. If the content of 1,2-vinyl bond is excessively high, the resilience may be lowered.

The high-cis polybutadiene is preferably one synthesized using a rare earth element catalyst. When a neodymium catalyst, which employs a neodymium compound which is a lanthanum series rare earth element compound, is used, a polybutadiene rubber having a high content of a cis-1,4 bond and a low content of a 1,2-vinyl bond is obtained with excellent polymerization activity. Such a polybutadiene rubber is particularly preferred.

The high-cis polybutadiene preferably has a Mooney viscosity ($ML_{1+4}$ (100° C.)) of 30 or more, more preferably 32 or more, even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of: a preheating time of 1 minute; a rotor revolution time of 4 minutes; and a temperature of 100° C.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability deteriorates. If the molecular weight distribution (Mw/Mn) of the high-cis polybutadiene is excessively high, the resilience may be lowered. It is noted that the measurement of the molecular weight distribution is conducted by gel permeation chromatography ("HLC-8120GPC", manufactured by Tosoh Corporation) using a differential refractometer as a detector under the conditions of column: GMHHXL (manufactured by Tosoh Corporation), column temperature: 40° C., and mobile phase: tetrahydrofuran, and calculated by converting based on polystyrene standard.

Next, (b) the co-crosslinking agent will be described. The rubber composition contains (b1) the α,β-unsaturated carboxylic acid having 3 to 8 carbon atoms and/or (b2) the metal salt thereof as (b) the co-crosslinking agent. Hereinafter, (b1) the α,β-unsaturated carboxylic acid having 3 to 8 carbon atoms and/or (b2) the metal salt thereof sometimes may be merely referred to as "(b) the α,β-unsaturated carboxylic acid having 3 to 8 carbon atoms and/or the metal salt thereof".

(b) The α,β-unsaturated carboxylic acid having 3 to 8 carbon atoms and/or the metal salt thereof is blended in the rubber composition as the co-crosslinking agent and has an action of crosslinking a rubber molecule by graft polymerization to a base rubber molecular chain. In the case that the rubber composition used in the present invention contains only (b1) the α,β-unsaturated carboxylic acid having 3 to 8 carbon atoms as the co-crosslinking agent, the rubber composition preferably further contains (f) a metal compound which will be described later. Neutralizing the α,β-unsaturated carboxylic acid having 3 to 8 carbon atoms with (f) the metal compound in the rubber composition provides substantially the same effect as using the metal salt of the α,β- unsaturated carboxylic acid having 3 to 8 carbon atoms. Further, in the case of using (b2) the α,β-unsaturated carboxylic acid having 3 to 8 carbon atoms and the metal salt thereof in combination, (f) the metal compound may be used as an optional component.

(b1) The α,β-unsaturated carboxylic acid having 3 to 8 carbon atoms includes, for example, acrylic acid, methacrylic acid, fumaric acid, maleic acid, crotonic acid, and the like.

Examples of the metals constituting (b2) the metal salts of the α,β-unsaturated carboxylic acid having 3 to 8 carbon atoms include: monovalent metal ions such as sodium, potassium, lithium or the like; divalent metal ions such as magnesium, calcium, zinc, barium, cadmium or the like; trivalent metal ions such as aluminum ion or the like; and other metal ions such as tin, zirconium or the like. The above metal ions can be used solely or as a mixture of at least two of them. Among these metal ions, divalent metal ions such as magnesium, calcium, zinc, barium, cadmium or the like are preferable. Use of the divalent metal salts of the α,β-unsaturated carboxylic acid having 3 to 8 carbon atoms easily generates a metal crosslinking between the rubber molecules. Especially, as the divalent metal sat, zinc acrylate is preferable, because zinc acrylate enhances the resilience of the resultant golf ball. (b) The α,β-unsaturated carboxylic acid having 3 to 8 carbon atoms and/or a metal salt thereof may be used solely or in combination at least two of them.

The content of (b) the α,β-unsaturated carboxylic acid having 3 to 8 carbon atoms and/or the metal salt thereof is preferably 15 parts by mass or more, more preferably 20 parts by mass or more, and is preferably 50 parts by mass or less, more preferably 45 parts by mass or less, even more preferably 40 parts by mass or less, with respect to 100 parts by mass of (a) the base rubber. If the content of (b) the α,β-unsaturated carboxylic acid having 3 to 8 carbon atoms and/or the metal salt thereof is less than 15 parts by mass, the content of (c) the crosslinking initiator which will be described below must be increased in order to obtain the appropriate hardness of the constituting member formed from the rubber composition, which tends to cause the lower resilience. On the other hand, if the content of (b) the α,β-unsaturated carboxylic acid having 3 to 8 carbon atoms and/or the metal salt thereof exceeds 50 parts by mass, the constituting member formed from the rubber composition becomes excessively hard, which tends to cause the lower shot feeling.

(c) The crosslinking initiator is blended in order to crosslink (a) the base rubber component. As (c) the crosslinking initiator, an organic peroxide is preferred. Specific examples of the organic peroxide include organic peroxides such as dicumyl peroxide, 1,1-bis(t-butylperoxy)-3,3,5-trimethylcyclohexane, 2,5-dimethyl-2,5-di(t-butylperoxy)hexane, and di-t-butyl peroxide. These organic peroxides may be used solely or two or more of these organic peroxides may be used in combination. Among them, dicumyl peroxide is preferably used.

The content of (c) the crosslinking initiator is preferably 0.2 part by mass or more, and more preferably 0.5 part by mass or more, and is preferably 5.0 parts by mass or less, and more preferably 2.5 parts by mass or less, with respect to 100 parts by mass of (a) the base rubber. If the content of (c) the crosslinking initiator is less than 0.2 part by mass, the constituting member formed from the rubber composition becomes too soft, and thus the golf ball may have the lower resilience. If the content of (c) the crosslinking initiator exceeds 5.0 parts by mass, the amount of (b) the co-crosslinking agent must be decreased in order to obtain the appropriate hardness of the constituting member formed from the rubber composition, resulting in the insufficient resilience and lower durability of the golf ball.

Next, (d) the acid and/or the salt thereof will be described. It is considered that (d) the acid and/or the salt thereof has an action of breaking the metal crosslinking by the metal salt of (b) the α,β-unsaturated carboxylic acid having 3 to 8 carbon atoms in the rubber layer, when molding the rubber layer having the linear hardness distribution.

(d) The acid and/or the salt thereof may include any one of a fatty acid and/or a salt thereof and an aromatic acid and/or a salt thereof, as long as it exchanges the cation component with the metal salt of the α,β-unsaturated carboxylic acid having 3 to 8 carbon atoms. As (d) the acid and/or the salt thereof, for example, preferred is a protonic acid and/or a salt thereof. The protonic acid includes oxo acids such as a carboxylic acid, a sulfonic acid, and a phosphoric acid; and hydroacids such as hydrochloric acid, hydrofluoric acid or the like. Preferred of the acids is an oxo acid, more preferred is a carboxylic acid. That is, (d) the acid and/or the salt thereof preferably includes a carboxylic acid and/or a salt thereof.

(d) The acid and/or the salt thereof may include any one of an aliphatic carboxylic acid (sometimes may be merely referred to as "fatty acid" in the present invention) and/or a salt thereof and an aromatic carboxylic acid and/or a salt thereof, and preferred is the aliphatic carboxylic acid and/or the salt thereof. (d) The carboxylic acid and/or the salt thereof preferably includes a carboxylic acid having 1 to 30 carbon atoms and/or a salt thereof, more preferably a carboxylic acid having 4 to 30 carbon atoms and/or a salt thereof, and even more preferably a carboxylic acid having 5 to 25 carbon atoms and/or a salt thereof. (d) The carboxylic acid and/or the salt thereof does not include (b) the α,β-unsaturated carboxylic acid having 3 to 8 carbon atoms and/or the metal salt thereof used as the co-crosslinking agent.

The fatty acid may be either a saturated fatty acid or an unsaturated fatty acid; however, a saturated fatty acid is preferable. Specific examples of the saturated fatty acids (IUPAC name) are methanoic acid (C1), ethanoic acid (C2), propanoic acid (C3), butanoic acid (C4), pentanoic acid (C5), hexanoic acid (C6), heptanoic acid (C7), octanoic acid (C8), nonanoic acid (C9), decanoic acid (C10), undecanoic acid (C11), dodecanoic acid (C12), tridecanoic acid (C13), tetradecanoic acid (C14), pentadecanoic acid (C15), hexadecnoic acid (C16), heptadecanoic acid (C17), octadecanoic acid (C18), nonadecanoic acid (C19), icosanoic acid (C20), henicosanoic acid (C21), docosanoic acid (C22), tricosanoic acid (C23), tetracosanoic acid (C24), pentacosanoic acid (C25), hexacosanoic acid (C26), heptacosanoic acid (C27), octacosanoic acid (C28), nonacosanoic acid (C29), triacontanoic acid (C30).

Specific examples of the unsaturated fatty acid (IUPAC) are ethenoic acid (C2), propenoic acid (C3), butenoic acid (C4), pentenoic acid (C5), hexenoic acid (C6), heptenoic acid (C7), octenoic acid (C8), nonenoic acid (C9), decenoic acid (C10), undecenoic acid (C11), dodecenoic acid (C12), tridecenoic acid (C13), tetradecenoic acid (C14), pentadecenoic acid (C15), hexadecenoic acid (C16), heptadecenoic acid (C17), octadecenoic acid (C18), nonadecenoic acid (C19), icosenoic acid (C20), henicosenoic acid (C21), docosenoic acid (C22), tricosenoic acid (C23), tetracosenoic acid (C24), pentacosenoic acid (C25), hexacosenoic acid (C26), heptacosenoic acid (C27), octacosenoic acid (C28), nonacosenoic acid (C29), triacontenoic acid (C30).

Specific examples of the fatty acid (Common name) are, formic acid (C1), acetic acid (C2), propionic acid (C3), butyric acid (C4), valeric acid (C5), caproic acid (C6), enanthic acid (C7), caprylic acid (C8), pelargonic acid (C9), capric acid (C10), lauric acid (C12), myristic acid (C14), myristoleic acid (C14), pentadecylic acid (C15), palmitic acid (C16), palmitoleic acid (C16), margaric acid (C17), stearic acid (C18), elaidic acid (C18), vaccenic acid (C18), oleic acid (C18), linoleic acid (C18), linolenic acid (C18), 12-hydroxystearic acid (C18), arachidic acid (C20), gadoleic acid (C20), arachidonic acid (C20), eicosenoic acid (C20), behenic acid (C22), erucic acid (C22), lignoceric acid (C24), nervonic acid (C24), cerotic acid (C26), montanic acid (C28), and melissic acid (C30). The fatty acid may be used alone or as a mixture of at least two of them. Among those described above, capric acid, lauric acid, myristic acid, palmitic acid, setaric acid, behenic acid and oleic acid are preferable as the fatty acid.

There is no particular limitation on the aromatic carboxylic acid, as long as it is a compound that has an aromatic ring and a carboxyl group. Specific examples of the aromatic carboxylic acid include, for example, benzoic acid (C7), phthalic acid (C8), isophthalic acid (C8), terephthalic acid (C8), hemimellitic acid (benzene-1,2,3-tricarboxylic acid) (C9), trimellitic acid (benzene-1,2,4-tricarboxylic acid) (C9), trimesic acid (benzene-1,3,5-tricarboxylic acid) (C9), mellophanic acid (benzene-1,2,3,4-tetracarboxylic acid) (C10), prehnitic acid (benzene-1,2,3,5-tetracarboxylic acid) (C10), pyromellitic acid (benzene-1,2,4,5-tetracarboxylic acid) (C10), mellitic acid (benzene hexacarboxylic acid) (C12), diphenic acid (biphenyl-2,2'-dicarboxylic acid) (C12), toluic acid (methylbenzoic acid) (C8), xylic acid (C9), prehnitylic acid (2,3,4-trimethylbenzoic acid) (C10), γ-isodurylic acid (2,3,5-trimethylbenzoic acid) (C10), durylic acid (2,4,5-trimethylbenzoic acid) (C10), β-isodurylic acid (2,4,6-trimethylbenzoic acid) (C10), α-isodurylic acid (3,4,5-trimethylbenzoic acid) (C10), cuminic acid (4-isopropylbenzoic acid) (C10), uvitic acid (5-methylisophthalic acid) (C9), α-toluic acid (phenylacetic acid) (C8), hydratropic acid (2-phenylpropanoic acid) (C9), and hydrocinnamic acid (3-phenylpropanoic acid) (C9).

Furthermore, examples of the aromatic carboxylic acid substituted with a hydroxyl group, an alkoxy group, or an oxo group include salicylic acid (2-hydroxybenzoic acid) (C7), anisic acid (methoxybenzoic acid) (C8), cresotinic acid (hydroxy (methyl) benzoic acid) (C8), o-homosalicylic acid (2-hydroxy-3-methylbenzoic acid) (C8), m-homosalicylic acid (2-hydroxy-4-methylbenzoic acid) (C8), p-homosalicylic acid (2-hydroxy-5-methylbenzoic acid) (C8), o-pyrocatechuic acid (2,3-dihydroxybenzoic acid) (C7), β-resorcylic acid (2,4-dihydroxybenzoic acid) (C7), γ-resorcylic acid (2,6-dihydroxybenzoic acid) (C7), protocatechuic acid (3,4-dihydroxybenzoic acid) (C7), α-resorcylic acid (3,5-dihydroxybenzoic acid) (C7), vanillic acid (4-hydroxy-3-methoxybenzoic acid) (C8), isovanillic acid (3-hydroxy-4-methoxybenzoic acid) (C8), veratric acid (3,4-dimethoxybenzoic acid) (C9), o-veratric acid (2,3-dimethoxybenzoic acid) (C9), orsellinic acid (2,4-dihydroxy-6-methylbenzoic acid) (C8), m-hemipinic acid (4,5-dimethoxyphthalic acid) (C10), gallic acid (3,4,5-trihydroxybenzoic acid) (C7), syringic acid (4-hydroxy-3,5-dimethoxybenzoic acid) (C9), asaronic acid (2,4,5-trimethoxybenzoic acid) (C10), mandelic acid (hydroxy (phenyl) acetic acid) (C8), vanilmandelic acid (hydroxy (4-hydroxy-3-methoxy phenyl) acetic acid) (C9), homoanisic acid ((4-methoxy phenyl) acetic acid) (C9), homogentisic acid ((2,5-dihydroxyphenyl) acetic acid) (C8), homoprotocatechuic acid ((3,4-dihydroxyphenyl) acetic acid) (C8), homovanillic acid ((4-hydroxy-3-methoxy phenyl) acetic acid) (C9), homoisovanillic acid ((3-hydroxy-4-methoxy phenyl) acetic acid) (C9), homoveratric acid ((3,4-dimethoxy phenyl) acetic acid) (C10), o-homoveratric ((2,3-dimethoxy phenyl) acetic acid) (C10), homophthalic acid (2-(carboxymethyl) benzoic acid) (C9), homoisophthalic acid (3-(carboxymethyl) benzoic acid) (C9), homoterephthalic acid (4-(carboxymethyl) benzoic acid) (C9), phthalonic acid (2-(carboxycarbonyl) benzoic acid) (C9), isophthalonic acid (3-(carboxycarbonyl) benzoic acid) (C9), terephthalonic acid (4-(carboxycarbonyl) benzoic acid) (C9), benzilic acid (hydroxy diphenylacetic acid) (C14), atrolactic acid (2-hydroxy-2-phenylpropanoic acid) (C9), tropic acid (3-hydroxy-2-phenylpropanoic acid) (C9), melilotic acid (3-(2-hydroxyphenyl) propanoic acid) (C9), phloretic acid (3-(4-hydroxy phenyl) propanoic acid) (C9), hydrocaffeic acid (3-(3,4-dihydroxyphenyl) propanoic acid) (C9), hydroferulic acid (3-(4-hydroxy-3-methoxy phenyl) propanoic acid) (C10), hydroisoferulic acid (3-(3-hydroxy-4-methoxy phenyl) propanoic acid) (C10), p-coumaric acid (3-(4-hydroxy phenyl) acrylic acid) (C9), umbellic acid (3-(2,4-dihydroxyphenyl) acrylic acid) (C9), caffeic acid (3-(3,4-dihydroxyphenyl) acrylic acid) (C9), ferulic acid (3-(4-hydroxy-3-methoxy phenyl) acrylic acid) (C10), isoferulic acid (3-(3-hydroxy-4-methoxy phenyl) acrylic acid) (C10), and sinapic acid (3-(4-hydroxy-3,5-dimethoxy phenyl) acrylic acid) (C11).

The cation component of (d) the salt of the acid may be any one of a metal ion, an ammonium ion and an organic cation. The metal ion includes monovalent metal ions such as sodium, potassium, lithium, silver and the like; divalent metal ions such as magnesium, calcium, zinc, barium, cadmium, copper, cobalt, nickel, manganese and the like; trivalent metal ions such as aluminum, iron and the like; and other ions such as tin, zirconium, titanium and the like. As the cation component of the salt of the carboxylic acid, zinc is preferable. The cation components may be used alone or as a mixture of at least two of them.

The organic cation includes a cation having a carbon chain. The organic cation includes, for example, without limitation, an organic ammonium ion. Examples of the organic ammonium ion are: primary ammonium ions such as stearyl ammonium ion, hexyl ammonium ion, oethyl ammonium ion, 2-ethyl hexyl ammonium ion or the like; secondary ammonium ions such as dodecyl (lauryl) ammonium ion, octadecyl (stearyl) ammonium ion or the like; tertiary ammonium ions such as trioctyl ammonium ion or the like; and quaternary ammonium ions such as dioctyldimethyl ammonium ion, distearyldimethyl ammonium ion or the like. Those organic cation may be used alone or as a mixture of at least two of them.

The content of (d) the acid and/or the salt thereof is preferably 1.0 part by mass or more, more preferably 1.5 parts by mass or more, even more preferably 2.0 parts by mass or more, and is preferably less than 40 parts by mass, more preferably 30 parts by mass or less, even more preferably 20 parts by mass or less. If the content is too little, the effect of adding (d) the acid and/or the salt thereof is not sufficient, and thus the hardness difference of the rubber layer may be small. If the content is too much, the resilience of the core may be lowered, since the hardness of the resultant rubber layer may be lowered as a whole.

There are cases where the surface of the zinc acrylate used as the co-crosslinking agent is treated with (d) the acid and/or the salt thereof to improve the dispersibility to the rubber. In the case of using zinc acrylate whose surface is treated with (d) the acid and/or the salt thereof, in the present invention, the amount of (d) the acid and/or the salt thereof used as a surface treating agent is not included in the content of (d) component. It is not conceivable that the (d) the acid and/or the salt thereof hardly contribute to the cation exchange reaction with (b) the co-crosslinking agent.

The content of (d) the acid and/or the salt thereof is preferably determined by the kind and the combination of the acid and/or the salt thereof to be used. Particularly, the content of (d) the acid and/or the salt thereof is preferably determined by the carbon number and the combination of the acid and/or the salt thereof. It is conceivable that the action of breaking the metal crosslinking is affected by the number of moles of the acid and/or the salt thereof to be added. Concurrently, the acid and/or the salt thereof acts as a plasticizer for the core layer. If the blending amount (mass) of the acid and/or the salt thereof to be added increases, the entire core layer is softened. This plasticizing effect is affected by the blending amount (mass) of the acid and/or the salt thereof to be added. In view of those actions, on the same blending amount (mass), the number of moles of the acid and/or the salt thereof to be added is made larger by using the acid and/or the salt thereof having less carbon atoms (small molecular weight) compared to using the acid and/or the salt thereof having larger carbon atoms (large molecular weight). That is, the acid and/or the salt thereof having less carbon atoms can enhance the effect of breaking the metal crosslinking, while suppressing softening the entire core layer by the plasticizing effect.

For example, if a carboxylic acid having 1 to 14 carbon atoms and/or a salt thereof is used as (d) the acid and/or the salt thereof, the content of the carboxylic acid having 1 to 14 carbon atoms and/or a salt thereof is preferably 1.0 part by mass or more, more preferably 1.5 parts by mass or more, even more preferably 2.0 parts by mass or more, and is preferably 20 parts by mass or less, more preferably 18 parts by mass or less, even more preferably 16 parts by mass or less with respect to 100 parts by mass of (a) the base rubber. The carbon number of the salt of the carboxylic acid having 1 to 14 carbon atoms is the carbon number of the carboxylic acid component, and the carbon number of the organic cation is not included.

For example, if a carboxylic acid having 15 to 30 carbon atoms and/or a salt thereof is used as (d) the acid and/or the salt thereof, the content of the carboxylic acid having 15 to 30 carbon atoms and/or the salt thereof is preferably 5 parts by mass or more, more preferably 6 parts by mass or more, even more preferably 7 parts by mass or more, and is preferably less than 40 parts by mass, more preferably 35 parts by mass or less, even more preferably 30 parts by mass or less with respect to 100 parts by mass of (a) the base rubber. The carbon number of the salt of the carboxylic acid having 15 to 30 carbon atoms is the carbon number of the carboxylic acid component, and the carbon number of the organic cation is not included.

If a carboxylic acid having 15 to 30 carbon atoms and/or a salt thereof is used as (d) the acid and/or the salt thereof, the content of the carboxylic acid having 15 to 30 carbon atoms and/or the salt thereof is preferably 10 parts by mass or more, more preferably 15 parts by mass or more, even more preferably 20 parts by mass or more, and is preferably less than 70 parts by mass, more preferably 60 parts by mass or less, even more preferably 50 parts by mass or less with respect to 100 parts by mass of (b) the α,β-unsaturated carboxylic acid having 3 to 8 carbon atoms and/or the metal salt thereof.

The rubber composition used in the present invention preferably further contains (e) an organic sulfur compound. By using (e) the organic sulfur compound and (d) the acid and/or the salt thereof in combination for the rubber composition, the hardness difference can be controlled, while maintaining approximate linearity of the hardness distribution of the rubber layer.

(e) The organic sulfur compound is not particularly limited, as long as it is an organic compound having a sulfur atom in the molecule thereof. Examples thereof include an organic compound having a thiol group (—SH), a polysulfide bond having 2 to 4 sulfur atoms (—S—S—, —S—S—S—, or —S—S—S—S—), or a metal salt thereof (—SM, —S-M-S—, —S-M-S—S—, —S—S-M-S—S—, —S-M-S—S—S—, or the like; M is a metal atom). Furthermore, (e) the organic sulfur compound may be any one of aliphatic compounds (aliphatic thiol, aliphatic thiocarboxylic acid, aliphatic dithiocarboxylic acid, aliphatic polysulfides, or the like), heterocyclic compounds, alicyclic compounds (alicyclic thiol, alicyclic thiocarboxylic acid, alicyclic dithiocarboxylic acid, alicyclic polysulfides, or the like), and aromatic compounds.

(e) The organic sulfur compound includes, for example, thiophenols, thionaphthols, polysulfides, thiocarboxylic acids, dithiocarboxylic acids, sulfenamides, thiurams, dithiocarbamates, and thiazoles. From the aspect of the larger hardness distribution of the spherical core, (e) the organic sulfur compound preferably includes, organic compounds having a thiol group (—SH) or a metal salt thereof, more preferably thiophenols, thionaphthols, or a metal salt thereof. Examples of the metal salts are salts of monovalent metals such as sodium, lithium, potassium, copper (I), and silver (I), and salts of divalent metals such as zinc, magnesium, calcium, strontium, barium, titanium (II), manganese (II), iron (II), cobalt (II), nickel(II), zirconium(II), and tin (II).

Examples of the thiophenols include thiophenol; thiophenols substituted with a fluoro group such as 4-fluorothiophenol, 2,5-difluorothiophenol, 2,4,5-trifluorothiophenol, 2,4,5,6-tetrafluorothiophenol, pentafluorothiophenol; thiophenols substituted with a chloro group such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol, pentachlorothiophenol; thiophenols substituted with a bromo group such as 4-bromothiophenol, 2,5-dibromothiophenol, 2,4,5-tribromothiophenol, 2,4,5,6-tetrabromothiophenol, pentabromothiophenol; thiophenols substituted with a iodo group such as 4-iodothiophenol, 2,5-diiodothiophenol, 2,4,5-triiodothiophenol, 2,4,5,6-tetraiodothiophenol, pentaiodothiophenol; or a metal salt thereof. The metal salt is preferably zinc salt.

Examples of the thionaphthols are 2-thionaphthol, 1-thionaphthol, 2-chloro-1-thionaphthol, 2-bromo-1-thionaphthol, 2-fluoro-1-thionaphthol, 2-cyano-1-thionaphthol, 2-acetyl-1-thionaphthol, 1-chloro-2-thionaphthol, 1-bromo-2-thionaphthol, 1-fluoro-2-thionaphthol, 1-cyano-2-thionaphthol, and 1-acetyl-2-thionaphthol and metal salts thereof. Preferable examples include 1-thionaphthol, 2-thionaphthol and zinc salt thereof.

The sulfenamide based organic sulfur compound includes, for example, N-cyclohexyl-2-benzothiazole sulfenamide, N-oxydiethylene-2-benzothiazole sulfenamide, and N-t-butyl-2-benzothiazole sulfenamide. The thiuram based organic sulfur compound includes, for example, tetramethylthiuram monosulfide, tetramethylthiuram disulfide, tetraethylthiuram disulfide, tetrabutylthiuram disulfide, and dipentamethylenethiuram tetrasulfide. The dithiocarbamates include, for example, zinc dimethyldithiocarbamate, zinc diethyldithiocarbamate, zinc dibutyldithiocarbamate, zinc ethylphenyl dithiocarbamate, sodium dimethyldithiocarbamate, sodium diethyldithiocarbamate, copper (II) dimethyldithiocarbate, iron (III) dimethyldithiocarbamate, selenium diethyldithiocarbamate, and tellurium diethyldithiocarbamate. The thiazole based organic sulfur compound includes, for example, 2-mercaptobenzothiazole (MBT), dibenzothiazyl disulfide (MBTS), sodium salt, zinc salt, copper salt, or cyclohexylamine salt of 2-mercaptobenzothiazole, 2-(2,4-dinitrophenyl) mercaptobenzothiazole, and 2-(2,6-diethyl-4-morpholinothio) benzothiazole. (e) The organic sulfur compounds may be used alone or as a mixture of at least two of them.

The content of (e) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the content of (e) the organic sulfur compound is less than 0.05 part by mass, the effect of adding (e) the organic sulfur compound cannot be obtained and thus the resilience may not improve. If the content of (e) the organic sulfur compound exceeds 5.0 parts by mass, the compression deformation amount of the obtained golf ball becomes large and thus the resilience may be lowered.

The rubber composition used in the present invention can include additives such as a pigment, a filler for adjusting weight or the like, an antioxidant, a peptizing agent, and a softener where necessary. Further, as described above, if the rubber composition used in the present invention contains only (b1) the $\alpha,\beta$-unsaturated carboxylic acid having 3 to 8 carbon atoms as a co-crosslinking agent, the rubber composition preferably contains (f) the metal compound.

(f) The metal compound is not limited, as long as it can neutralize (b1) the $\alpha,\beta$-unsaturated carboxylic acid having 3 to 8 carbon atoms in the rubber composition. Examples of (f) the metal compounds are metal hydroxides such as magnesium hydroxide, zinc hydroxide, calcium hydroxide, sodium hydroxide, lithium hydroxide, potassium hydroxide, copper hydroxide, and the like; metal oxides such as magnesium oxide, calcium oxide, zinc oxide, copper oxide, and the like; metal carbonates such as magnesium carbonate, zinc carbonate, calcium carbonate, sodium carbonate, lithium carbonate, potassium carbonate, and the like. From the aspect of reacting with (b1) the $\alpha,\beta$-unsaturated carboxylic acid having 3 to 8 carbon atoms as the co-crosslinking agent to form a metal crosslinking, (f) the metal compound preferably includes a divalent metal compound, more preferably includes a zinc compound. Use of the zinc compound provides a golf ball with excellent resilience. (f) The metal compound may be used alone or as a mixture of at least two of them. The content of (f) the metal compound is preferably determined in accordance with the mole number of the carboxyl group of (b) the $\alpha,\beta$-unsaturated carboxylic acid having 3 to 8 carbon atoms as well as the desired degree of neutralization.

Examples of the pigment blended in the rubber composition include a white pigment, a blue pigment, and a purple pigment. As the white pigment, titanium oxide is preferably used. The type of titanium oxide is not particularly limited, but rutile type is preferably used because of the high opacity. The blending amount of titanium oxide is preferably 0.5 part by mass or more, and more preferably 2 parts by mass or more, and is preferably 8 parts by mass or less, and more preferably 5 parts by mass or less, with respect to 100 parts by mass of (a) the base rubber.

It is also preferred that the rubber composition contains both a white pigment and a blue pigment. The blue pigment is blended in order to cause white color to be vivid, and examples thereof include ultramarine blue, cobalt blue, and phthalocyanine blue. Examples of the purple pigment include anthraquinone violet, dioxazine violet, and methyl violet.

The blending amount of the blue pigment is preferably 0.001 part by mass or more, and more preferably 0.05 part by mass or more, and is preferably 0.2 part by mass or less, and more preferably 0.1 part by mass or less, with respect to 100 parts by mass of (a) the base rubber. If the blending amount of the blue pigment is less than 0.001 part by mass, blueness is insufficient, and the color looks yellowish. If the blending amount of the blue pigment exceeds 0.2 part by mass, blueness is excessively strong, and a vivid white appearance is not provided.

The filler blended in the rubber composition is used as a weight adjusting agent for mainly adjusting the weight of the golf ball obtained as an final product. The filler may be blended where necessary. The filler includes, for example, inorganic fillers such as zinc oxide, barium sulfate, calcium carbonate, magnesium oxide, tungsten powder, molybdenum powder, or the like. The filler more preferably includes zinc oxide. It is considered that zinc oxide functions as a vulcanization aid to enhance the hardness of the whole core. The content of the filler is preferably 0.5 part by mass or more, more preferably 1 part by mass or more, and is preferably 30 parts by mass or less, more preferably 25 parts by mass or less, even more preferably 20 parts by mass or less. If the content of the filler is less than 0.5 part by mass, it is difficult to adjust the weight, while if the content of the filler exceeds 30 parts by mass, the weight ratio of the rubber component becomes small and thus the resilience tends to be lowered.

The blending amount of the antioxidant is preferably 0.1 part by mass or more and 1 part by mass or less, with respect to 100 parts by mass of (a) the base rubber. In addition, the blending amount of the peptizing agent is preferably 0.1 part by mass or more and 5 parts by mass or less, with respect to 100 parts by mass of (a) the base rubber.

In the spherical core of the present invention, layers other than the rubber layer having the linear hardness distribution may be formed from a publicly known core composition. The publicly known core composition includes a rubber composition or a resin composition. The rubber composition preferably includes materials such as (a) the base rubber, (b) the co-crosslinking agent, (c) the crosslinking initiator, (f) the organic sulfur compound, (e) the metal compound, the filler, the antioxidant, and the peptizing agent which are used for the rubber layer having the linear hardness distribution. The resin composition may include materials for the intermediate layer and the cover which will be described later.

An intermediate layer composition containing a resin component is preferably used for the intermediate layer of the golf ball of the present invention. Examples of the resin component include ionomer resins, styrene block-containing thermoplastic elastomers, thermoplastic polyurethane elastomers, thermoplastic polyamide elastomers, thermoplastic polyester elastomers and thermoplastic polyolefin elastomers, and thermoplastic styrene elastomers. Among these, ionomer resins are preferred as the resin component. Ionomer resins have high elastic modulus.

An ionomer resin and another resin may be used in combination. In this case, from the aspect of the resilience performance, the ionomer resin is the principal component of the resin component. The content of the ionomer resin in the resin component is preferably 50 mass % or more, more preferably 70 mass % or more, and even more preferably 85 mass % or more.

The ionomer resin includes a product prepared by neutralizing at least a part of carboxyl groups in the binary copolymer composed of an olefin and an $\alpha,\beta$-unsaturated carboxylic acid having 3 to 8 carbon atoms with a metal ion, a product prepared by neutralizing at least a part of carboxyl groups in the ternary copolymer composed of an olefin, an $\alpha,\beta$-unsaturated carboxylic acid having 3 to 8 carbon atoms, and an $\alpha,\beta$-unsaturated carboxylic acid ester with a metal ion, or a mixture of those. The olefin preferably includes an olefin having 2 to 8 carbon atoms. Examples of the olefin are ethylene, propylene, butene, pentene, hexene, heptene, and octene. The olefin more preferably includes ethylene. Examples of the α,β-unsaturated carboxylic acid having 3 to 8 carbon atoms are acrylic acid, methacrylic acid, fumaric acid, maleic acid and crotonic acid. Of these, acrylic acid and methacrylic acid are particularly preferred. Examples of the α,β-unsaturated carboxylic acid ester include methyl ester, ethyl ester, propyl ester, n-butyl ester, isobutyl ester of acrylic acid, methacrylic acid, fumaric acid, maleic acid or the like. In particular, acrylic acid ester and methacrylic acid ester are preferable. Of these, the ionomer resin preferably includes the metal ion-neutralized product of the binary copolymer composed of ethylene-(meth)acrylic acid and the metal ion-neutralized product of the ternary copolymer composed of ethylene, (meth)acrylic acid, and (meth)acrylic acid ester.

Specific examples of the ionomer resins include trade name "Himilan (registered trademark) (e.g. the binary copolymerized ionomer such as Himilan 1555 (Na), Himilan 1557 (Zn), Himilan 1605 (Na), Himilan 1706 (Zn), Himilan 1707 (Na), Himilan AM3711 (Mg); and the ternary copolymerized ionomer such as Himilan 1856 (Na), Himilan 1855 (Zn))" commercially available from Du Pont-Mitsui Polychemicals Co., Ltd.

Further, examples include "Surlyn (registered trademark) (e.g. the binary copolymerized ionomer such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and the ternary copolymerized ionomer such as Surlyn 8120 (Na), Surlyn 8320 (Na), Surlyn 9320 (Zn), Surlyn 6320 (Mg), HPF 1000 (Mg), HPF 2000 (Mg))" commercially available from E.I. du Pont de Nemours and Company.

Further, examples include "Iotek (registered trademark) (e.g. the binary copolymerized ionomer such as Iotek 8000 (Na), Iotek 8030 (Na), Iotek 7010 (Zn), Iotek 7030 (Zn); and the ternary copolymerized ionomer such as Iotek 7510 (Zn), Iotek 7520 (Zn))" commercially available from ExxonMobil Chemical Corporation. It is noted that Na, Zn, Li, and Mg described in the parentheses after the trade names indicate metal types of neutralizing metal ions for the ionomer resins. The above ionomer resins may be used solely or as a mixture of two or more of them.

Examples of the thermoplastic styrene elastomer include "Rabalon (registered trademark)" available from Mitsubishi Chemical Corporation.

In the present invention, the intermediate layer composition may further contain a pigment component such as a white pigment (for example, titanium oxide), a blue pigment, and a red pigment; a weight adjusting agent such as zinc oxide, calcium carbonate, and barium sulfate; a dispersant; an antioxidant; an ultraviolet absorber; a light stabilizer; a fluorescent material or a fluorescent brightener; and the like, as long as they do not impair the effect of the present invention.

The golf ball of the present invention may comprise a reinforcing layer disposed between the intermediate layer and the cover. The reinforcing layer is preferably formed between the intermediate layer and the cover, especially in the case that the intermediate layer is formed from an intermediate layer composition containing a base resin and the cover composition containing a base resin, and that the base resins contained in the intermediate layer and the cover are different each other (for example, the intermediate layer composition contains an ionomer resin as the base resin and the cover composition contains the thermoplastic polyurethane as the base resin).

The reinforcing layer is formed from a reinforcing layer composition containing a resin component. As the resin component, a two-component curing type thermosetting resin is preferably used. Example of two-component curing type thermosetting resin include epoxy resins, urethane resins, acrylic resins, polyester resins and cellulose resins. From the aspect of the strength and durability of the reinforcing layer, two-component curing type epoxy resins and two-component curing type urethane resins are preferred.

The reinforcing layer composition may include additives such as a coloring agent (for example, titanium dioxide), a phosphoric acid-based stabilizer, an antioxidant, a light stabilizer, a fluorescent brightener, an ultraviolet absorber, an anti-blocking agent and the like. The additives may be added to either the base material or the curing agent of the two-component curing thermosetting resin.

The cover of the golf ball of the present invention is formed from a cover composition containing a resin component. Examples of the resin components include an ionomer resin, a thermoplastic polyamide elastomer having a trade name "Pebax (registered trademark) (e.g. "Pebax 2533")" commercially available from Arkema Inc., a thermoplastic polyester elastomer having a trade name "Hytrel (registered trademark) (e.g. "Hytrel 3548" and "Hytrel 4047")" commercially available from Du Pont-Toray Co., Ltd., a thermoplastic polyurethane elastomer having a trade name "Elastollan (registered trademark)" commercially available from BASF Japan Ltd., a thermoplastic styrene elastomer having a trade name "Rabalon (registered trademark)" commercially available from Mitsubishi Chemical Corporation, and the like. These resin components may be used alone or in combination of two or more thereof.

The cover composition constituting the cover of the golf ball of the present invention preferably contains the thermoplastic polyurethane as a resin component. The content of the thermoplastic polyurethane in the resin component of the cover composition is preferably 50 mass % or more, more preferably 60 mass % or more, even more preferably 70 mass % or more.

The cover composition may contain a pigment component such as a white pigment (for example, titanium oxide), a blue pigment, a red pigment, or the like, a specific gravity adjusting agent such as zinc oxide, calcium carbonate, barium sulfate, or the like, a dispersant, an antioxidant, an ultraviolet absorber, a light stabilizer, a fluorescent material or a fluorescent brightener, or the like as long as they do not impair the performance of the cover.

The amount of the white pigment (for example, titanium oxide) is preferably 0.5 part or more, more preferably 1 part or more, and the content of the white pigment is preferably 10 parts or less, more preferably 8 parts or less, with respect to 100 parts of the resin component constituting the cover by mass. If the amount of the white pigment is 0.5 part by mass or more, it is possible to impart the opacity to the resultant cover. Further, if the amount of the white pigment is more than 10 parts by mass, the durability of the resultant cover may deteriorate.

(3) Method of Manufacturing Golf Ball

The rubber composition used in the present invention is obtained by mixing and kneading (a) the base rubber, (b) the α,β-unsaturated carboxylic acid having 3 to 8 carbon atoms and/or the metal salt thereof, (c) the crosslinking initiator, and (d) the acid and/or the salt thereof, if necessary other additive agents. The kneading can be conducted, without any limitation, with a publicly known kneading machine such as a kneading roll, a banbury mixer, a kneader, or the like.

When the spherical core of the golf ball of the present invention is formed from the rubber composition, the spherical core can be obtained by molding the rubber composition after kneaded. The temperature for molding the spherical core is preferably 120° C. or more, more preferably 150° C. or more, even more preferably 160° C. or more, and is preferably 170° C. or less. If the molding temperature exceeds 170° C., the surface hardness of the core tends to decrease. The molding pressure preferably ranges from 2.9 MPa to 11.8 MPa. The molding time preferably ranges from 10 minutes to 60 minutes. The inner core layer can be obtained in a similar way.

A method for molding the outer core layer includes, for example, an embodiment which comprises molding the outer core layer composition into a hollow-shell, covering the inner core with a plurality of the hollow-shells and subjecting the inner core with a plurality of the hollow shells to the compression-molding (preferably an embodiment which comprises molding the rubber composition into a half hollow-shell, covering the inner core with the two half hollow-shells, and subjecting the inner core with the two half hollow-shells to the compression-molding). The compression-molding of the rubber composition into a half shell can be carried out, for example, under a pressure of 1 MPa or more and 100 MPa or less at a molding temperature of 10° C. or more and 60° C. or less. A method for molding the outer core layer using the half shells includes, for example, compression molding the inner core layer covered with the two half shells. The compression molding of half shells into the outer core layer can be carried out, for example, under a pressure of 1 MPa or more and 100 MPa or less at a molding temperature of 140° C. or more and 180° C. or less. By performing the molding under the above conditions, the outer core layer having a uniform thickness can be formed.

A method for molding an intermediate layer or a cover is not particularly limited, and includes an embodiment which comprises injection molding the intermediate layer composition or the cover composition directly onto the core or the core formed with the intermediate layer, or an embodiment which comprises molding the intermediate layer composition or the cover composition into a hollow-shell, covering the core or the core formed with the intermediate layer with a plurality of the hollow-shells and subjecting to the compression-molding (preferably an embodiment which comprises molding the intermediate layer composition or the cover composition into a half hollow-shell, covering the core or the core formed with the intermediate layer with the two half hollow-shells, and subjecting to the compression-molding).

When molding the intermediate layer or the cover in a compression molding method, molding of the half shell can be performed by either compression molding method or injection molding method, and the compression molding method is preferred. The compression-molding of the intermediate layer composition or cover composition into half shell can be carried out, for example, under a pressure of 1 MPa or more and 20 MPa or less at a molding temperature of −20° C. or more and 70° C. or less relative to the flow beginning temperature of the intermediate layer composition or the cover composition. By performing the molding under the above conditions, a half shell having a uniform thickness can be formed. The compression molding of half shells into the intermediate layer or cover can be carried out, for example, under a molding pressure of 0.5 MPa or more and 25 MPa or less at a molding temperature of −20° C. or more and 70° C. or less relative to the flow beginning temperature of the intermediate layer composition or the cover composition. By performing the molding under the above conditions, a golf ball cover having a uniform thickness can be formed.

In the case of directly injection molding the intermediate layer composition or the cover composition, the intermediate layer composition or the cover composition extruded in the pellet form beforehand may be used for injection molding or the materials such as the base resin components and the pigment may be dry blended, followed by directly injection molding the blended material. It is preferred to use upper and lower molds having a spherical cavity and pimples, wherein a part of the pimples also serves as a retractable hold pin. When molding the intermediate layer or cover by injection molding, the hold pin is protruded, the core is placed in, held with the hold pin, and the intermediate layer composition or the cover composition which has been heated and melted is charged and then cooled to obtain a cover. For example, it is preferred that the intermediate layer composition or the cover composition heated and melted at the temperature ranging from 200° C. to 250° C. is charged into molds clamped under the pressure of 9 MPa to 15 MPa for 0.5 to 5 seconds, and after cooling for 10 to 60 seconds, the molds are opened.

After the cover is molded, the golf ball body is ejected from the molds, and where necessary the golf ball body is preferably subjected to surface treatments such as deburring, cleaning, and sandblast. If desired, a paint film or a mark may be formed.

(4) Regarding Coefficient of Friction of Golf Ball

The golf ball of the present invention comprises a golf ball body and a paint film formed on a surface of the golf ball body, and has a coefficient of friction calculated using a contact force tester of 0.35 or more and 0.60 or less. The golf ball having the coefficient of friction calculated using a contact force tester of 0.35 or more and 0.60 or less has high controllability on approach shots around the greens.

In the present invention, the coefficient of the friction calculated using the contact force tester is a coefficient of friction between a golf ball and a collisional plate when the golf ball collides with the collisional plate disposed inclined at a predetermined angle to a flying direction of the golf ball. By using the contact force tester, a time function $Fn(t)$ of contact force in the direction perpendicular to the collisional plate and a time function $Ft(t)$ of contact force in the direction parallel to the collisional plate are concurrently measured; and a maximum value of a time function $M(t)$ which is a ratio of $Ft(t)$ to $Fn(t)$ represented by the following equation is defined as a coefficient of friction.

$$M(t)=Ft(t)/Fn(t)$$

Figure 10:
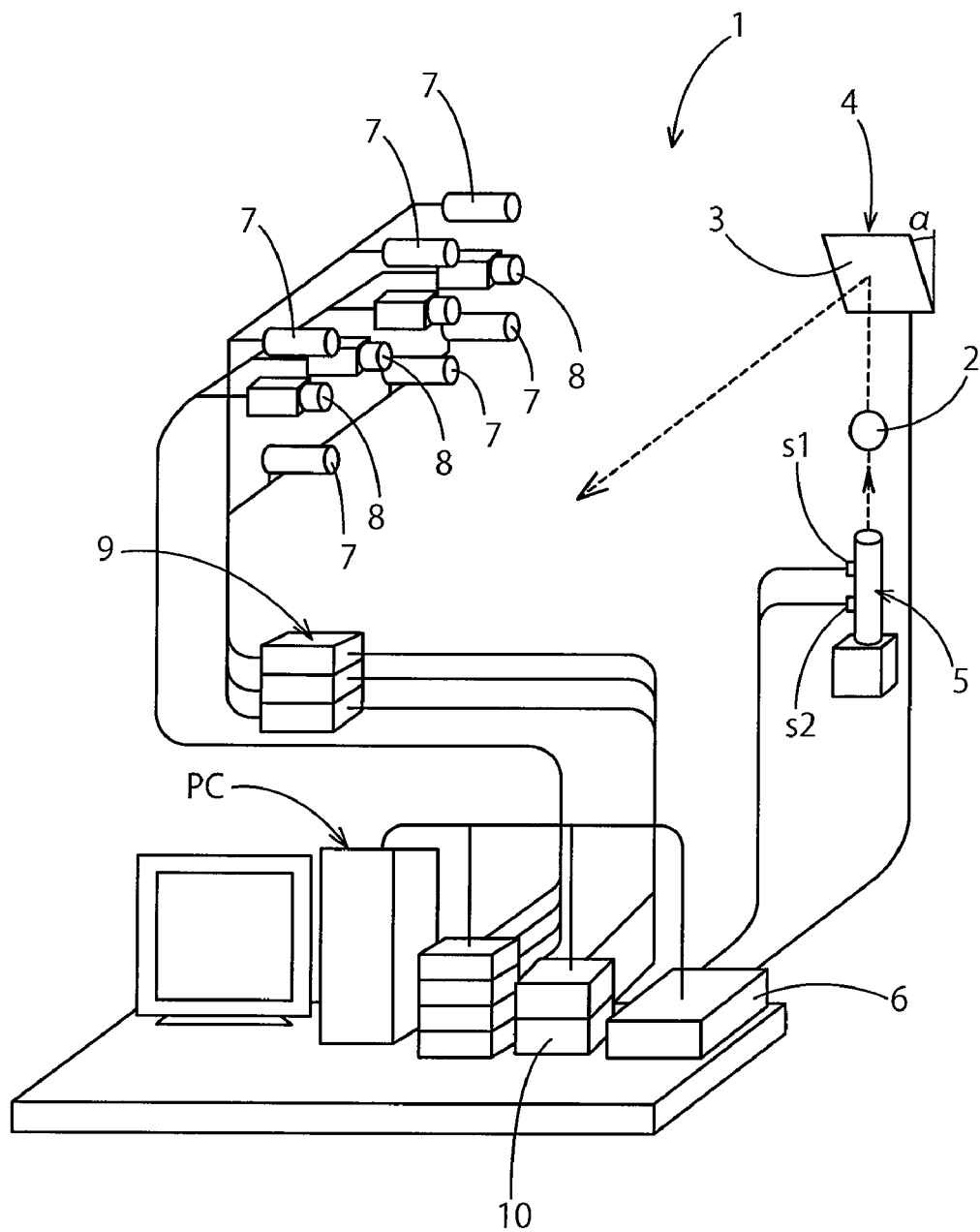
FIG. 10 is a schematic view of a contact force tester used in the present invention.
Figure 11:
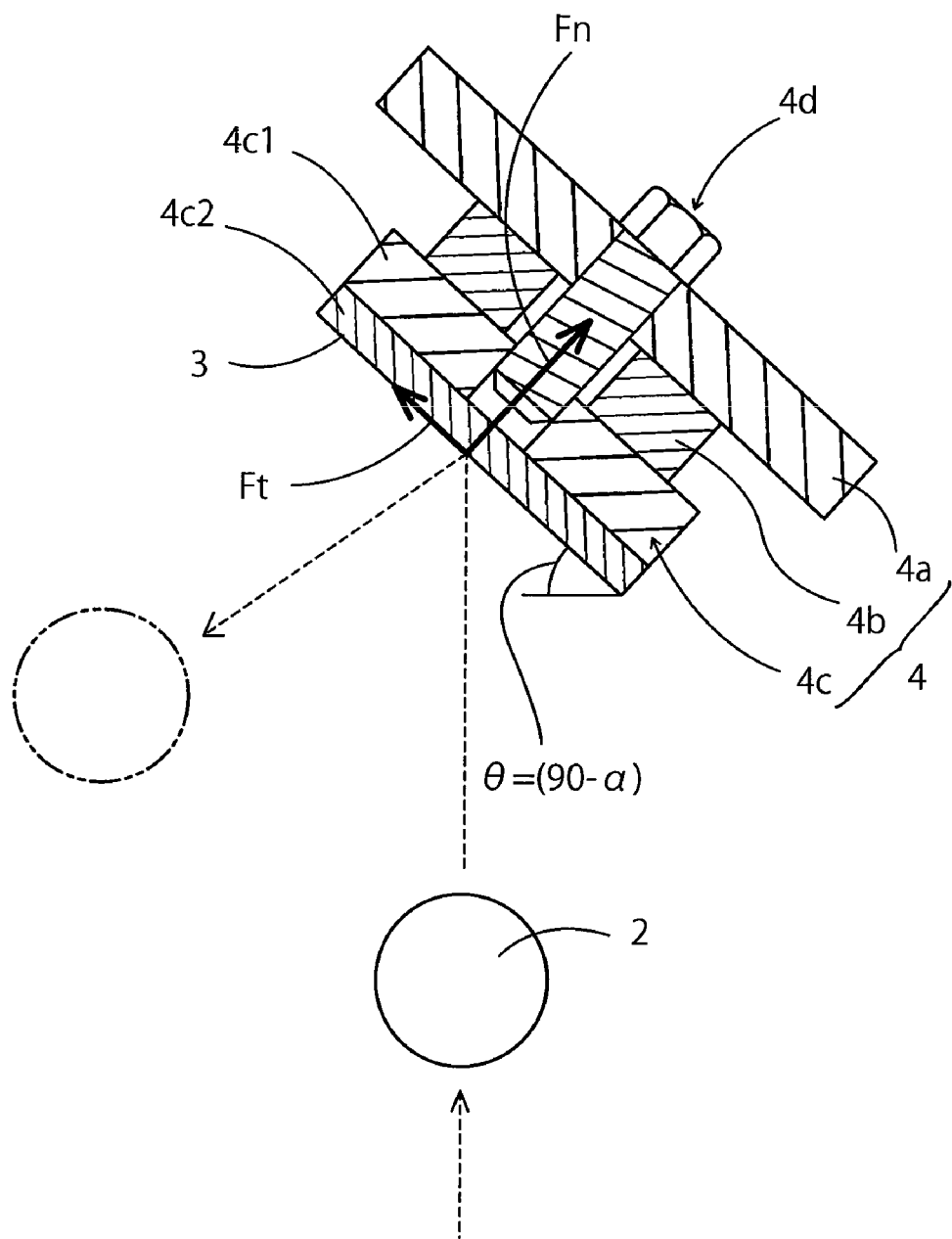
FIG. 11 is a partially enlarged cross-sectional view of a collisional plate of the contact force tester.

The method of calculating the friction coefficient of the present invention will be described based on FIGS. 10 to 12. FIG. 10 is a contact force tester for measuring a coefficient of friction and spin rate. FIG. 11 is an enlarged cross-sectional view of a collisional plate 4 that a golf ball collides with.

The contact force tester 1 makes pseudo conditions of hitting a golf ball with a club face, and enables to measure various forces at that time. The contact force tester 1 includes a launcher 5 that launches a golf ball 2 in an upward and perpendicular direction and a collisional plate 4 that is positioned on the upper side of the launched golf ball 2. The collisional plate 4 has a striking face 3 that the golf ball 2 collides with.

Since a distance between the launcher 5 and the striking face 3 is relatively short, an initial velocity of the golf ball 2 corresponds to a collision velocity. This collision velocity corresponds to a head speed of a club head in an actual golf swing. In view of this point, the collision velocity of the golf ball 2 to the striking face 3 may fall within the range from about 10 m/s to 50 m/s. In the present invention, from the aspect of the head speed of approach shots, the initial velocity is set to 19 m/s.

The desired value of the initial velocity of the golf ball 2 is set by the volume of a controller 6. Based on a distance between a first sensor S1 and a second sensor S2 which are provided in the launcher 5 and a time difference between interrupting these sensors, the controller 6 calculates the actually measured value of the initial velocity of the golf ball 2, and outputs the value to a computer device PC.

FIG. 11 shows a partially enlarged cross-sectional view of the collisional plate 4. The collisional plate 4 can incline the striking face 3 at a predetermined angle α to the launching direction (flying direction) of the golf ball 2. In the present invention, an angle θ that is obtained by subtracting the angle α from 90 degree is defined as a collisional angle. This collisional angle θ corresponds to a loft angle of a club face (not shown) in an actual swing. Further, in consideration of the loft angle of a golf club, the collisional angle can be set to more than one value (for example, 15°, 20°, 35°) in the range from 10° to 90°, and the measurement of the contact force, which will be described later, can be conducted at each angle. In the present invention, the collisional angle θ is made 55° in order to recreate the spin rate on approach shots.

The collisional plate 4 has a base plate 4a formed of a metal plate material, a superficial plate 4c with the striking face 3, and a pressure sensor 4b interposed therebetween, and they are fixed to one another with a bolt 4d integrally.

The base plate 4a may be formed of any material without particular limitation, as long as it has a predetermined strength and rigidity, but preferably formed of steel. The base plate 4a preferably has a thickness in a range from 5.0 mm to 20.0 mm. A model number of the main bolt 4d is, for example, M10 according to Japanese Industrial Standards (JIS).

As the pressure sensor 4b, for example, a 3-component force sensor is preferably used. The sensor 4b measures, at least, a perpendicular force Fn in a direction perpendicular to the striking face 3, and a shear force Ft in a direction parallel to the striking face 3 (the direction of the sole side toward the crown side in a club face) as time-series data. The measurement of the force is conducted by connecting a charge amplifier to the pressure sensor 4b.

As the pressure sensor 4b, a variety of products may be used, for example, a 3-component force sensor (model 9067) manufactured by Kistler Instrument Corp is preferably used. This sensor enables to measure force components in a parallel direction, a Y direction and a perpendicular direction. Although not illustrated, the measurement of the pressure is conducted with a charge amplifier (model 5011B of Kistler Instrument Corp.) connected to the pressure sensor 4b. The pressure sensor 4b is formed in its center with a through-hole through which the main bolt 4d is inserted to integrally fix the pressure sensor 4b with the base plate 4a.

The superficial plate 4c is composed of the main body 4c1 and a superficial material 4c2 which is disposed outside the main body 4c1 to provide the striking face 3 and has an area which is large enough to collide with the golf ball 2. These are firmly fixed with a bolt which is not illustrated in a detachable manner. Accordingly, by appropriately changing the material, planner shape and/or surface structure of the superficial material 4c2, it is possible to create approximate models of various kinds of club faces and to measure the contact force thereof.

The main body 4c1 may be formed of any materials without limitation, but typically of stainless steel (SUS-630). The thickness of the main body 4c1 is typically in the range from 10 mm to 20 mm. Also, the main body 4c1 may have a planner shape which is substantially the same with that of the pressure sensor 4b, such as a square 40 mm to 60 mm on a side. Into the main body 4c1, one end of the main bolt 4d is screwed. As a result, the pressure sensor 4b is interposed between the base plate 4a and the main body 4c1, and the position thereof is fixed.

As to the superficial material 4c2 which provides the striking face 3 of the collisional plate 4, various materials, planner shapes and surface structures may be adopted, however, the superficial material 4c2 is preferably formed of the same material as the face (not shown) of the golf club head which is subject to an analysis. In the present invention, in view of evaluation of model of approach shots, stainless SUS-431 which is the same material as the head material of CG-15 manufactured by Cleveland Golf is used as the superficial material 4c2. The thickness of the superficial material 4c2 may be arbitrarily changed, for example, within the range of 1.0 mm to 5.0 mm. The planner shape of the superficial material 4c2 is substantially the same with that of the main body 4c1, for example, a square 40 mm to 60 mm on a side.

The contact force tester 1 includes a strobe device 7 and a high speed type camera device 8 which can take a photograph of the collision between the golf ball 2 and the striking face 3 and the golf ball 2 that rebounds from the striking face 3. The strobe device 7 is connected to a strobe power 9. The camera device 8 is connected to a camera power 10 via a capacitor box. The imaged data is memorized in the computer device PC. By including these devices, a slipping velocity at the time of the collision between the golf ball 2 and the striking face 3 which will be explained later, a contact area, and an initial launch speed, a flying angle (launch angle) and a backspin rate of a golf ball can be measured.

Figure 12:
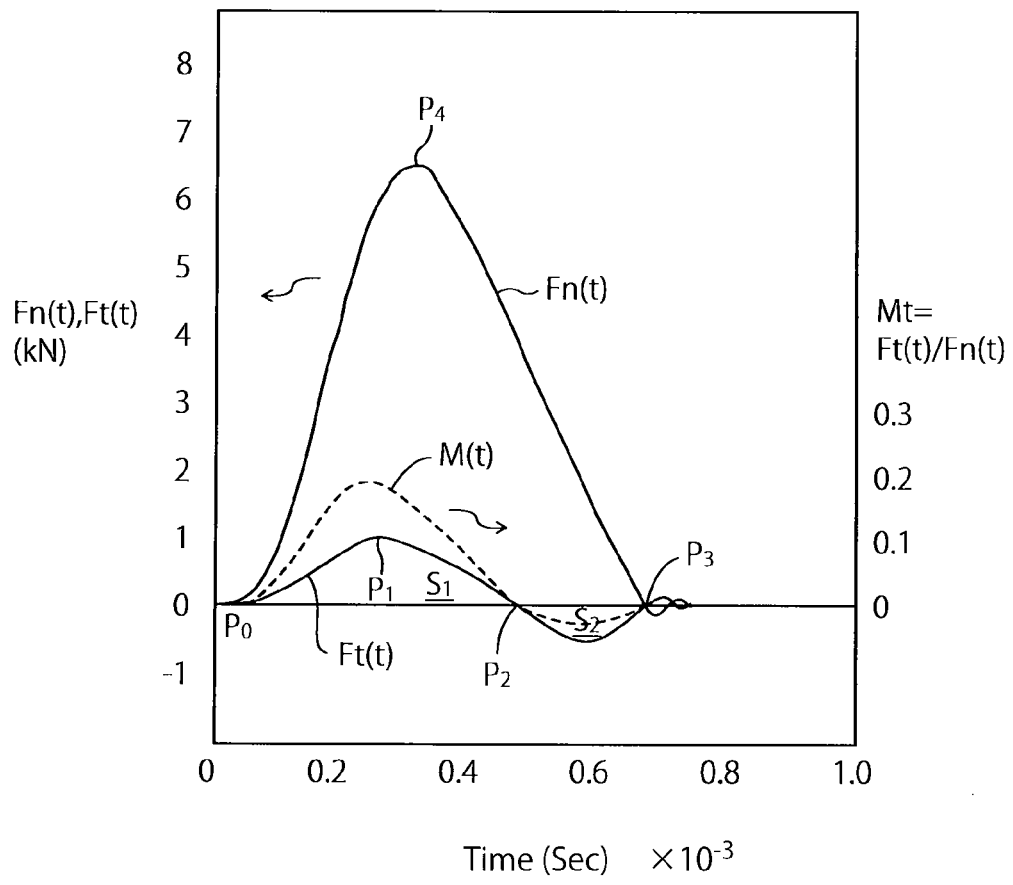
FIG. 12 is a graph illustrating Ft(t), Fn(t), and M(t)

FIG. 12 shows the time history of the perpendicular force Fn and the shear force Ft applied to the striking face 3 at the time of the collision by the golf ball 2 and measured by the contact force tester 1 under a specific condition.

FIG. 12 is a graph illustrating an example of Fn(t) and Ft(t) measured by the tester shown in FIGS. 10 and 11. In FIG. 12, a point P0 represents a position where the pressure sensor 4b starts sensing force, and generally corresponds to the point at which the collisional plate 3 and the golf ball 2 come into collision with each other. Fn(t) which is a perpendicular component of the contact force gradually increases from the point P0, peaks at a point P4, comes down therefrom to reach zero at a point P3. The point P3 represents a point where the pressure sensor 4b no longer senses force, and generally corresponds to the point where the golf ball 2 leaves the collisional plate 3.

On the other hand, a value of Ft(t) which is a parallel component of the contact force to the collisional plate (i.e., shear strength) increases with time from the point P0, peaks at the point P1, then gradually decreases to zero at the point P2 after which it takes a negative value. Since the golf ball leaves the pressure sensor 4b at the point P3, the curve of Ft(t) sensed by the pressure sensor 4b takes zero at the point P3. An area S1 of the region where Ft(t) takes positive values within the area surrounded by the curve of Ft(t) and the time axis represents impulse where shear strength is positive. On the other hand, an area S2 of the region where Ft(t) takes negative values within the area surrounded by the curve of Ft(t) and the time axis represents impulse where the shear strength is negative. Impulse S1 acts in such a direction that promotes the back spin, and impulse S2 acts in such a direction that suppresses the back spin. Here, impulse S1 takes a large value than impulse S2, and a value obtained by subtracting impulse S2 from impulse S1 contributes to back spin of a golf ball.

A coefficient of friction can be obtained by calculating a maximum value of M(t) which is expressed by Ft(t)/Fn(t).

In the present invention, the coefficient of friction is preferably 0.35 or more, more preferably 0.37 or more, even more preferably 0.39 or more, and is preferably 0.60 or less, more preferably 0.56 or less, even more preferably 0.54 or less. If the coefficient of friction is within the above range, a spin rate on approach shots becomes good.

The golf ball of the present invention includes a golf ball body and a paint film formed on a surface of the golf ball body. From the aspect of obtaining a golf ball having a coefficient of friction calculated using the contact force tester of 0.35 or more and 0.60 or less, a base resin constituting the paint film preferably includes a polyurethane obtained by a reaction between a polyol and two or more polyisocyanates. The coefficient of friction can be controlled by choosing appropriately kinds and mixing ratio of the poly and the polyisocyanates.

Examples of the polyol include a low molecular weight polyol having a molecular weight of less than 500 and a high molecular weight polyol having an average molecular weight of 500 or more. Examples of the low molecular weight polyol are a diol such as ethylene glycol, diethylene glycol, triethylene glycol, 1,3-butanediol, 1,4-butanediol, neopentyl glycol, 1,6-hexanediol; and a triol such as glycerin, trimethylol propane, and hexane triol. Examples of the high-molecular weight polyol include a polyether polyol such as polyoxyethylene glycol (PEG), polyoxypropylene glycol (PPG), and polyoxytetramethylene glycol (PTMG); a condensed polyester polyol such as polyethylene adipate (PEA), polybutylene adipate (PBA), and polyhexamethylene adipate (PHMA); a lactone polyester polyol such as poly-c-caprolactone (PCL); a polycarbonate polyol such as polyhexamethylene carbonate; a urethane polyol; and an acrylic polyol. The above polyol may be used solely or in combination of at least two of them.

In the present invention, as the polyol component, preferably used is a urethane polyol. The urethane polyol is a compound having a plurality of urethane bonds in the molecule thereof, and having at least two hydroxyl groups in the molecule thereof. The urethane polyol is, for example, a urethane prepolymer, which is obtained by a reaction between a polyisocyanate component and a polyol component, under a condition that the hydroxyl groups of the polyol component is excessive to the isocyanate groups of the polyisocyanate component.

The polyisocyanate component constituting the urethane polyol is not limited, as long as it has at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI). The polyisocyanate may be used solely or in combination of at least two of them.

As the polyol component constituting the urethane polyol, the compounds exemplified as the polyol can be used. In the present invention, preferred is the polyol component including a triol component and diol component as the polyol component constituting the urethane polyol. The triol component preferably includes trimethylolpropane. The diol component preferably includes polytetramethylene ether glycol. A mixing ratio (triol component/diol component) of the triol component to the diol component is preferably 0.2 or more, more preferably 0.5 or more, and is preferably 6.0 or less, more preferably 5.0 or less in a mass ratio.

The acrylic polyol is an acrylic resin or acrylic polymer having a plurality of hydroxyl groups, and is obtained, for example, by copolymerizing a (meth)acrylic monomer having a hydroxyl group and a (meth)acrylic monomer having no hydroxyl group.

Examples of the (meth)acrylic monomer having a hydroxyl group include (meth)acrylic acid esters having a hydroxyl group, such as 2-hydroxyethyl (meth)acrylate, 2-hydroxypropyl (meth)acrylate, 2-hydroxybutyl (meth) acrylate, alkylene glycol mono(meth)acrylate, and polyalkylene glycol mono(meth)acrylate. These (meth)acrylic monomers having a hydroxyl group may be used individually or in combination of two or more of them.

Examples of the (meth)acrylic monomer having no hydroxyl group include (meth)acrylic unsaturated carboxylic acids such as (meth)acrylic acid; (meth)acrylic acid ester such as methyl (meth)acrylate, ethyl (meth)acrylate, propyl (meth)acrylate, isopropyl (meth)acrylate, butyl (meth)acrylate, isobutyl (meth)acrylate, pentyl (meth)acrylate, hexyl (meth)acrylate, 2-ethylhexyl (meth)acrylate, cyclohexyl (meth)acrylate, octyl (meth)acrylate, and decyl (meth)acrylate; and another (meth)acrylic monomer such as (meth)acrylonitrile, and (meth)acrylamide. These (meth)acrylic monomers having no hydroxyl group may be used individually or in combination of two or more of them. In the present invention, the term "(meth)acrylic" means "acrylic" and/or "methacrylic."

Further, in addition to the (meth)acrylic monomer, the acrylic polyol may contain another monomer component which has a hydroxyl group and/or another monomer component which has no hydroxyl group, as long as they do not impair the effects of the present invention. Examples of another monomer component which has a hydroxyl group include unsaturated alcohols such as 3-methyl-3-butene-1-ol, 3-methyl-2-butene-1-ol, 2-methyl-3-butene-2-ol, 2-methyl-2-butene-1-ol, 2-methyl-3-butene-1-ol, and allyl alcohol. Examples of another monomer component which has no hydroxyl group include: aromatic vinyl compounds such as styrene and α-methyl styrene; and ethylenically unsaturated carboxylic acids such as maleic acid and itaconic acid. These other monomer components may be used individually or in combination of two or more of them.

The hydroxyl value of the polyol is preferably 10 mg KOH/g or more, and more preferably 15 mg KOH/g or more, and even more preferably 20 mg KOH/g or more, and is preferably 400 mg KOH/g or less, preferably 300 mg KOH/g or less, more preferably 200 mg KOH/g or less, even more preferably 170 mg KOH/g or less, and most preferably 160 mg KOH/g or less. If the hydroxyl value of the polyol component falls within the above range, the adhesion of the paint film to the golf ball body improves. In the present invention, the hydroxyl value can be measured by using, for example, an acetylization method, in accordance with JIS K 1557-1.

The weight average molecular weight of the polyol is preferably 500 or more, and more preferably 550 or more, and even more preferably 600 or more, and is preferably 150,000 or less, and more preferably 140,000 or less, and even more preferably 130,000 or less. If the weight average molecular weight of the polyol component falls within the above range, the water-resistance and impact-resistance of the paint film can be enhanced. The weight average molecular weight of the polyol component can be measured, for example, by gel permeation chromatography (GPC), using polystyrene as a standard material, tetrahydrofuran as an eluate, and an organic solvent system GPC columns (for example, by using "Shodex (registered trademark) KF series" available from Showa Denko K.K.).

Specific examples of the polyol component are 121 B available from Wayaku Paint Co.; Nippollan 800, Nippollan 1100 available from Nippon Polyurethane Industry Co., Ltd; Burnock D6-627, Burnock D8-436, Burnock D8-973, Burnock11-408 available from DIC Corporation; Desmophen 650 MPA, Desmophen 670, Desmophen 1150, Desmophen A160X available from Sumika Bayer Urethane Co., Ltd; Hariacron 2000, Hariacron 8500H available from Harima Chemicals, Inc; Polin #950, Polin #860 available from Shinto Paint Co., Ltd.

Next, two or more polyisocyanates will be described. As the polyisocyanate, for example, compounds having at least two isocyanate groups can be exemplified.

The polyisocyanate includes, for example, an aromatic polyisocyanate such as 2,4-tolylene diisocyanate, 2,6-tolylene diisocyanate, a mixture (TDI) of 2,4-tolylene diisocyanate and 2,6-tolylene diisocyanate, 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI) and para-phenylene diisocyanate (PPDI); and an alicyclic or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), norbornene diisocyanate (NBDI) and derivatives thereof.

Examples of the derivative of the polyisocyanate include: an isocyanurate of diisocyanate; an adduct obtained through a reaction between a diisocyanate and a low molecular weight triol such as trimethylolpropane or glycerin; an allophanate-modified product; and a biuret-modified product. It is preferable that a free diisocyanate is removed from the derivative of the polyisocyanate. One example of the allophanate-modified product is a trifunctional polyisocyanate which is obtained by further reacting a diisocyanate with a urethane bond formed through a reaction between a diisocyanate and a low molecular weight diol. The biuret-modified product is, for example, a trifunctional polyisocyanate which is represented by the following formula (1). The isocyanurate of diisocyanate is, for example, a trifunctional polyisocyanate which is represented by the following formula (2). In the formulae (1) and (2), R represents a residue where isocyanate groups are removed from the diisocyanate.

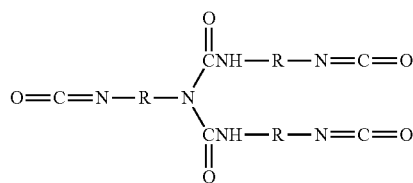
(1)

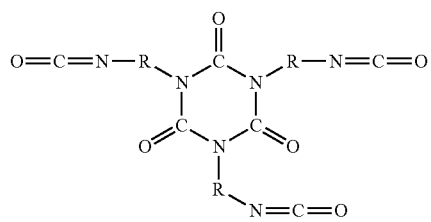
(2)

In the present invention, as the polyisocyanate, preferably used are a derivative of hexamethylene diisocyanate and a derivative of isophorone diisocyanate. As the derivative of hexamethylene diisocyanate, preferably used are a biuret-modified product and an isocyanurate of hexamethylene diisocyanate. As the derivative of isophorone diisocyanate, preferably used is an isocyanurate of isophorone diisocyanate.

A mixing ratio (HDI derivative/IPDI derivative) of the derivative of hexamethylene diisocyanate to the derivative of isophorone diisocyanate is preferably 80/20 to 50/50, and more preferably 65/35 to 55/45 in a mass ratio. A mixing ratio (biuret-modified product/isocyanurate) of the biuret-modified product of hexamethylene diisocyanate to the isocyanurate of hexamethylene diisocyanate is preferably 20/40 to 40/20, and more preferably 25/35 to 35/25 in a mass ratio.

The polyisocyanate preferably has an isocyanate content (NCO %) of 0.5 mass % or more, more preferably 1 mass % or more, even more preferably 2 mass % or more, and preferably has an isocyanate content (NCO %) of 45 mass % or less, more preferably 40 mass % or less, even more preferably 35 mass % or less. The isocyanate content (NCO %) of the polyisocyanate can be defined by the following expression.

$NCO$ (%)=100×[mole number of an isocyanate group in the polyisocyanate×42 (molecular weight of $NCO$)]/[total mass (g) of the polyisocyanate]

Specific examples of the polyisocyanate are Burnock D-800, Burnock DN-950, Burnock DN-955 available from DIC corporation; Desmodur N75MPA/X, Desmodur N3300, Desmodur L75 (C), Sumidur E21-1 available from Sumika Bayer Urethane CO., Ltd; Coronate HX, Coronate HK available from Nippon Polyurethane Industry Co., Ltd; Duranate 24A-100, Duranate 21S-75E, Duranate TPA-100, Durante TKA-100 available from Asahi Kasei Corporation; Vestanat T1890 available from Degussa.

In a reaction between the polyol and the two or more polyisocyanates, the molar ratio (NCO/OH) of the isocyanate group (NCO) of the polyisocyanate to the hydroxyl group (OH) of the polyol is preferably 0.1 or more, more preferably 0.2 or more. If the molar ratio (NCO/OH) is less than 0.1, the curing reaction may become insufficient. Further, if the molar ratio (NCO/OH) is too large, the amount of the isocyanate groups is excessive, and the appearance of the obtained paint film may deteriorate as well as the obtained paint film may be hard and fragile. Thus, the molar ratio (NOC/OH) is preferably 1.0 or less, more preferably 0.9 or less. The reason why the appearance of the obtained paint film deteriorates if the amount of the isocyanate group is excessive is that an excessive amount of isocyanate groups in the paint may promote a reaction between the moisture in the air and the isocyanate groups, thereby generating a lot of carbon dioxide gas.

The paint film of the golf ball of the present invention is preferably formed from a paint containing a polyol and two or more polyisocyanates. Preferable example of the paint is a so-called two-component curing type paint containing the polyol as a base material and the two or more polyisocyanates as a curing agent. The paint may be either a waterborne paint mainly containing water as a dispersion medium or a solvent-base paint mainly containing an organic solvent as a dispersion medium. In the case of the solvent-base paint, preferable solvents are, for example, toluene, isopropyl alcohol, xylene, methyl ethyl ketone, methyl isobutyl ketone, ethyleneglycol monomethyl ether, ethyl benzene, propyleneglycol monomethyl ether, isobutyl alcohol, and ethyl acetate.

The paint may further contain additives such as a filler, an ultraviolet absorber, an antioxidant, a light stabilizer, a fluorescent brightener, an anti-blocking agent, a leveling agent, a slip agent and a viscosity modifier, which are generally contained in the paint for a golf ball, where necessary.

Next, the applying method of the curing type polyurethane paint used in the present invention will be described. The method of applying the curing type polyurethane paint is not limited, and includes conventional methods, for example, spray coating method or electrostatic coating method.

In the case of applying the paint with the air gun, the polyol component and the polyisocyanate component may be fed with the respective pumps and continuously mixed through the line mixer located in the stream line just before the air gun, and the obtained mixture can be air-sprayed. Alternatively, the polyol component and the polyisocyanate component can be air-sprayed respectively with the spray gun having the device for controlling the mixing ratio thereof. The paint application may be conducted by spraying the paint one time or overspraying the paint multiple times.

The curing type polyurethane paint applied to the golf ball body is dried at the temperature ranging from 30° C. to 70° C. for 1 hour to 24 hours to form a paint film.

The thickness of the paint film after drying is preferably, without limitation, 5 µm or more, more preferably 6 µm or more, even more preferably 10 µm or more, most preferably 15 µm or more. If the thickness is less than 5 µm, the paint film is likely to wear off due to the continued use. Further, thickening the paint film increase the spin rate on approach shots. The thickness of the paint film is preferably less than 30 µm, more preferably less than 28 µm, and even more preferably less than 25 µm. If the thickness is 30 µm or more, the effect of the dimples is lowered, and thus the flying performance of the golf ball tends to be low. The thickness of the paint film can be measured, for example, by observing a cross section of the golf ball using a microscope (VHX-1000 available from Keyence Corporation). In the case of overpainting the paint, a total thickness of the whole paint films formed preferably falls within the above range.

In the present invention, the paint film formed on a surface of the golf ball body preferably has a martens hardness of 4.0 mgf/µm$^2$ or less, more preferably 3.5 mgf/µm$^2$ or less, even more preferably 3.0 mgf/µm$^2$ or less. The martens hardness can be measured by a later described method and is suitable for measuring a hardness in a micro region. If the martens hardness is 4.0 mgf/µm$^2$ or less, the paint film is soft enough to produce a high spin rate. There is no lower limit on the martens hardness, but the martens hardness is preferably 0.01 mgf/µm$^2$ or more. If the martens hardness is too low, the paint film is too soft and tacky.

The paint film preferably has a 100% elastic modulus of 240 kgf/cm$^2$ or less, more preferably 210 kgf/cm$^2$ or less. If the 100% elastic modulus is 240 kgf/cm$^2$ or less, the paint film is soft and the spin rate on approach shots increases. There is no lower limit on the 100% elastic modulus, but the 100% elastic modulus is preferably 15 kgf/cm$^2$ or more, more preferably 20 kgf/cm$^2$ or more. If the 100% elastic modulus is too low, the paint film becomes too soft and tacky. Thus, the feeling becomes bad.

The paint film preferably has a 50% elastic modulus of 10 kgf/cm$^2$ or more, more preferably 14 kgf/cm$^2$ or more. Making the paint film have the 50% elastic modulus of 10 kgf/cm$^2$ or more increase the spin rate on approach shots. There is no upper limit on the 50% elastic modulus, but the 50% elastic modulus is preferably 180 kgf/cm$^2$ or less, more preferably 150 kgf/cm$^2$ or less. If the 50% elastic modulus is too high, the paint film becomes too hard and the spin rate becomes low.

The paint film preferably has a 10% elastic modulus of 160 kgf/cm$^2$ or less, more preferably 130 kgf/cm$^2$ or less. If the 10% elastic modulus is 160 kgf/cm$^2$ or less, the paint film is soft and the spin rate on approach shots increases. There is no lower limit on the 10% elastic modulus, but the 10% elastic modulus is preferably 5 kgf/cm$^2$ or more, more preferably 10 kgf/cm$^2$ or more. If the 10% modulus is too low, the paint film becomes too soft and tacky. Thus, the feeling becomes bad.

EXAMPLES

Hereinafter, the present invention will be described in detail by way of example. The present invention is not limited to examples described below. Various changes and modifications can be made without departing from the spirit and scope of the present invention.

[Evaluation Methods]
(1) Slab Hardness (Shore D Hardness)

Sheets with a thickness of about 2 mm were produced by injection molding the intermediate layer composition and cover composition, and stored at 23° C. for two weeks. Three or more of these sheets were stacked on one another so as not to be affected by the measuring substrate on which the sheets were placed, and the hardness of the stack was measured with a type P1 auto loading durometer manufactured by Kobunshi Keiki Co., Ltd., provided with a Shore D type spring hardness tester prescribed in ASTM-D2240.

(2) Core Hardness Distribution (JIS-C Hardness)

The core hardness was measured by the following method. The core hardness was obtained by calculating the average of hardness measured at four points.

Spherical Core Surface Hardness (Hs) and Outer Core Layer Surface Hardness (Hs2).

A type P1 auto loading durometer manufactured by Kobunshi Keiki Co., Ltd., provided with a JIS-C type spring hardness tester was used. The JIS-C hardness measured at the surface of the spherical core and at the surface of the outer core layer were adopted as the surface hardness (Hs) of the spherical core and the surface hardness (Hs2) of the outer core layer, respectively.

Inner Core Layer Surface Hardness (Hs1)

The spherical core was cut into two hemispheres to obtain a cut plane. The surface hardness (Hs1) of the inner core layer is JIS-C hardness measured in the region surrounded by the following first and second circle on the cut plane. The first circle is defined by the boundary between the inner core layer and the outer core layer. The second circle is a concentric circle with the first circle and has a shorter radius than the first circle by 10% of the radius of the first circle. The radius of each circle is as follows.

Radius of the first circle: r1=radius of the first circle
Radius of the second circle: r2=r1×0.9

Outer Core Layer Innermost Point Hardness (Hb)

The spherical core was cut into two hemispheres to obtain a cut plane. The surface hardness (Hb) at the innermost point of the outer core layer is JIS-C hardness measured in the region surrounded by the following first and third circle on the cut plane. The first circle is defined by the boundary between the inner core layer and the outer core layer. The third circle is a concentric circle with the first circle and has a larger radius than the first circle by 10% of the thickness of the outer core layer. The radius of each circle is as follows.

Radius of the first circle: r1=radius of the first circle
Radius of the third circle: r3=r1+(thickness of the outer core layer)×0.1)

Inner Core Layer Central Hardness (Ho) and Hardness at Points of 12.5% to 87.5% in Outer Core Layer The spherical core was cut into two hemispheres to obtain a cut plane, and the JIS-C hardness measured at the central point of the inner core layer is defined as the central hardness (Ho) of the inner core layer. In addition, hardness was measured at predetermined distances from the boundary point between the inner core layer and the outer core layer.

(3) Compression Deformation Amount (mm)

A compression deformation amount of the core or golf ball (a shrinking amount of the core or golf ball in the compression direction thereof), when applying a load from an initial load of 98N to a final load of 1275N to the core or golf ball, was measured.

(4) Flight Distance (m) and Spin Rate (Rpm) on a Driver Shot

A titanium-head driver ("XXIO" manufactured by Dunlop sports, Shaft hardness: S, loft angle: 10°) was installed on a swing robot M/C manufactured by TRUETEMPER Sports, Inc. A golf ball was hit at a head speed of 45 m/sec, and the flight distance (the distance from the launch point to the stop point) and the spin rate immediately after hitting the golf ball were measured. This measurement was conducted ten times for each golf ball, and the average value was adopted as the measurement value for the golf ball. A sequence of photographs of the hit golf ball were taken for measuring the spin rate (rpm) immediately after hitting the golf ball.

(5) Spin Rate on Approach Shots

A sand wedge (CG15 forged wedge (52°), available from Cleveland Golf) was installed on a swing robot M/C manufactured by TRUETEMPER Sports, Inc. A golf ball was hit at a head speed of 21 m/sec, and a sequence of photographs of the hit golf balls were taken for measuring the spin rate (rpm). The measurement was conducted ten times for each golf ball, and the average value is adopted as the spin rate (rpm).

(6) Durability

A titanium-head W#1 driver ("XXIO" manufactured by Dunlop sports, Shaft hardness: S, loft angle: 10°) was installed on a swing robot M/C manufactured by TRUETEMPER CO, and the head speed was set to 45 m/sec. Each golf ball was stored in a constant temperature reservoir kept at the temperature of 23° C. for 12 hours. Immediately after taking each golf ball out of the reservoir, they were repeatedly hit with the driver. The number of hits required to break the golf ball was counted. This measurement was conducted by using twelve golf balls for each golf ball. The number of hits for golf ball No. 1 was defined as an index of 100, and the durability of each golf ball was represented by converting the number of hits for each golf ball into this index. A greater index value indicates that the durability of the golf ball is excellent.

(7) Measurement of Coefficient of Friction

A coefficient of friction of golf balls was measured using a contact force tester 1 shown in FIG. 10.

1. Specification of Measuring Apparatus (A) Launcher: air gun system (B) Collisional plate:

base plate 4a
  Steel
  Thickness: 5.35 mm
Superficial plate 4c
  Main body 4c1
    Size: 56 mm×56 mm×15 mm
    Stainless steel (SUS-630)
  Superficial material 4c2
    Size: 56 mm×56 mm×2.5 mm
    Metal composition: SUS-431
    Groove structure: see FIG. 13
Angle of inclination ($\alpha$)
  35 degrees (with respect to flying direction of golf ball)

(C) Pressure sensor 4b

A 3-component force sensor (model 9607) available from Kistler Instrument Corp.

Charge amplifier

Model 5011B available from Kistler Instrument Corp.

(D) Capture of contact force into PC

A pulse counter board PCI-6101 (manufactured by INTERFACE CORPORATION) was used. With a 16-bit PCI pulse counter board having 4 channels, measurement suited for a specific application may be realized in four counter modes. The maximum input frequency is 1 MHz.

Figure 13:
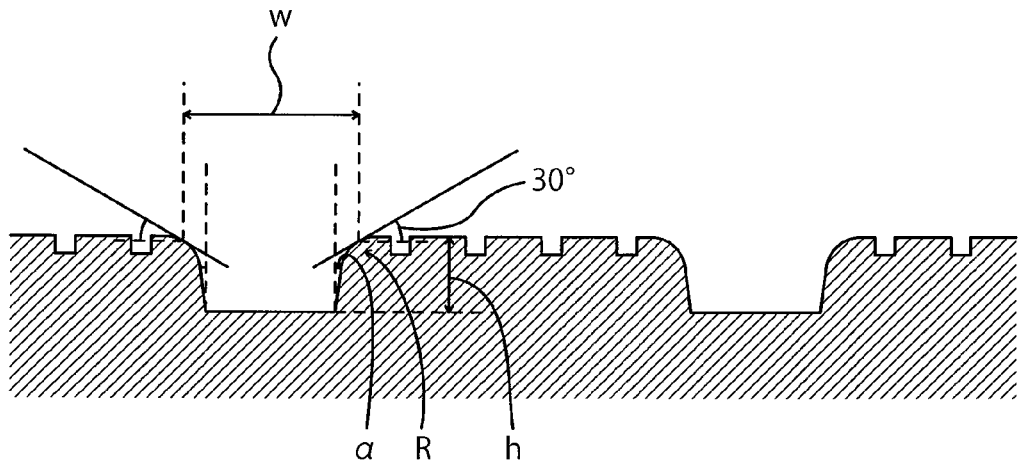
FIG. 13 is a cross-sectional view of a groove shape of a superficial material of the contact force tester.
Figure 13:
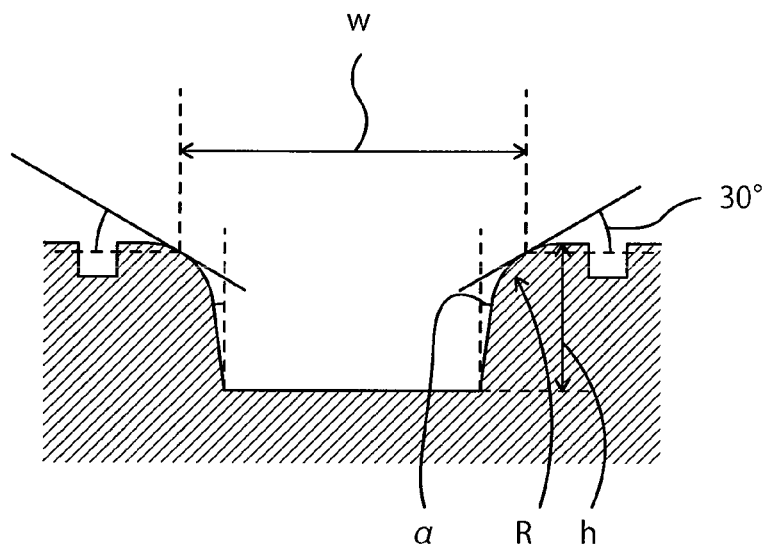

As shown in FIG. 13, the groove structure of a sand wedge CG-15 available from Cleveland Golf is reproduced on the striking face 3 of the collisional plate 4. As shown in FIG. 13 (a), on the striking face 3, large grooves (zip grooves) are formed, and a plurality of small grooves are formed on the surface between the large grooves (zip grooves). FIG. 13 (b) is an enlarged view of cross-section structure of the zip grooves. The dimensions of the zip grooves are as follow.

Zip groove (groove) width W: 0.70 mm
Zip groove (groove) depth h: 0.50 mm
Zip groove (groove) pitch: 3.56 mm
Zip groove (groove) angle $\alpha$: 10°
Zip groove shoulder R: 0.25

A plurality of small grooves between Zip grooves are formed by a laser-milling method so that the surface portion between Zip grooves have surface roughness Ra=2.40±0.8 μm and Rmax=14.0±8 μm. It is noted that the surface roughness Ra and Rmax can be measured with SJ-301 manufacture by Mitsutoyo Corporation under the conditions of the specimen length=2.5 mm and cut off value=2.5 mm.

2. Measuring Procedure

Measurement of a coefficient of friction was conducted in the following manner.

(a) Set the angle ($\alpha$) of the collisional plate at 35 degrees to the flying direction (vertical direction) of the golf ball.
(b) Adjust air pressure of the launcher 5.
(c) Launch the golf ball from the launcher.
(d) Measure the initial velocity of the golf ball from the preset distance between the sensor 1 and sensor 2 and the time difference between the times for the golf ball to interrupt the sensors 1 and 2.
(e) Measure the contact force Fn(t) and contact force Ft(t), and calculate maximum value of Ft(t)/Fn(t).
(f) Measure a spin rate of the golf ball with the strobe device and camera device.

3. Result of Measurement

Figure 14:
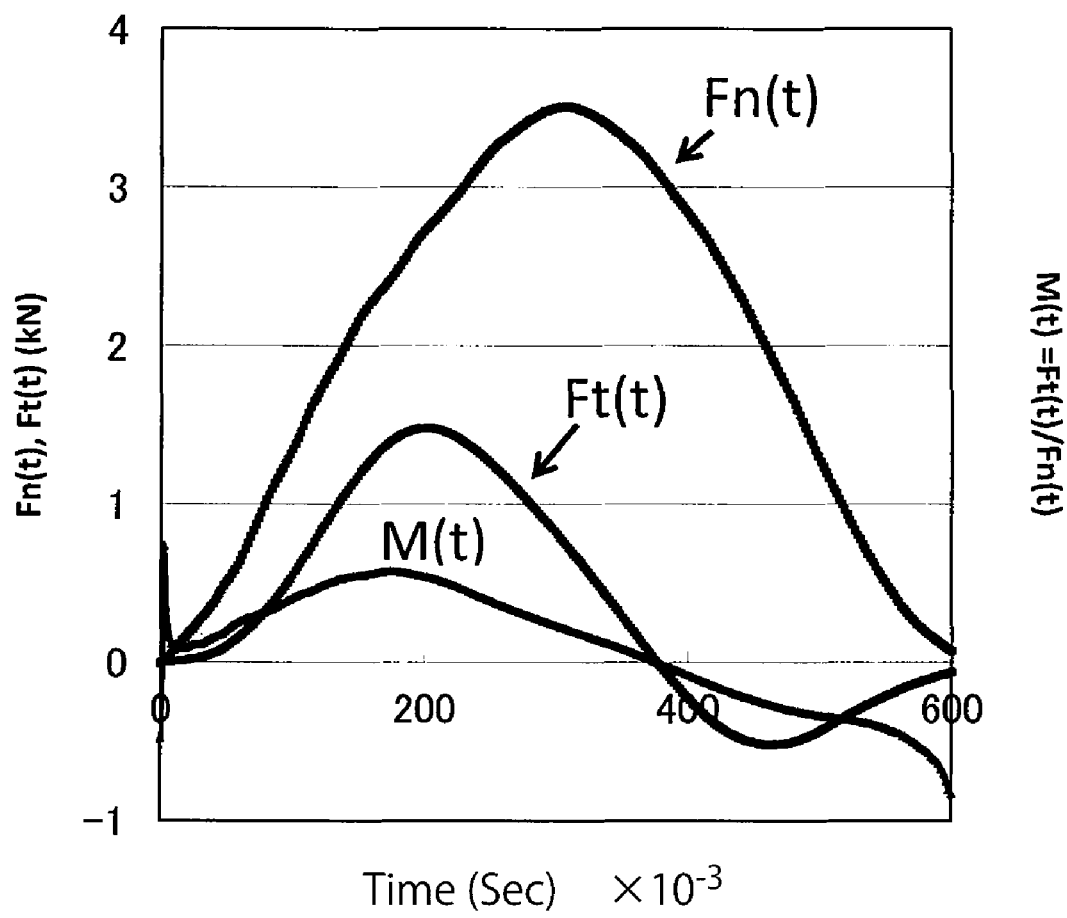
FIG. 14 is a graph illustrating Ft(t), Fn(t), and M(t)

An example of the results obtained with the tester in the above measuring procedure is shown in FIG. 14. From FIG. 14, a value of M(t) was calculated as Ft(t)/Fn(t), a maximum value was 0.58. Since noises tends to generate in initial period where contact force rises up and terminal period for measuring Ft and Fn, a maximum value of M(t) is calculated after trimming an early stage of the initial period and late stage of the terminal period.

(8) Martens Hardness of the Paint Film

The martens hardness was measured using Nano indenter "ENT-2100" available from ELIONIX. INC. The measuring conditions are as follows.

Load F: 20 mgf
Angle $\alpha$ of Berkovich indenter: 65.03°
Material of Berkovich indenter: $SiO_2$ Based on the depth (h) of indentation and angle ($\alpha$) of indenter, an area As(h) can be calculated by the following expression.

$$As(h) = 3 \times 3^{1/2} \times \tan \alpha / \cos \alpha \times h^2$$

Based on the load F and area As(h), the martens hardness can be calculated by the following expression.

$$\text{Martens Hardness} = F/As(h)$$

Measuring Sample: The base material and curing agent were blended to prepare a paint. The paint was dried and cured at 40° C. for 4 hours to prepare a paint film having a thickness of 100 μm. This paint film was used for the measurement of the martens hardness.

(9) Mechanical Properties of the Paint Film

The base material and curing agent were blended to prepare a paint. The paint was dried and cured at 40° C. for 4 hours to prepare a paint film. This paint film was punched out in a dumbbell shape to prepare test pieces. The mechanical properties of the paint film were measured using a tensile tester manufactured by SHIMAZU CORPORATION. The moduli at 10% elongation, 50% elongation and 100% elongation were calculated. In the case of blending an additive such as a filler, the mechanical properties of the paint film containing the additive were measured.

Thickness of Test piece: 0.05 mm
Crosshead Speed: 50 mm/min.

(10) Evaluation on Approach Shots from Around the Greens

A sand wedge (CG15 forged wedge (52°), available from Cleveland Golf) was installed on a swing robot M/C manufactured by TRUETEMPER Sports, Inc. A golf ball was hit at a head speed of 10 m/sec, and a sequence of photographs of the hit golf balls were taken for measuring the spin rate (rpm). The measurement was performed ten times for each golf ball, and the average value is adopted as the spin rate (rpm).

[Production of the Golf Ball]

(1) Production of Spherical Core Having a Single-Layered Structure

The rubber compositions having formulations shown in Table 3 were kneaded and pressed in upper and lower molds, each having a hemispherical cavity. The heat-pressing was conducted at a temperature of 170° C. for 25 minutes under a pressure of 10 MPa.

(2) Production of Spherical Core Having a Multi-Layer Structure

With respect to golf balls No. 37 and 38, the spherical cores having an inner core layer and an outer core layer covering the inner core layer were produced. The inner core layers were produced by the same production method as the spherical core having the single-layered structure. The outer core layer was produced as follows. The rubber composition was kneaded and molded into half shells. Molding of half shells was conducted by charging a pellet of the rubber composition into each of the depressed part of the lower mold for molding half shells, and applying pressure to mold half shells. Compression molding was conducted at the temperature of 30° C. for 1 minute under the molding pressure of 10 MPa. The inner core layers obtained above were covered with two half shells. The inner core layers covered with two half shells were placed in the molds composed of upper mold and lower mold each having a spherical cavity and heat-pressed to prepare the spherical cores consisting of the inner core layer and the outer core layer covering the inner core layer. The heat press was conducted at the temperature of 170° C. for 25 minutes under the molding pressure of 10 MPa. It is noted that the blending amount of barium sulfate was adjusted to make the golf ball have a mass of 45.6 g.

TABLE 3

| Rubber composition No. | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| Formulation (parts by mass) | BR-730 | 100 | 100 | 100 | 100 | 100 | 100 | 100 | 100 | 100 | 100 | 100 | 100 | 100 | 100 | 100 | 100 | 100 |
| | Sanceler SR | 30 | 34 | 34 | 34 | 35 | 36 | 37 | 31 | 32 | 34 | 35 | 36 | — | 33 | 18 | 36 | 40 |
| | ZN-DA90S | — | — | — | — | — | — | — | — | — | — | — | — | 30 | — | — | — | — |
| | Zinc oxide | 5 | 5 | 5 | 5 | 5 | 5 | 5 | 5 | 5 | 5 | 5 | 5 | 5 | 5 | 5 | 5 | 5 |
| | Barium sulfate | *1) | *1) | *1) | *1) | *1) | *1) | *1) | *1) | *1) | *1) | *1) | *1) | *1) | *1) | *1) | *1) | *1) |
| | 2-Thionaphthol | 0.2 | 0.2 | 0.2 | 0.2 | 0.2 | 0.2 | 0.2 | 0.2 | 0.2 | 0.2 | 0.2 | — | 0.2 | 0.2 | — | 0.2 | 0.2 |
| | Bispentabromophenyldisulfide | — | — | — | — | — | — | — | — | — | — | — | 0.3 | — | — | 0.3 | — | — |
| | Dicumyl peroxide | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 | 0.9 |
| | Zinc octanoate | — | 0.5 | 2 | 5 | 10 | 30 | 45 | — | — | — | — | 5 | 5 | 5 | — | — | 5 |
| | Zinc stearate | — | — | — | — | — | — | — | 10 | 20 | — | — | — | — | — | — | — | — |
| | Zinc myristate | — | — | — | — | — | — | — | — | — | 5 | 11 | — | — | — | — | — | — |

*1) As to an amount of barium sulfate, adjustment was made such that the golf ball had a mass of 45.6 g.

Raw materials used in Table 3 are as follows.

BR-730: a high-cis polybutadiene (cis-1,4 bond content=96 mass %, 1,2-vinyl bond content=1.3 mass %, Moony viscosity ($ML_{1+4}$ (100° C.)=55, molecular weight distribution (Mw/Mn)=3) available from JSR Corporation Sanceler SR: zinc acrylate (product of 10 mass % stearic acid coating) available from Sanshin Chemical Industry Co., Ltd.

ZN-DA90S: Zinc acrylate (product of 10 mass % zinc stearate coating) available from Sanshin Chemical Industry Co., Ltd.

Zinc oxide: "Ginrei R" manufactured by Toho Zinc Co., Ltd.

Barium sulfate: "Barium sulfate BD" manufactured by Sakai Chemical Industry Co., Ltd., adjustment was made such that the finally obtained golf ball had a mass of 45.6 g.

2-thionaphthol: manufactured by Tokyo Chemical Industry Co., Ltd.

Bispentabromophenyldisulfide: manufactured by Kawaguchi Chemical Industry Co., Ltd.

Dicumyl peroxide: "Percumyl (registered trademark) D" manufactured by NOF Corporation.

Zinc octanoate: manufactured by Mitsuwa Chemicals Co., Ltd.

Zinc stearate: manufactured by Wako Pure Chemical Industries, Ltd.

Zinc myristate: manufactured by Wako Pure Chemical Industries, Ltd.

(3) Preparation of Intermediate Layer Composition and Cover Composition

The blending materials shown in Tables 4 to 5 were mixed with a twin-screw kneading extruder to prepare an intermediate layer composition and cover composition in the form of pellet. Extrusion was conducted in the following conditions: screw diameter=45 mm; screw revolutions=200 rpm; and screw L/D=35. The mixtures were heated to a temperature in a range from 160° C. to 230° C. at a die position of the extruder.

TABLE 4

| | | Intermediate layer composition No. | |
|---|---|---|---|
| | | a | b |
| Formulation (parts by mass) | Surlyn 8945 | 55 | 45 |
| | Himilan AM7329 | 45 | 45 |
| | Rabalon T3221C | — | 10 |
| | Titanium dioxide | 3 | 3 |
| Slab hardness (Shore D) | | 65 | 56 |

TABLE 5

| | | Cover composition No. | | | |
|---|---|---|---|---|---|
| | | A | B | C | D |
| Formulation (parts by mass) | Elastollan NY82A | 100 | — | — | — |
| | Elastollan NY85A | — | 50 | — | — |
| | Elastollan NY90A | — | 50 | — | — |
| | Elastollan NY97A | — | — | 100 | — |
| | Surlyn 8945 | — | — | — | 40 |
| | Himilan AM7329 | — | — | — | 55 |
| | Rabalon T3221C | — | — | — | 5 |
| | Tinuvin 770 | 0.2 | 0.2 | 0.2 | 0.2 |
| | Titanium dioxide | 4 | 4 | 4 | 4 |
| | Ultramarine blue | 0.04 | 0.04 | 0.04 | 0.04 |
| Slab hardness (Shore D) | | 29 | 36 | 47 | 60 |

Raw materials used in Tables 4 and 5 are as follows.

Surlyn 8945: a sodium ion neutralized ethylene-methacrylic acid copolymer ionomer resin available from E.I. du Pont de Nemours and Company.

Himilan AM7329: a zinc ion neutralized ethylene-methacrylic acid copolymer ionomer resin available from Du Pont-Mitsui Polychemicals Co., Ltd.

Rabalon T3221C: Styrene elastomer available from Mitsubishi Chemical Corporation.

Elastollan NY82A: Polyurethane elastomer available from BASF Japan Co.

Elastollan NY85A: Polyurethane elastomer available from BASF Japan Co.

Elastollan NY90A: Polyurethane elastomer available from BASF Japan Co.

Elastollan NY97A: Polyurethane elastomer available from BASF Japan Co.

Titanium dioxide: A220 manufacture by Ishihara Sangyo Kaisha, Ltd.

Tinuvin 770: a hindered amine stabilizer available from BSFA Japan Ltd.

(4) Production of Golf Ball Body

The intermediate layer compositions obtained above were injection-molded onto the spherical centers to form the intermediate layers. When molding the intermediate layer, the hold pins were protruded, the cores were placed in the molds and held with the protruded hold pins, the intermediate layer compositions heated at 260° C. was charged into the molds clamped at a pressure of 80 tons within 0.3 seconds, and cooled for 30 seconds. Then, the molds were opened, and the spheres covered with the intermediate layer were ejected.

The reinforcing layer is formed by applying a two-component curing type thermosetting resin to the molded intermediate layer. As the two-component curing type thermosetting resin, a paint composition including a two-component curing type epoxy resin as a base polymer was used. The base material liquid of this paint composition includes 30 parts by mass of a bisphenol A type solid epoxy resin and 70 parts by mass of a solvent. The curing agent liquid of this paint composition includes 40 parts by mass of a modified polyamide amine, 5 parts by mass of titanium oxide, and 55 parts by mass of a solvent. The mass ratio of the base material liquid to the curing agent liquid is 1/1. This paint composition was applied to the surface of the intermediate layer with a spray gun, and maintained at 23° C. for 12 hours to obtain a reinforcing layer with a thickness of 6 μm.

Compression molding of half shells was conducted by, charging one pellet of the cover composition obtained as described above into each of depressed parts of lower molds for molding half shells, and applying pressure to mold half shells. Compression molding was conducted at a temperature of 160° C. for 2 minutes under a molding pressure of 11 MPa.

The spherical cores formed with the intermediate layer and the reinforcing layer were covered with the two half shells in a concentric manner, placed in the molds having a plurality of pimples on the surface of the cavity thereof. Compression molding was conducted at a temperature of 150° C. for 3 minutes under a molding pressure of 13 MPa. The molded cover was formed with a plurality of dimples which have inverted shape of the pimples. The pattern of dimples were shown in tables 6 to 8, and tables 9 to 11.

TABLE 6

| Dimple pattern | Kinds | Number | Diameter Dm (mm) | Depth Dp (mm) | Curvature CR (mm) | Volume (mm³) |
|---|---|---|---|---|---|---|
| D1 | A | 16 | 4.600 | 0.135 | 19.66 | 1.123 |
| | B | 30 | 4.500 | 0.135 | 18.82 | 1.075 |
| | C | 30 | 4.400 | 0.135 | 17.99 | 1.028 |
| | D | 150 | 4.300 | 0.135 | 17.19 | 0.982 |
| | E | 30 | 4.200 | 0.135 | 16.40 | 0.936 |
| | F | 66 | 4.100 | 0.135 | 15.63 | 0.892 |
| | G | 10 | 3.800 | 0.135 | 13.44 | 0.767 |
| | H | 12 | 3.400 | 0.135 | 10.77 | 0.614 |
| D2 | A | 28 | 4.500 | 0.135 | 18.82 | 1.075 |
| | B | 122 | 4.400 | 0.135 | 17.99 | 1.028 |
| | C | 100 | 4.300 | 0.135 | 17.19 | 0.982 |
| | D | 74 | 4.150 | 0.135 | 16.01 | 0.914 |
| D3 | A | 252 | 4.300 | 0.135 | 17.19 | 0.982 |
| | B | 70 | 4.100 | 0.135 | 15.63 | 0.892 |
| | C | 2 | 3.600 | 0.135 | 12.07 | 0.688 |
| D4 | A | 132 | 4.720 | 0.135 | 20.70 | 1.182 |
| | B | 18 | 4.520 | 0.135 | 18.98 | 1.084 |
| | C | 28 | 4.420 | 0.135 | 18.16 | 1.037 |
| | D | 54 | 4.320 | 0.135 | 17.35 | 0.991 |
| | E | 68 | 4.120 | 0.135 | 15.78 | 0.901 |
| | F | 6 | 3.620 | 0.135 | 12.20 | 0.696 |
| | G | 16 | 3.320 | 0.135 | 10.27 | 0.586 |

TABLE 7

| Dimple pattern | Kinds | Number | Diameter Dm (mm) | Depth Dp (mm) | Curvature CR (mm) | Volume (mm³) |
|---|---|---|---|---|---|---|
| D5 | A | 8 | 4.800 | 0.135 | 21.40 | 1.223 |
| | B | 18 | 4.600 | 0.135 | 19.66 | 1.123 |
| | C | 32 | 4.500 | 0.135 | 18.82 | 1.075 |
| | D | 34 | 4.400 | 0.135 | 17.99 | 1.028 |
| | E | 166 | 4.300 | 0.135 | 17.19 | 0.982 |
| | F | 18 | 4.200 | 0.135 | 16.40 | 0.936 |
| | G | 46 | 4.100 | 0.135 | 15.63 | 0.892 |
| | H | 22 | 3.200 | 0.135 | 9.55 | 0.544 |
| D6 | A | 252 | 4.300 | 0.135 | 17.19 | 0.982 |
| | B | 70 | 4.050 | 0.135 | 15.26 | 0.871 |
| | C | 2 | 3.200 | 0.135 | 9.55 | 0.544 |
| D7 | A | 172 | 4.300 | 0.135 | 17.19 | 0.982 |
| | B | 150 | 4.210 | 0.135 | 16.48 | 0.941 |
| | C | 2 | 3.800 | 0.135 | 13.44 | 0.767 |

TABLE 8

| Dimple pattern | Kinds | Number | Diameter Dm (mm) | Depth Dp (mm) | Curvature CR (mm) | Volume (mm³) |
|---|---|---|---|---|---|---|
| D8 | A | 26 | 4.500 | 0.142 | 17.90 | 1.131 |
|  | B | 88 | 4.400 | 0.142 | 17.11 | 1.081 |
|  | C | 102 | 4.300 | 0.142 | 16.35 | 1.033 |
|  | D | 94 | 4.100 | 0.142 | 14.87 | 0.939 |
|  | E | 14 | 3.600 | 0.142 | 11.48 | 0.724 |
| D9 | A | 60 | 4.100 | 0.145 | 14.56 | 0.959 |
|  | B | 84 | 4.000 | 0.144 | 13.96 | 0.906 |
|  | C | 216 | 3.900 | 0.141 | 13.55 | 0.844 |
| D10 | A | 40 | 4.650 | 0.146 | 18.59 | 1.241 |
|  | B | 70 | 4.550 | 0.146 | 17.80 | 1.189 |
|  | C | 40 | 4.450 | 0.146 | 17.03 | 1.137 |
|  | D | 110 | 4.300 | 0.146 | 15.90 | 1.062 |
|  | E | 20 | 4.150 | 0.146 | 14.82 | 0.989 |
|  | F | 40 | 3.900 | 0.146 | 13.10 | 0.874 |
|  | G | 12 | 2.850 | 0.146 | 7.03 | 0.467 |
| D11 | A | 108 | 4.500 | 0.135 | 18.82 | 1.075 |
|  | B | 78 | 4.400 | 0.135 | 17.99 | 1.028 |
|  | C | 20 | 4.300 | 0.135 | 17.19 | 0.982 |
|  | D | 100 | 4.100 | 0.135 | 15.63 | 0.892 |
|  | E | 18 | 3.600 | 0.135 | 12.07 | 0.688 |
| D12 | A | 92 | 4.700 | 0.135 | 20.52 | 1.172 |
|  | B | 28 | 4.500 | 0.135 | 18.82 | 1.075 |
|  | C | 42 | 4.400 | 0.135 | 17.99 | 1.028 |
|  | D | 34 | 4.300 | 0.135 | 17.19 | 0.982 |
|  | E | 98 | 4.100 | 0.135 | 15.63 | 0.892 |
|  | F | 28 | 3.630 | 0.135 | 12.27 | 0.700 |
|  | G | 10 | 3.100 | 0.135 | 8.97 | 0.511 |

TABLE 9

Figure 2:
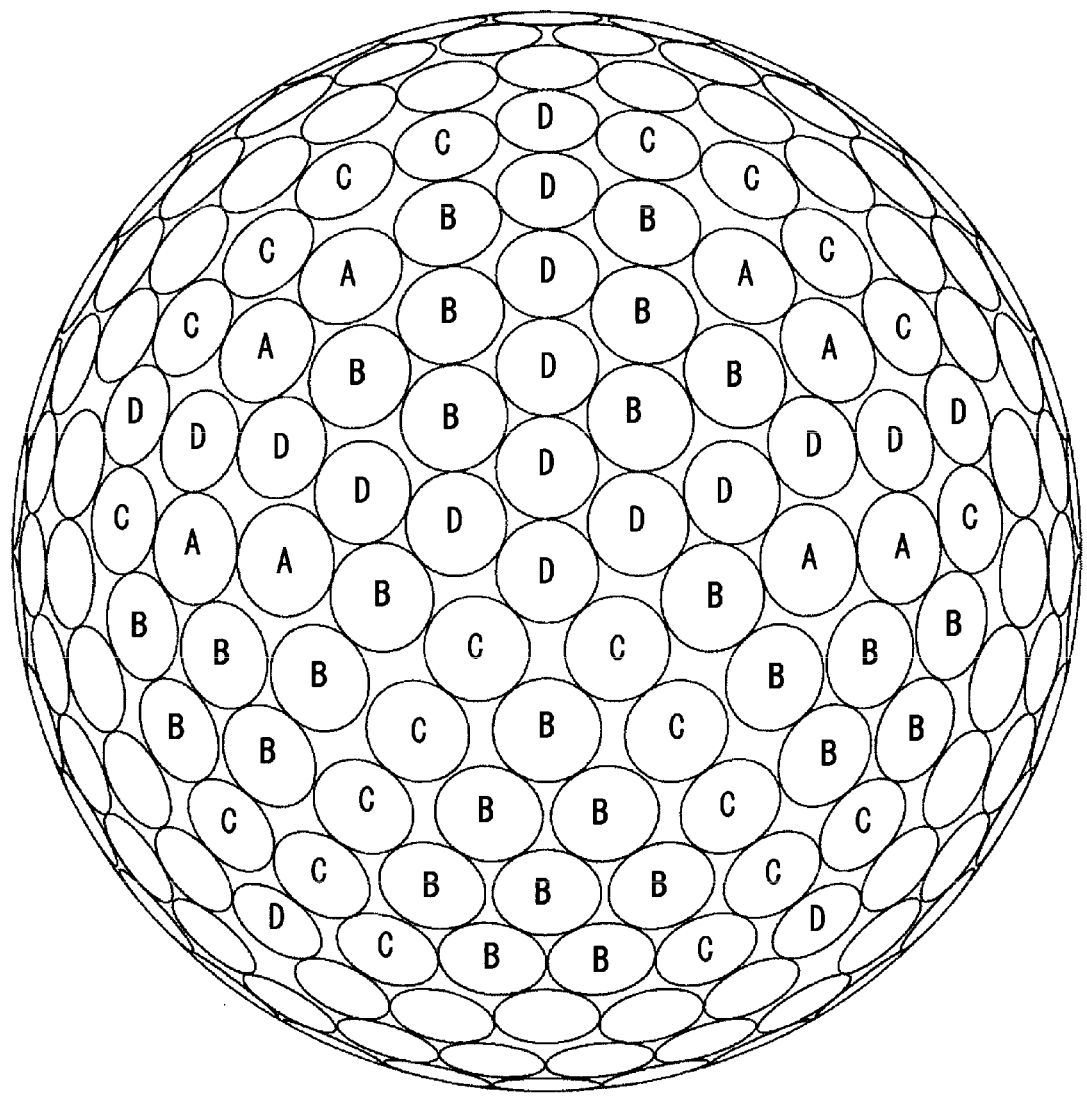
FIG. 2 is a top plan view illustrating the golf ball having the dimple pattern D2.
Figure 3:
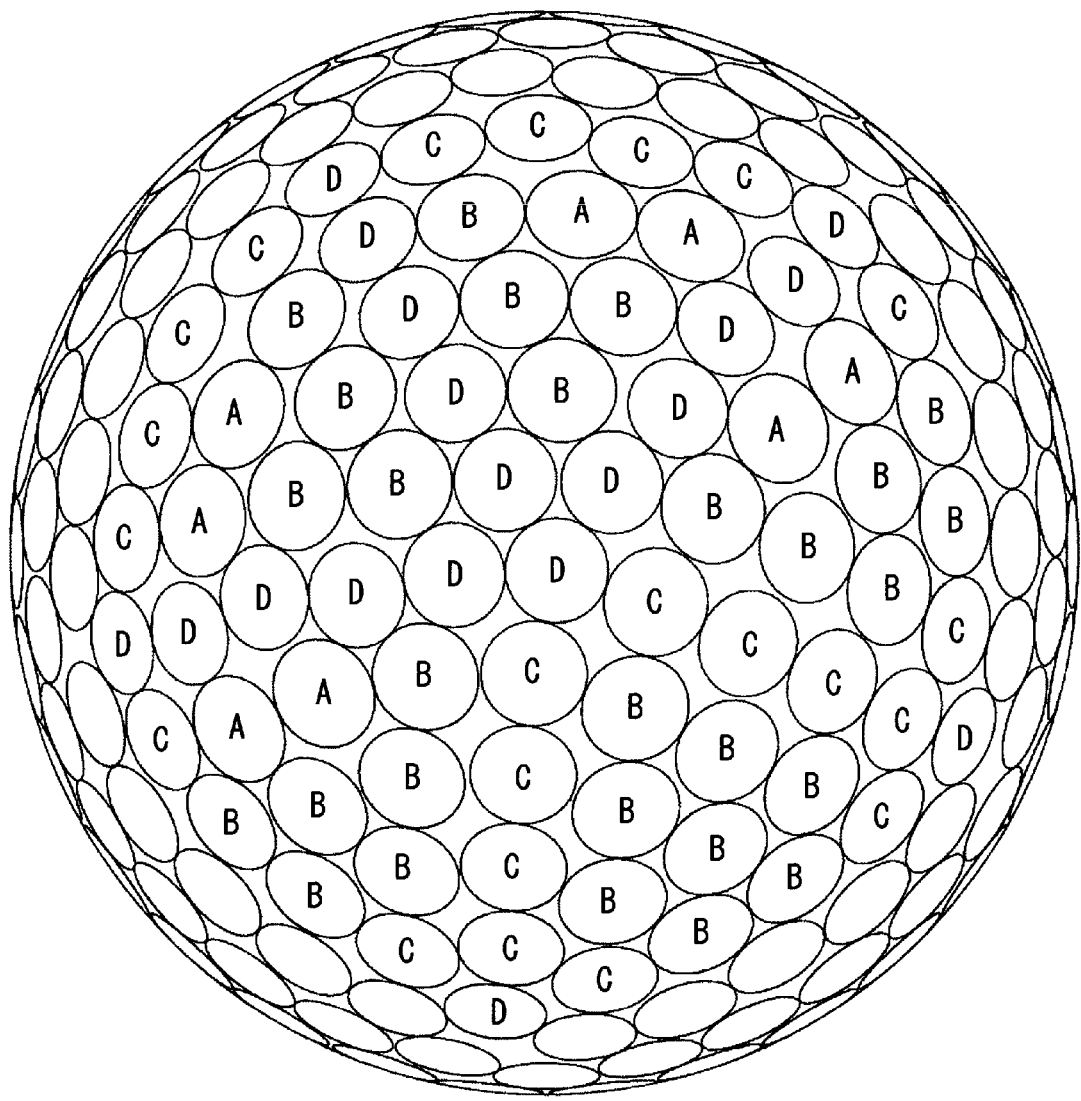
FIG. 3 is a bottom view illustrating the golf ball shown in FIG. 2.
Figure 4:
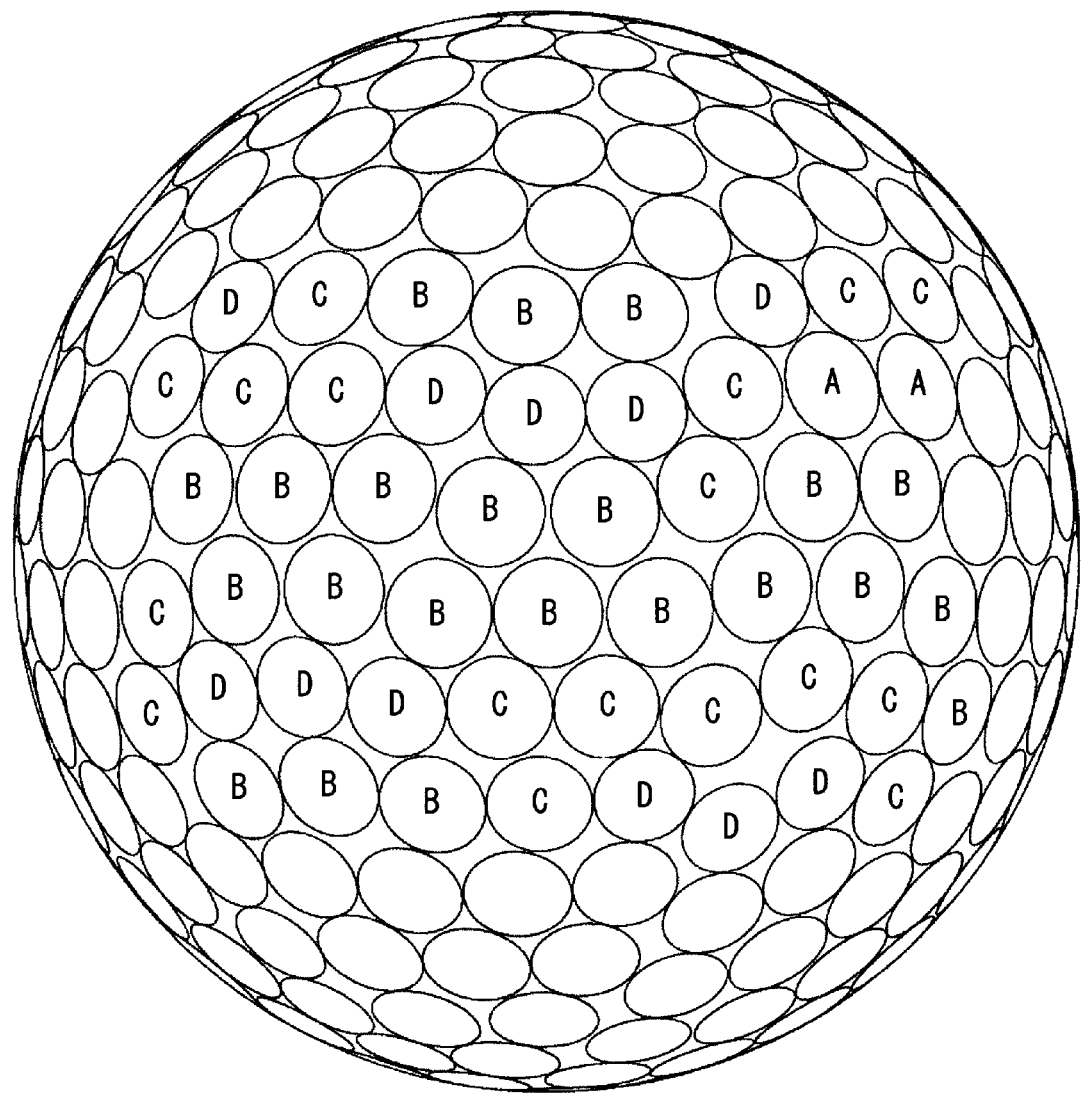
FIG. 4 is a right side view illustrating the golf ball shown in FIG. 2.
Figure 5:
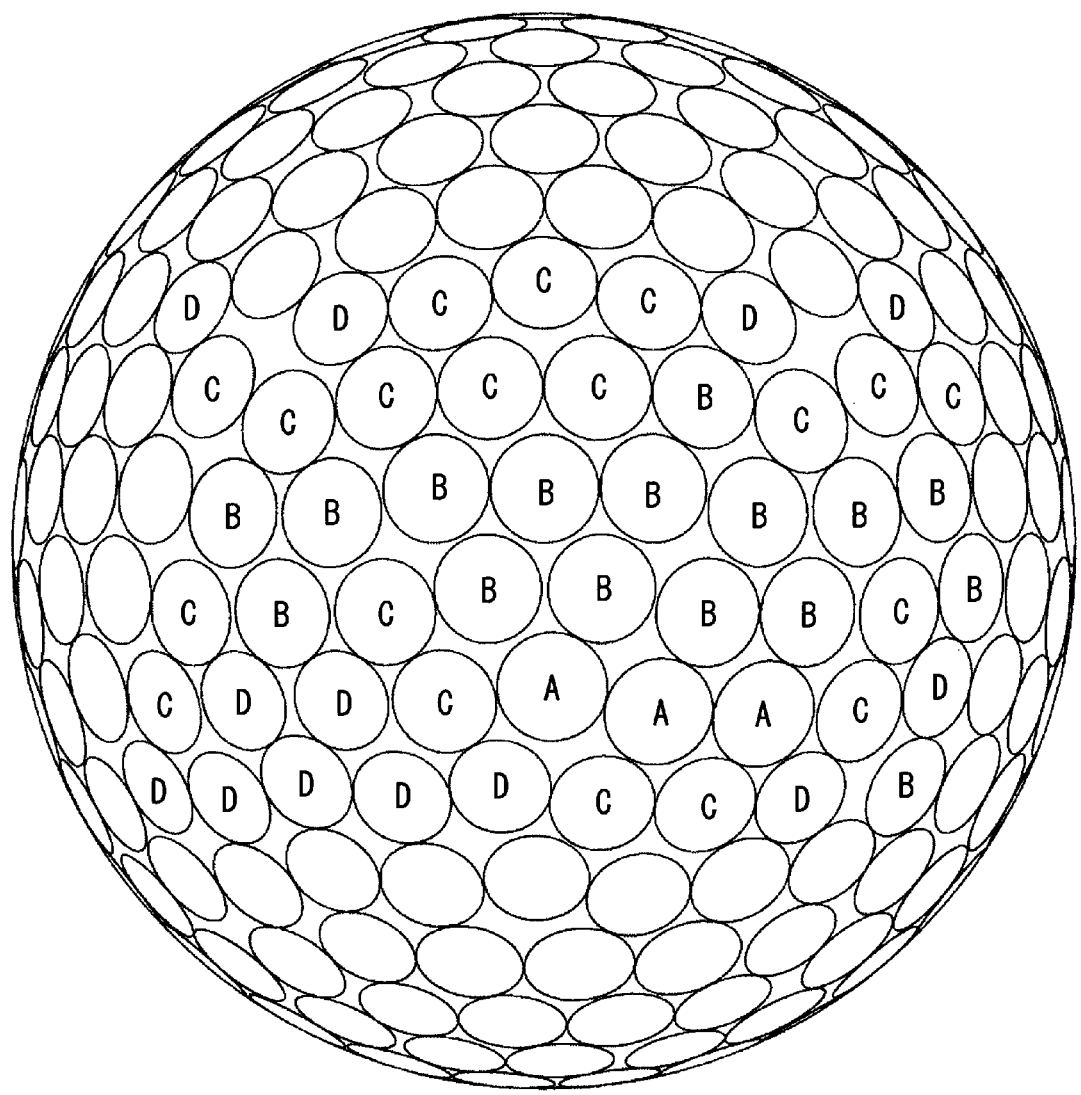
FIG. 5 is a front view illustrating the golf ball shown in FIG. 2.
Figure 6:
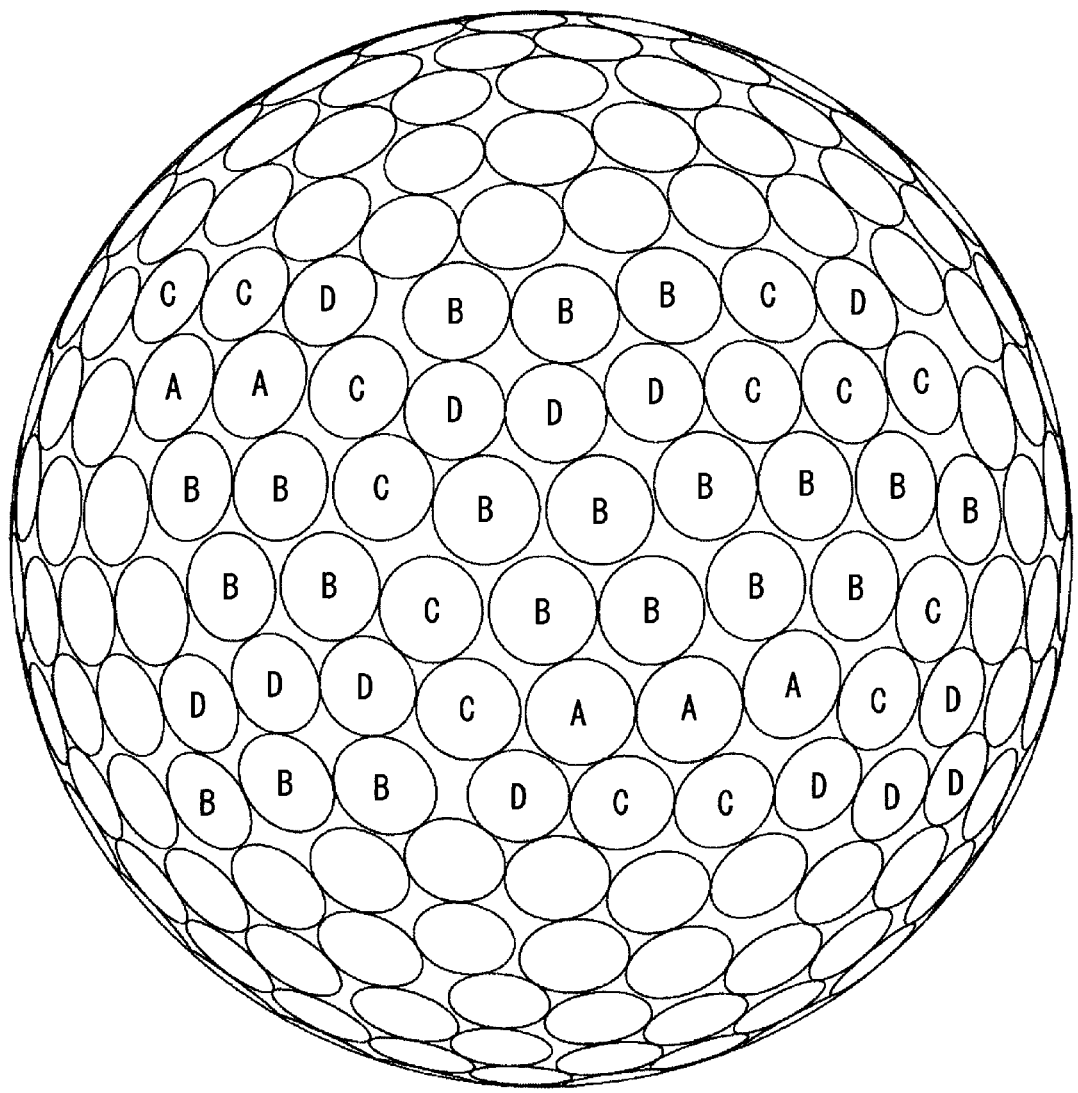
FIG. 6 is a left side view illustrating the golf ball shown in FIG. 2.
Figure 7:
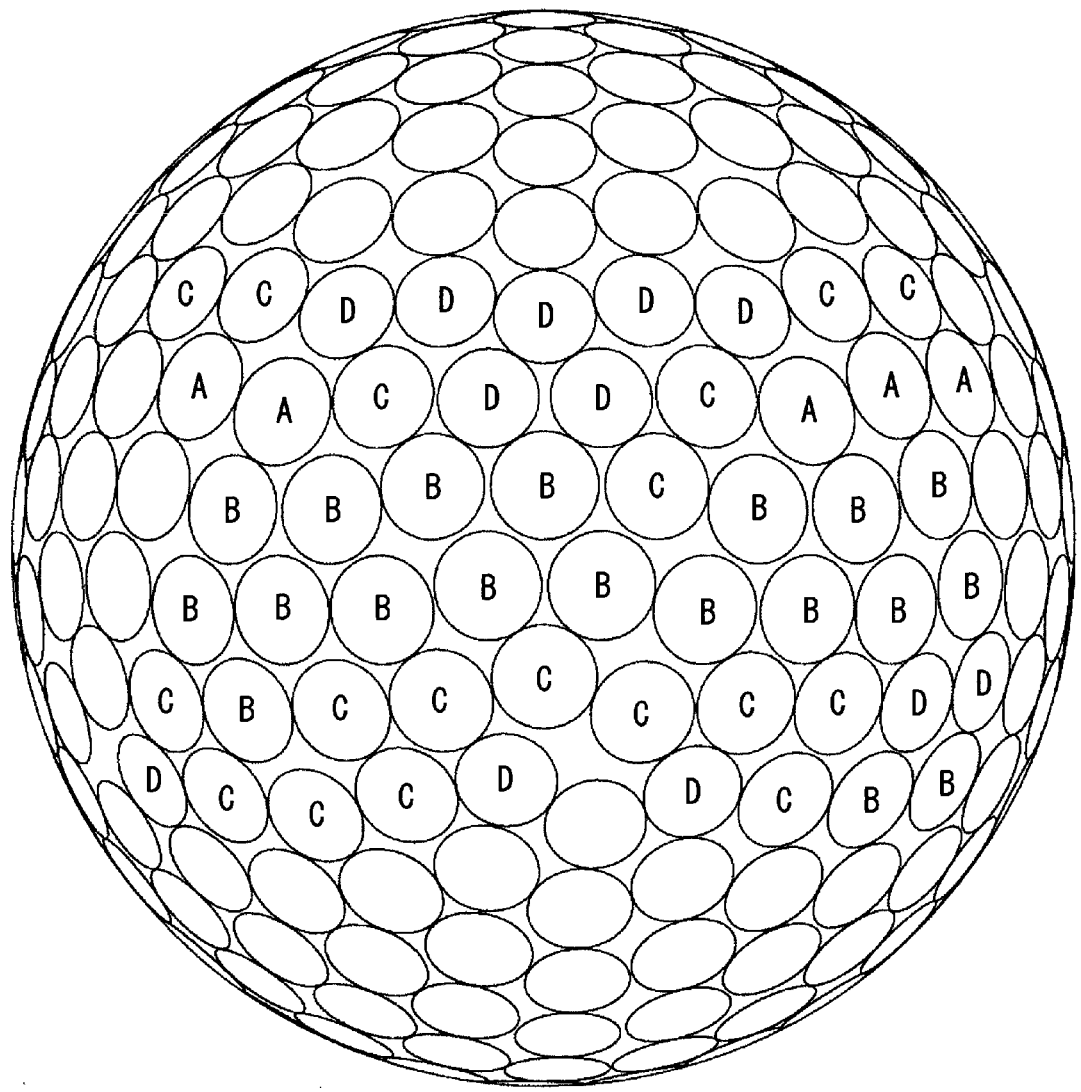
FIG. 7 is a back view illustrating the golf ball shown in FIG. 2.
Figure 16:
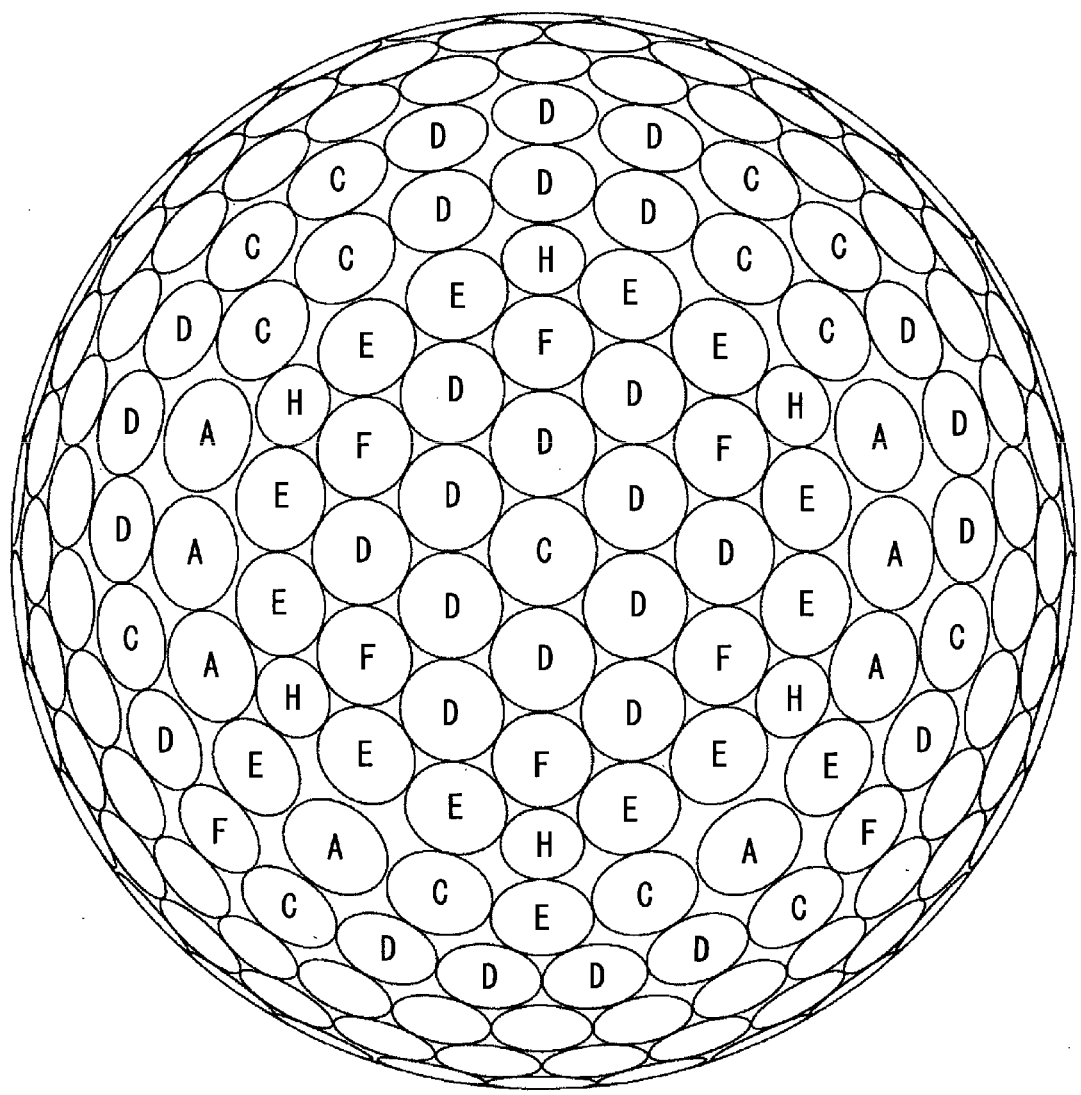
FIG. 16 is a top plan view illustrating the golf ball having the dimple pattern D1.
Figure 17:
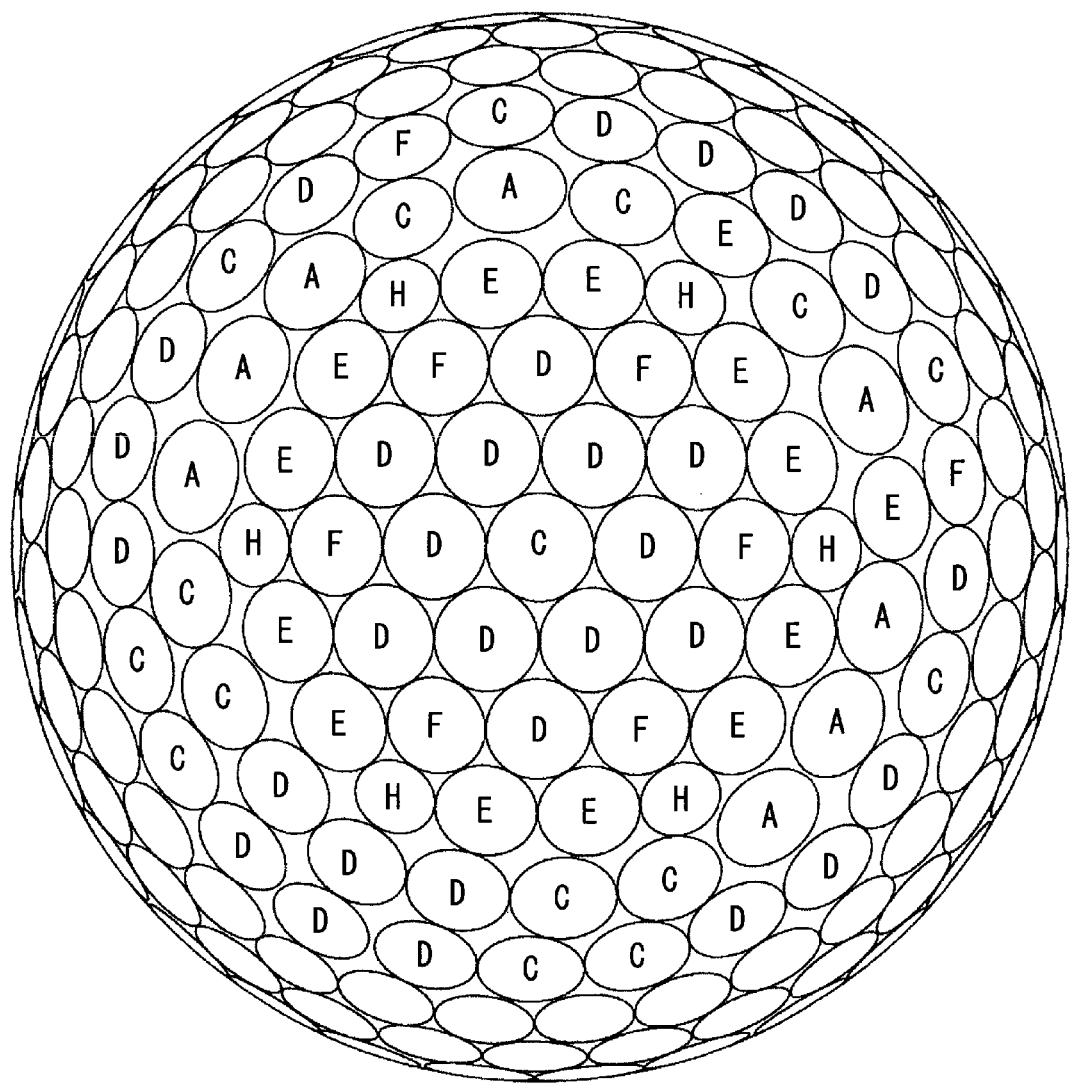
FIG. 17 is a bottom view illustrating the golf ball shown in FIG. 16.
Figure 18:
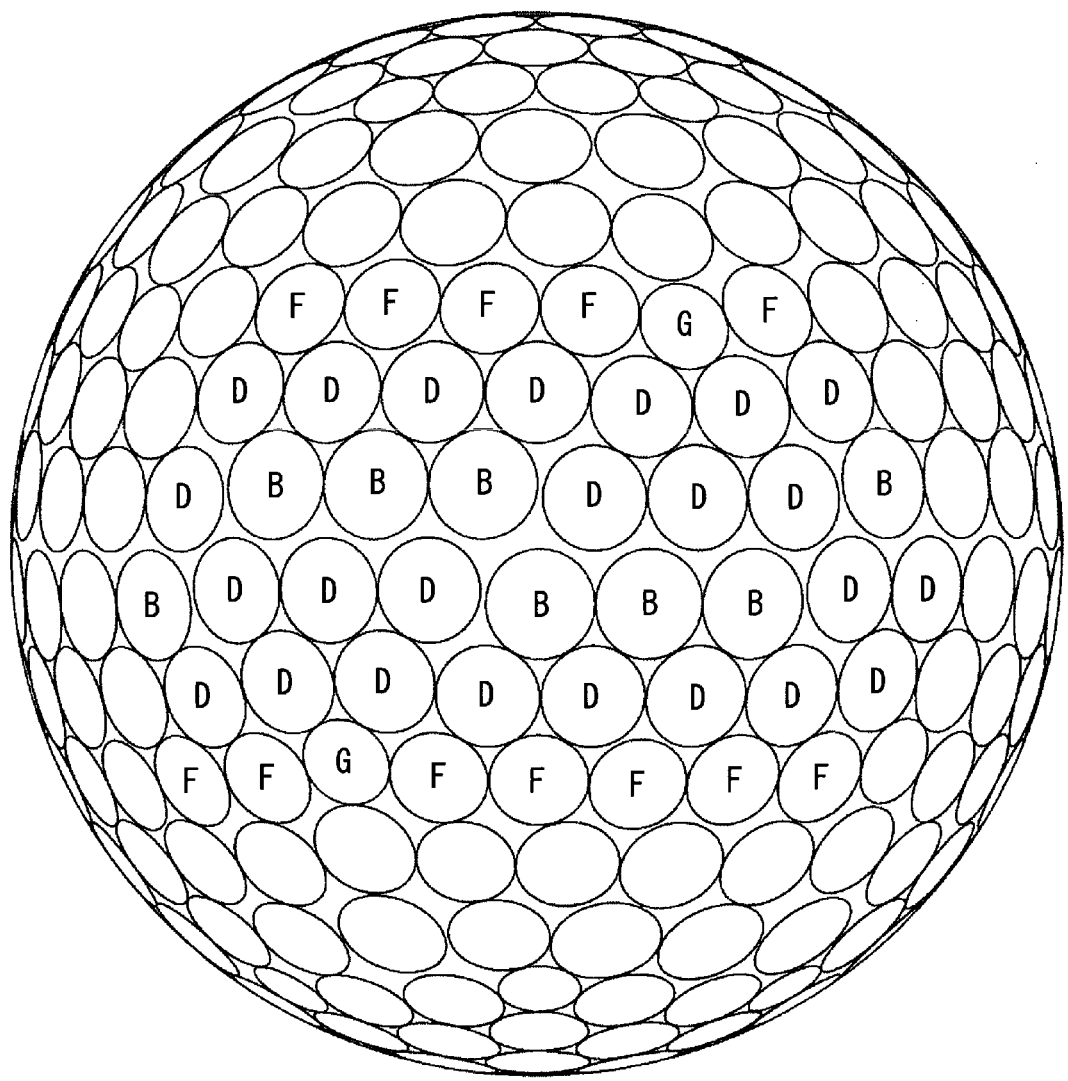
FIG. 18 is a right side view illustrating the golf ball shown in FIG. 16.
Figure 19:
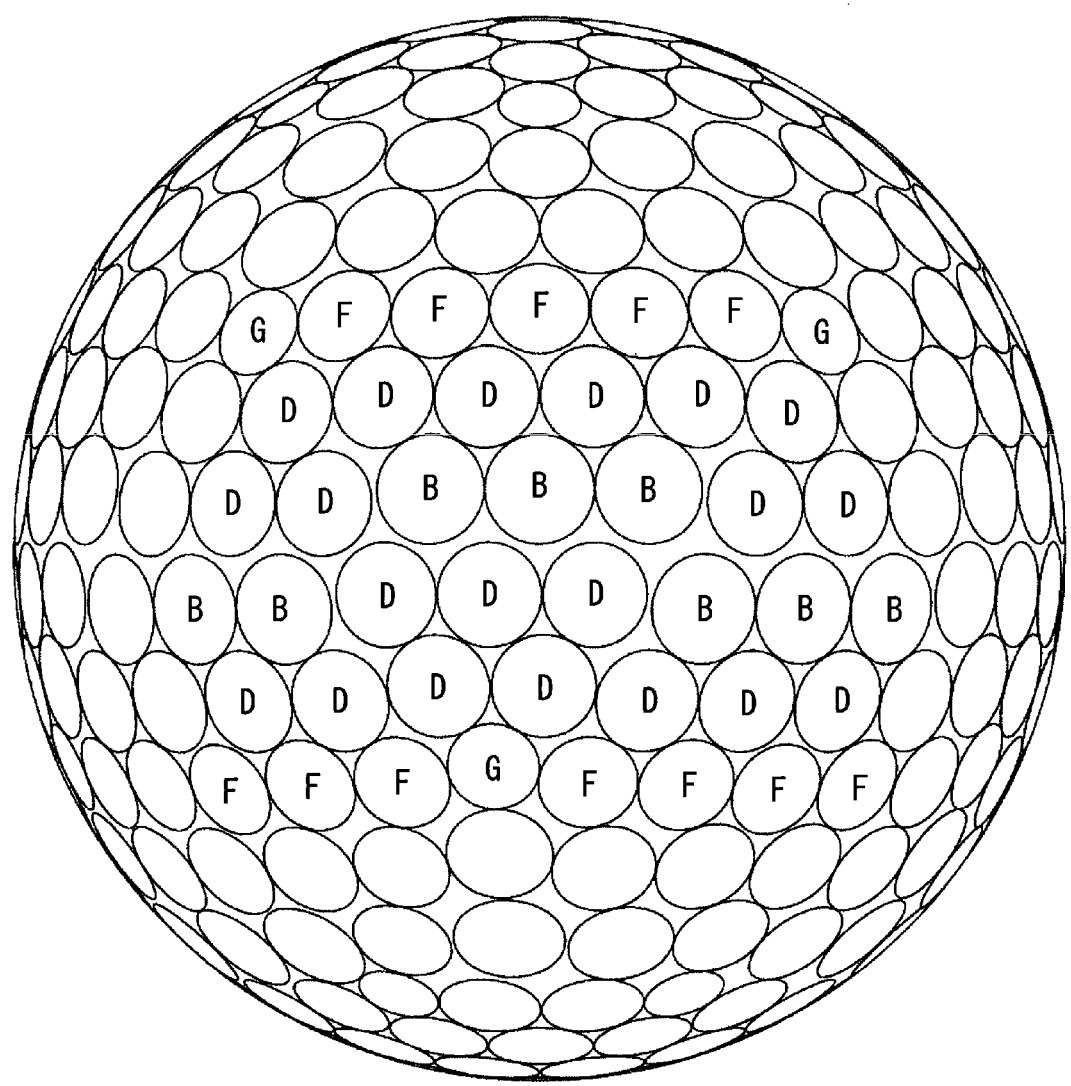
FIG. 19 is a front view illustrating the golf ball shown in FIG. 16.
Figure 20:
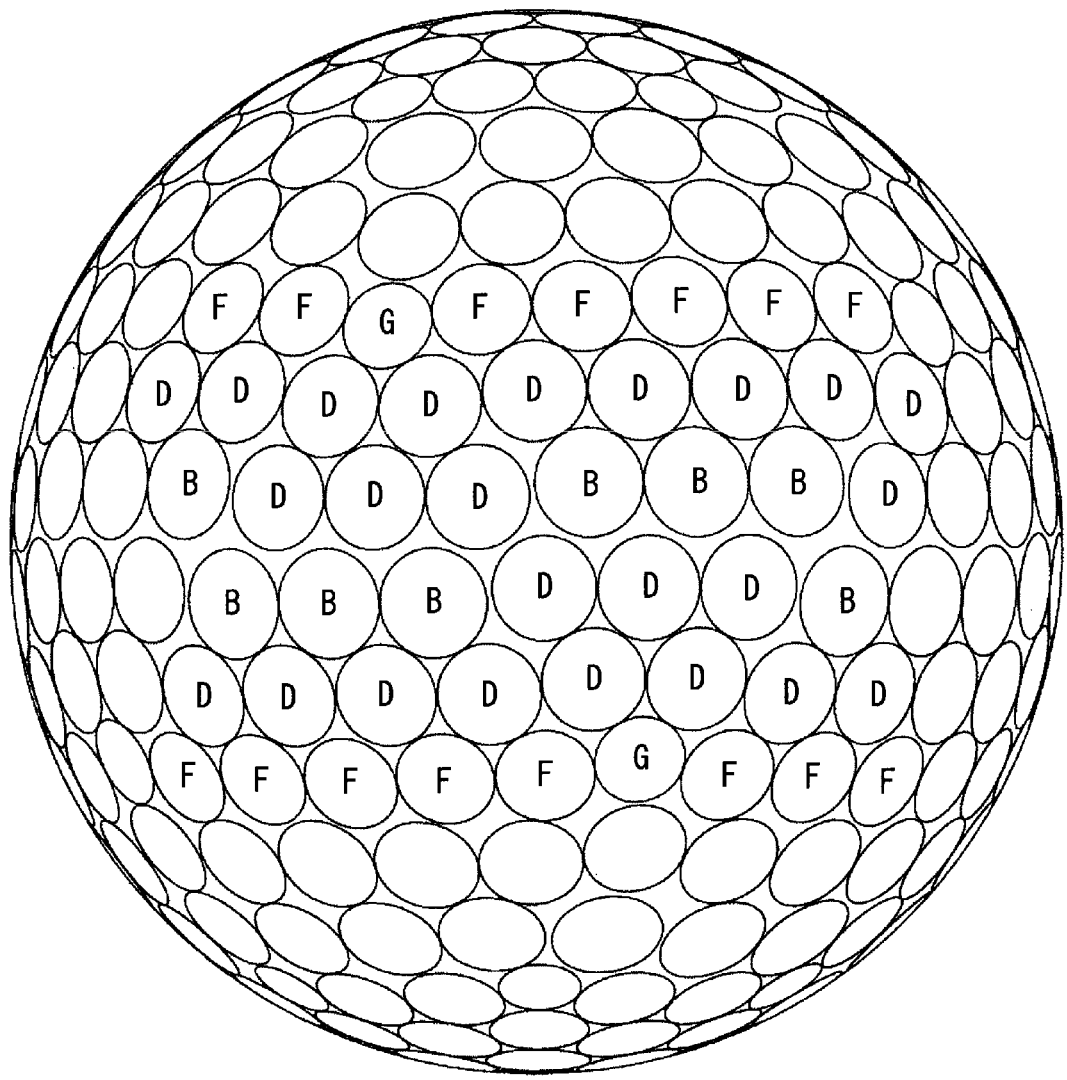
FIG. 20 is a left side view illustrating the golf ball shown in FIG. 16.
Figure 21:
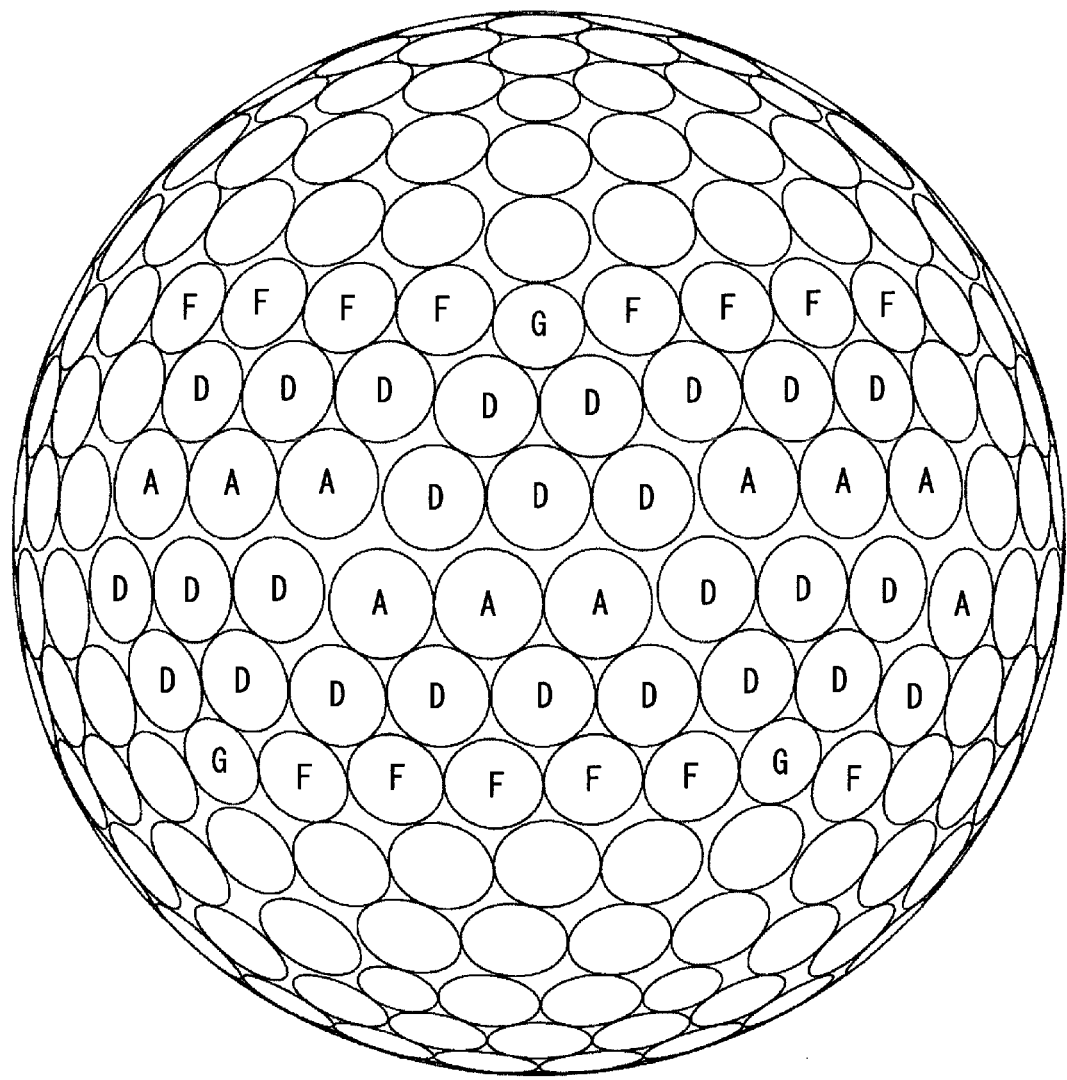
FIG. 21 is a back view illustrating the golf ball shown in FIG. 16.
Figure 22:
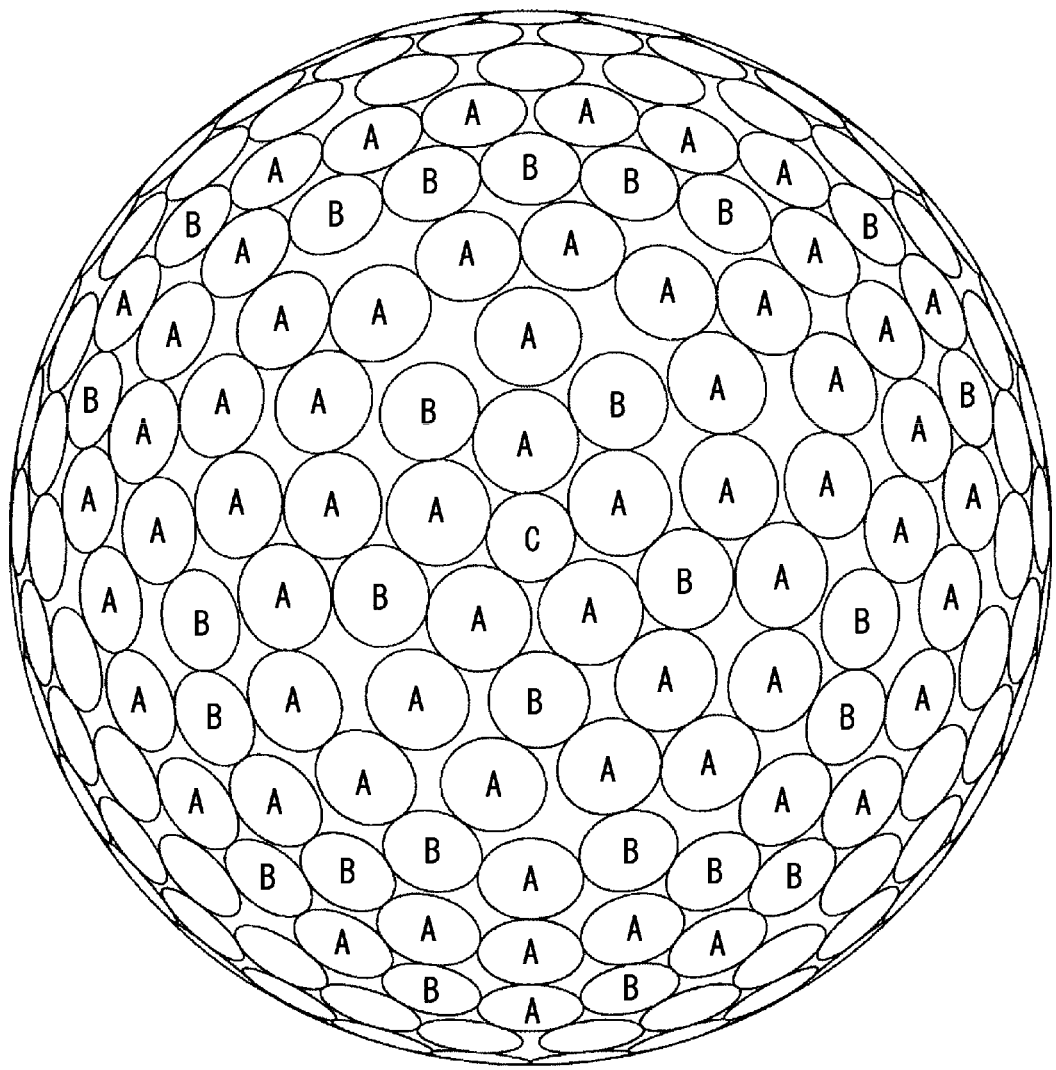
FIG. 22 is a top plan view illustrating the golf ball having the dimple pattern D3.
Figure 23:
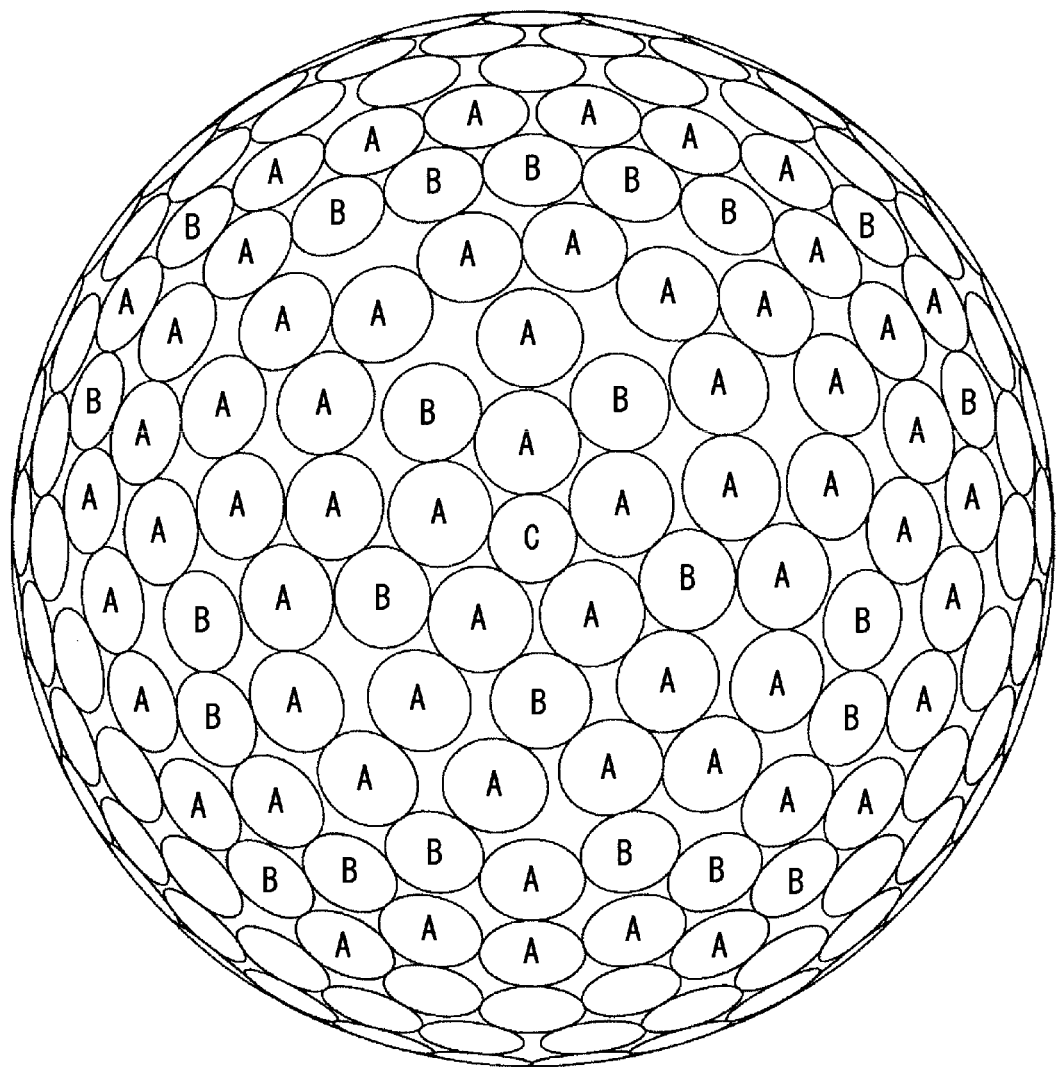
FIG. 23 is a bottom view illustrating the golf ball shown in FIG. 22.
Figure 24:
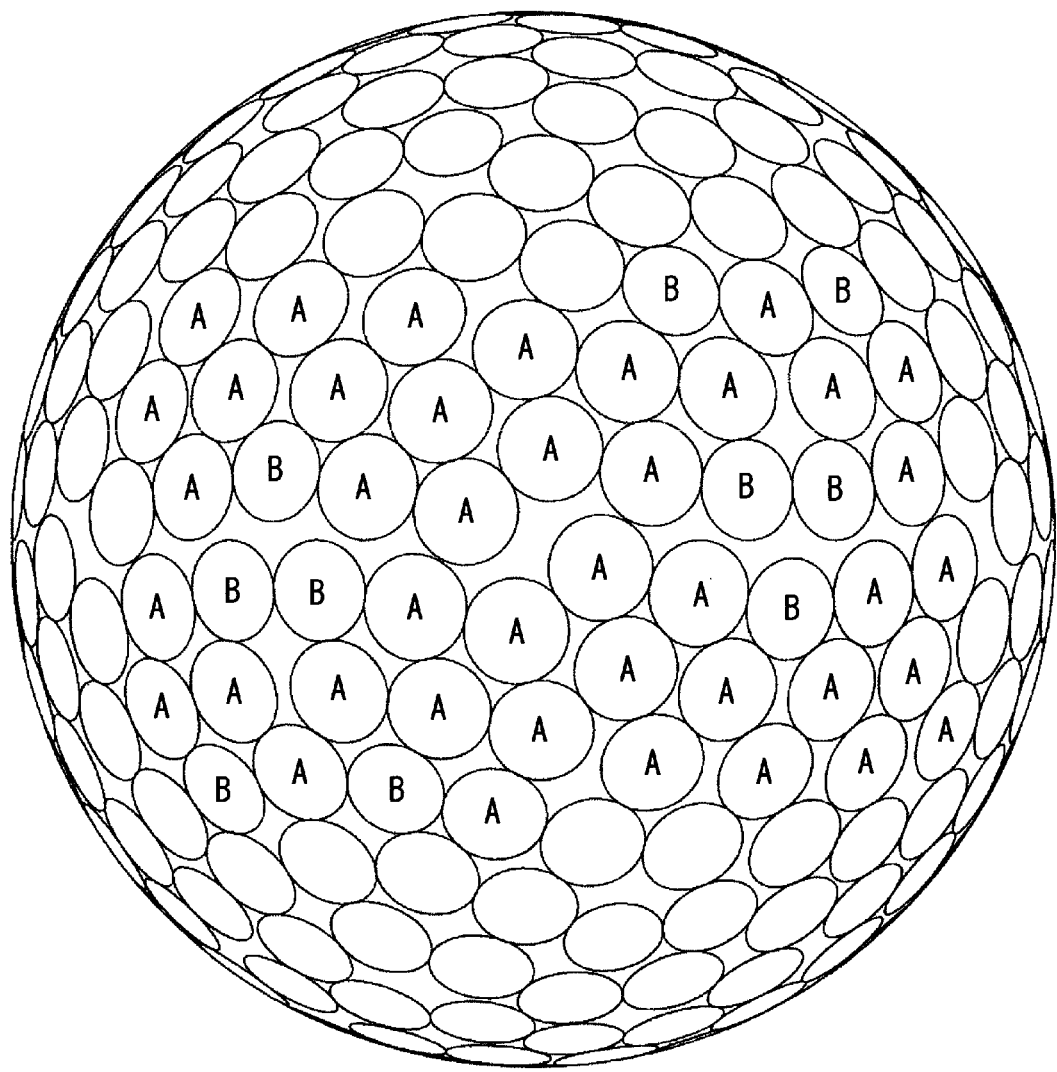
FIG. 24 is a right side view illustrating the golf ball shown in FIG. 22.
Figure 25:
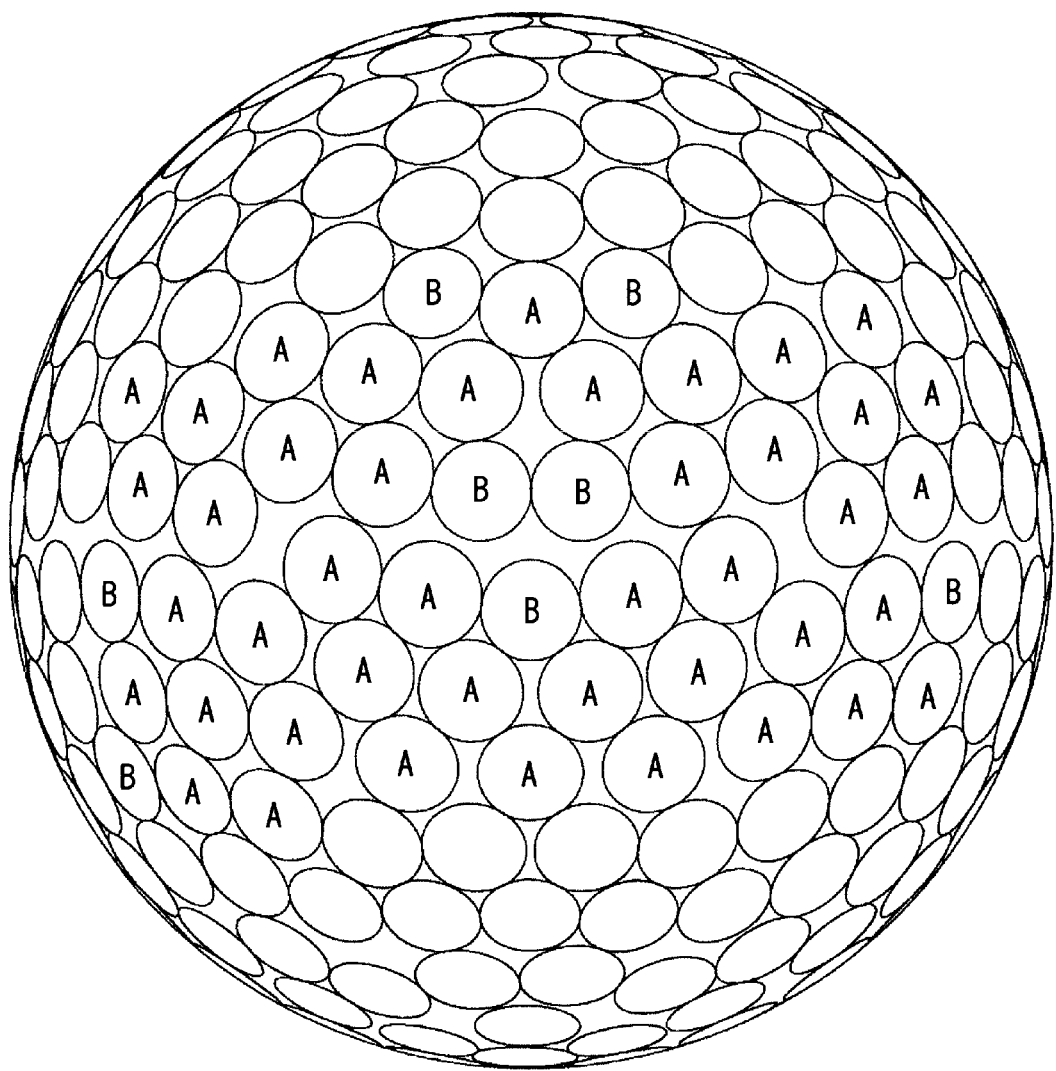
FIG. 25 is a front view illustrating the golf ball shown in FIG. 22.
Figure 26:
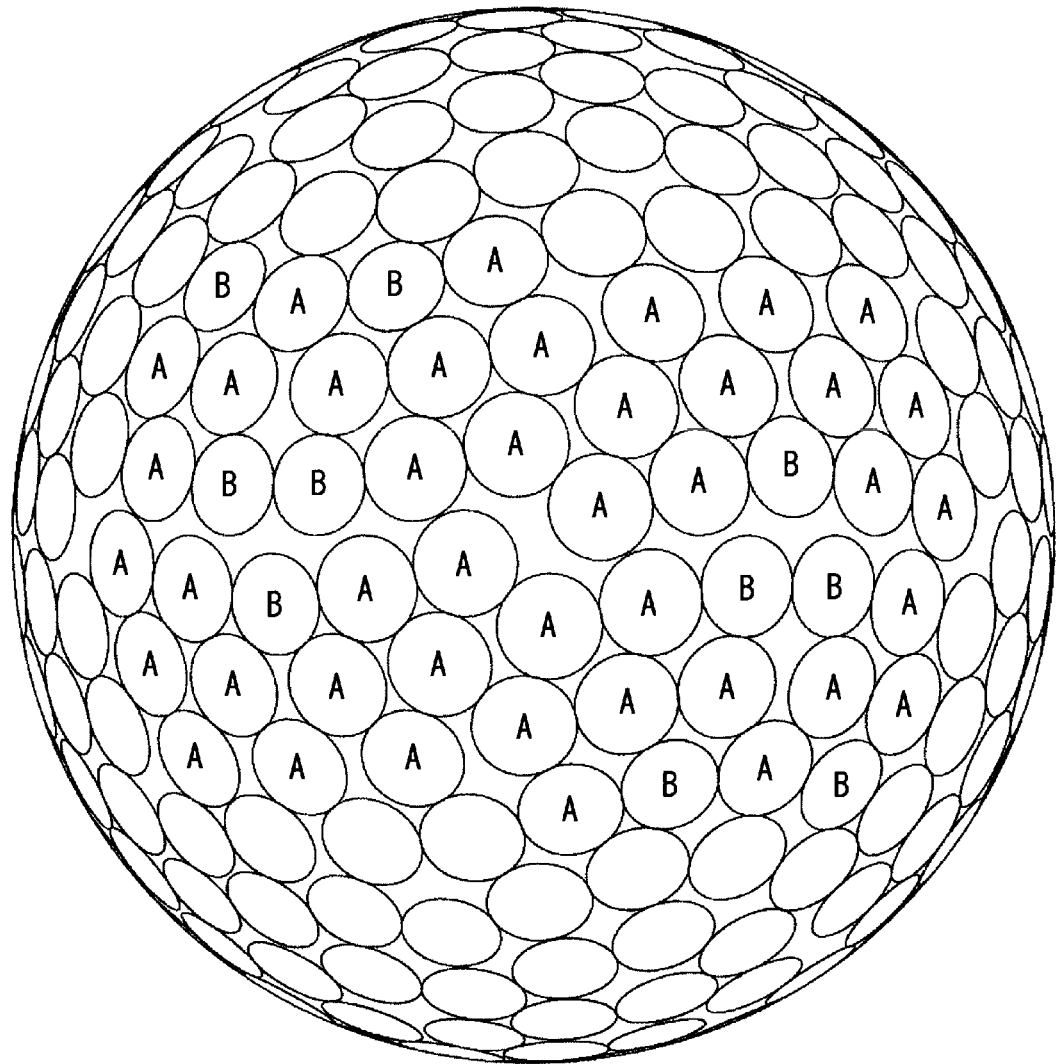
FIG. 26 is a left side view illustrating the golf ball shown in FIG. 22.
Figure 27:
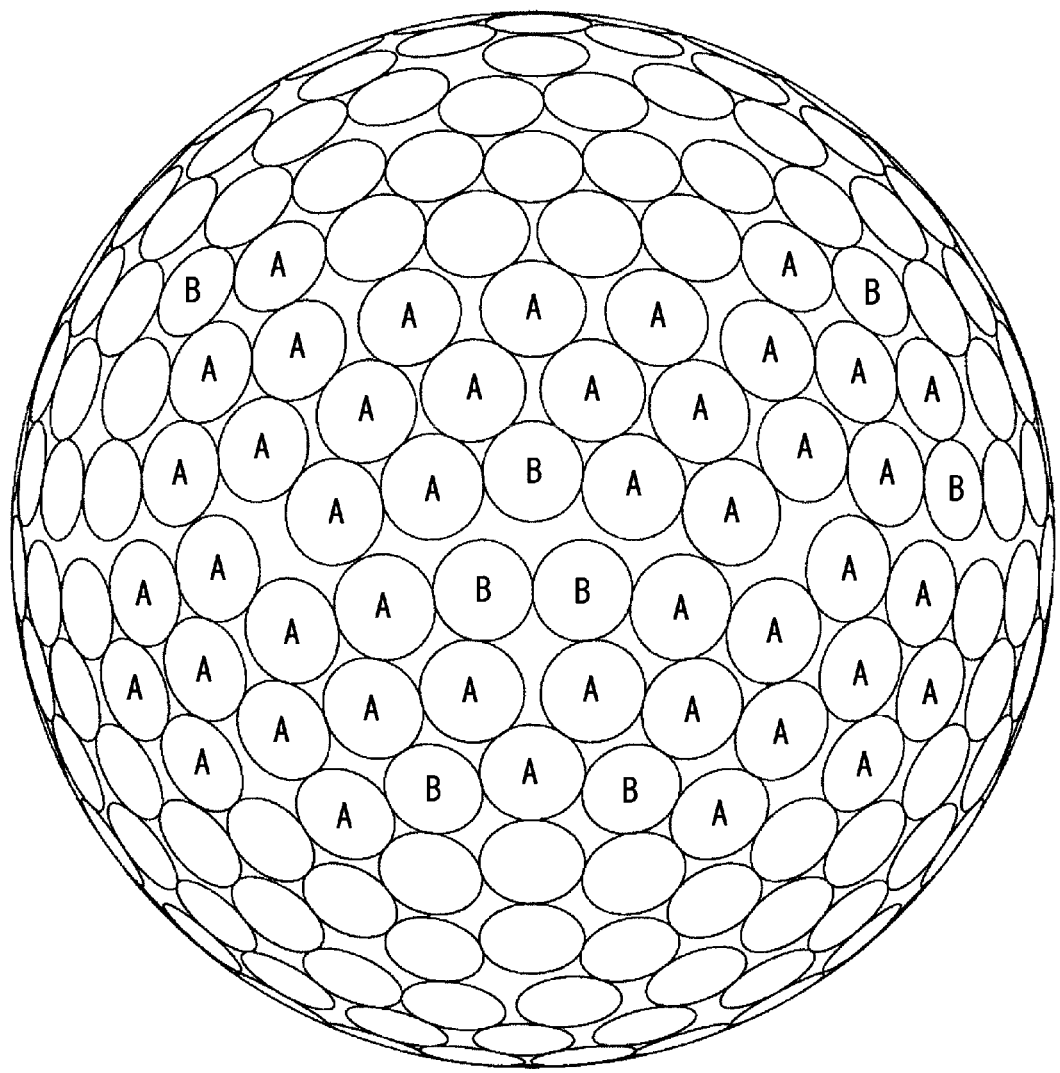
FIG. 27 is a back view illustrating the golf ball shown in FIG. 22.
Figure 28:
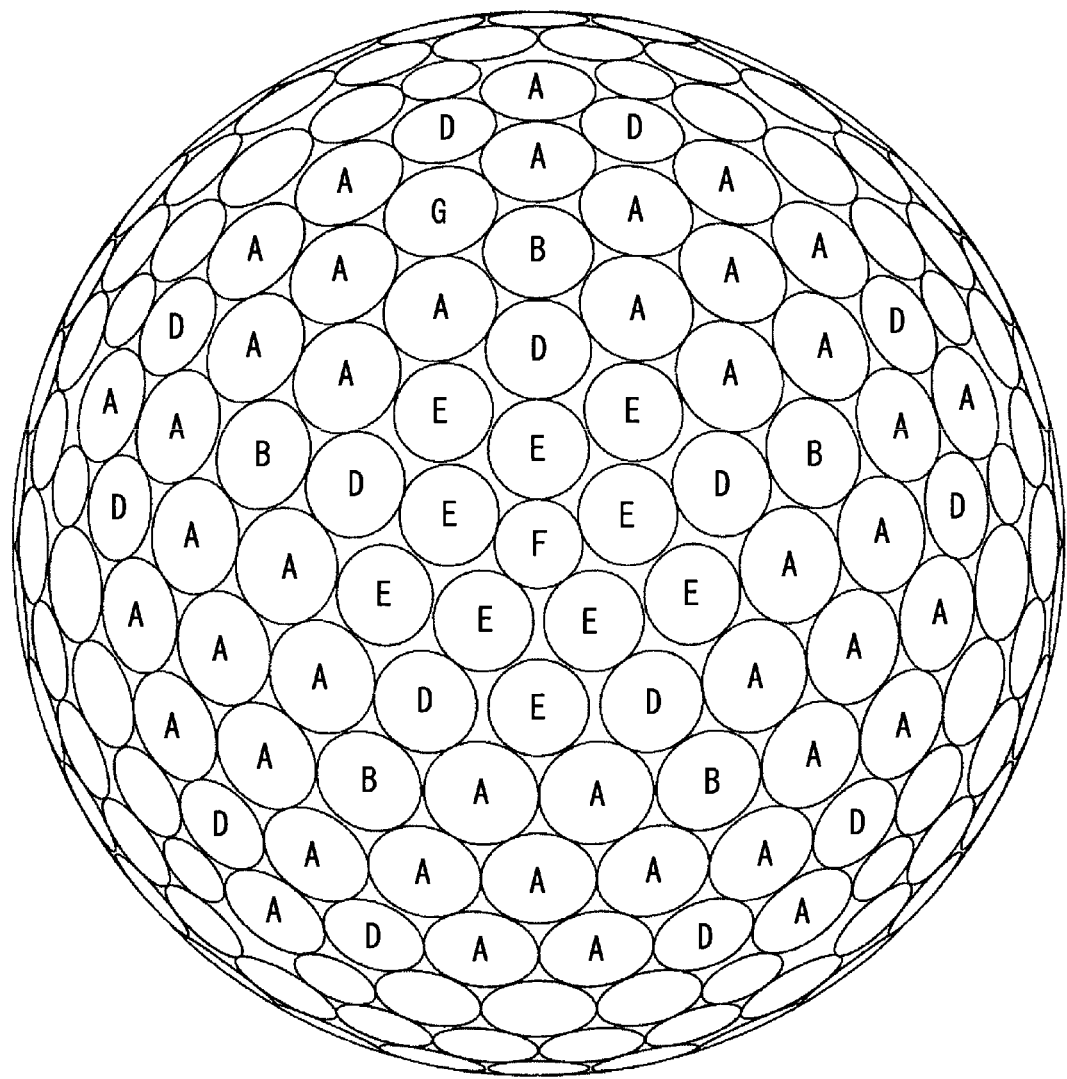
FIG. 28 is a top plan view illustrating the golf ball having the dimple pattern D4.
Figure 29:
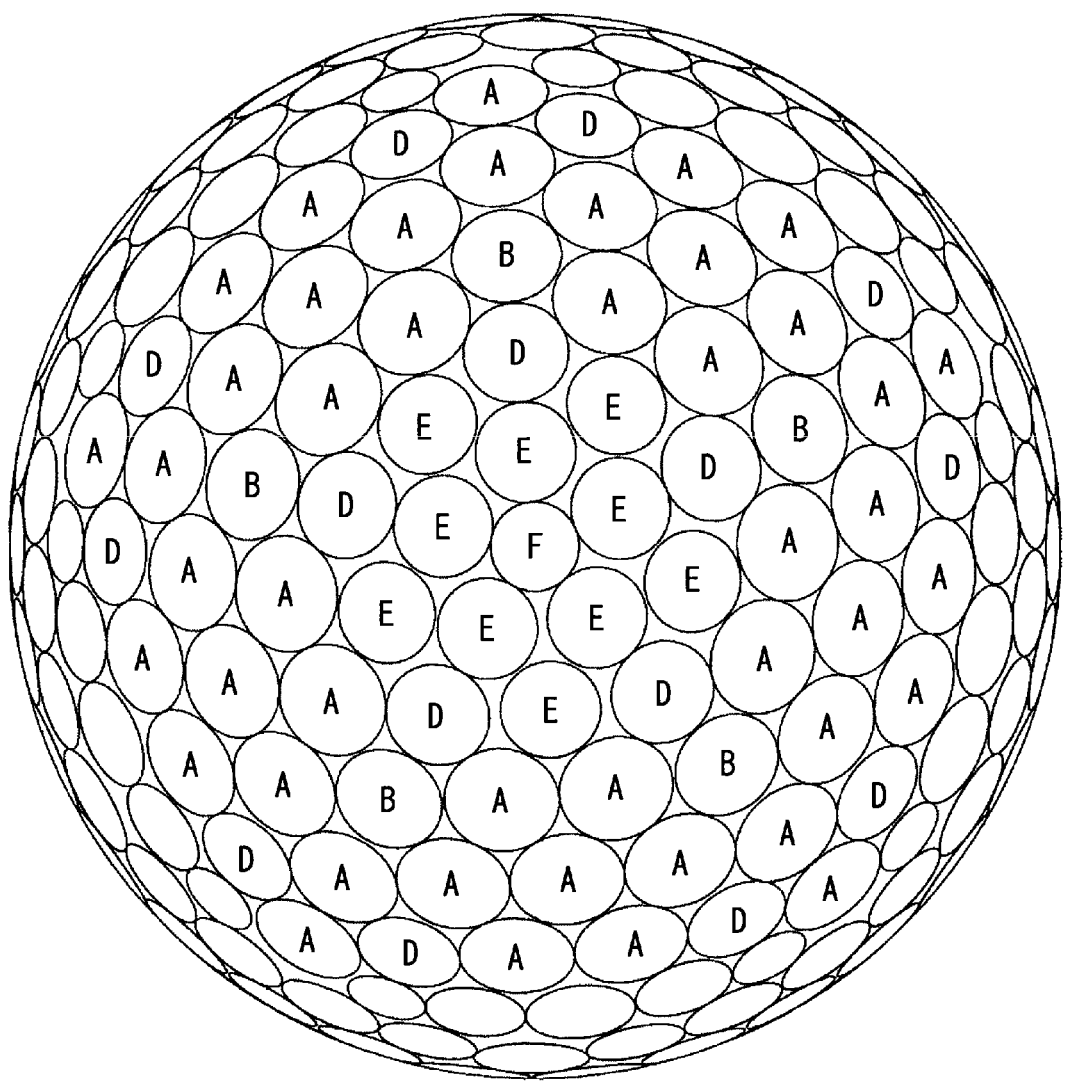
FIG. 29 is a bottom view illustrating the golf ball shown in FIG. 28.
Figure 30:
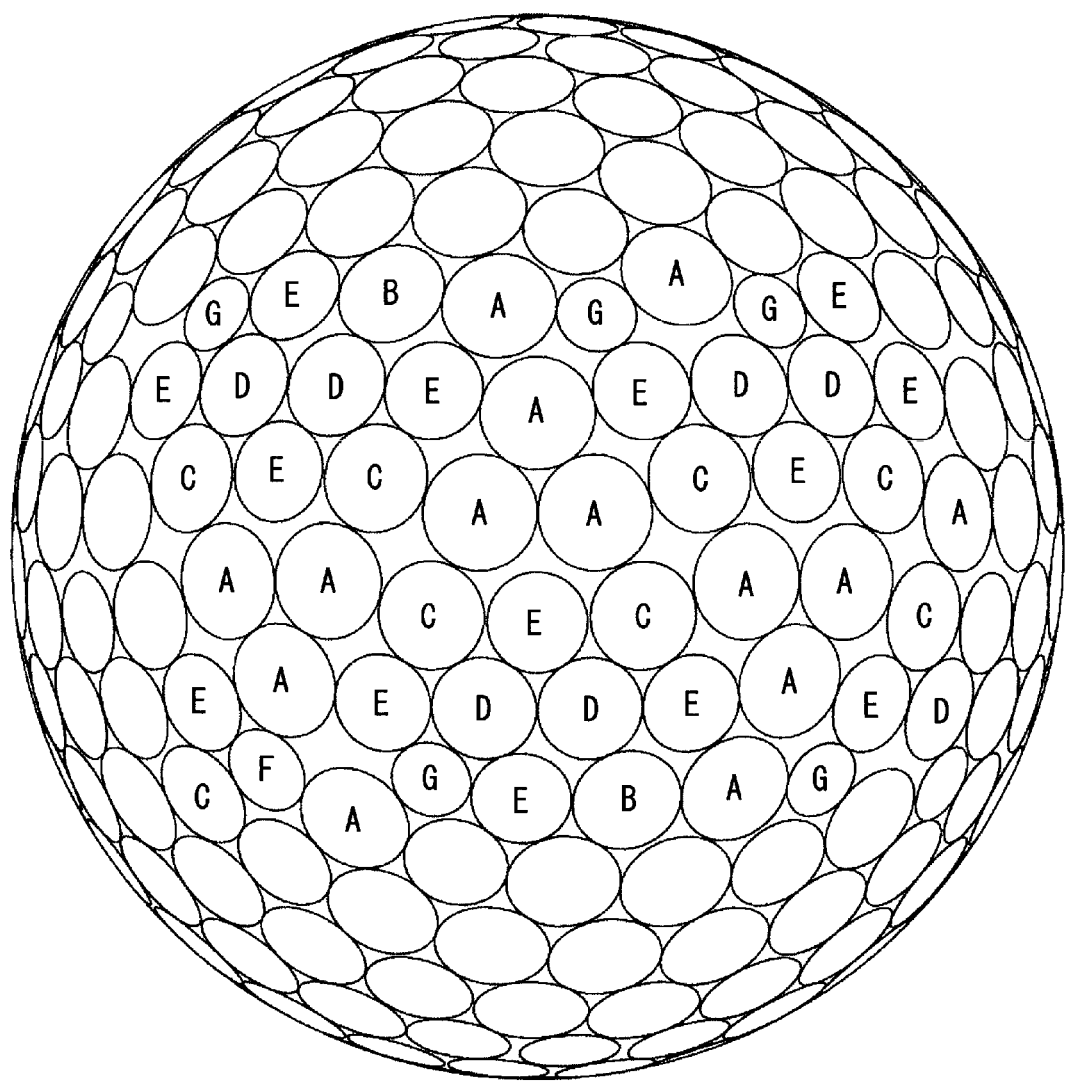
FIG. 30 is a right side view illustrating the golf ball shown in FIG. 28.
Figure 31:
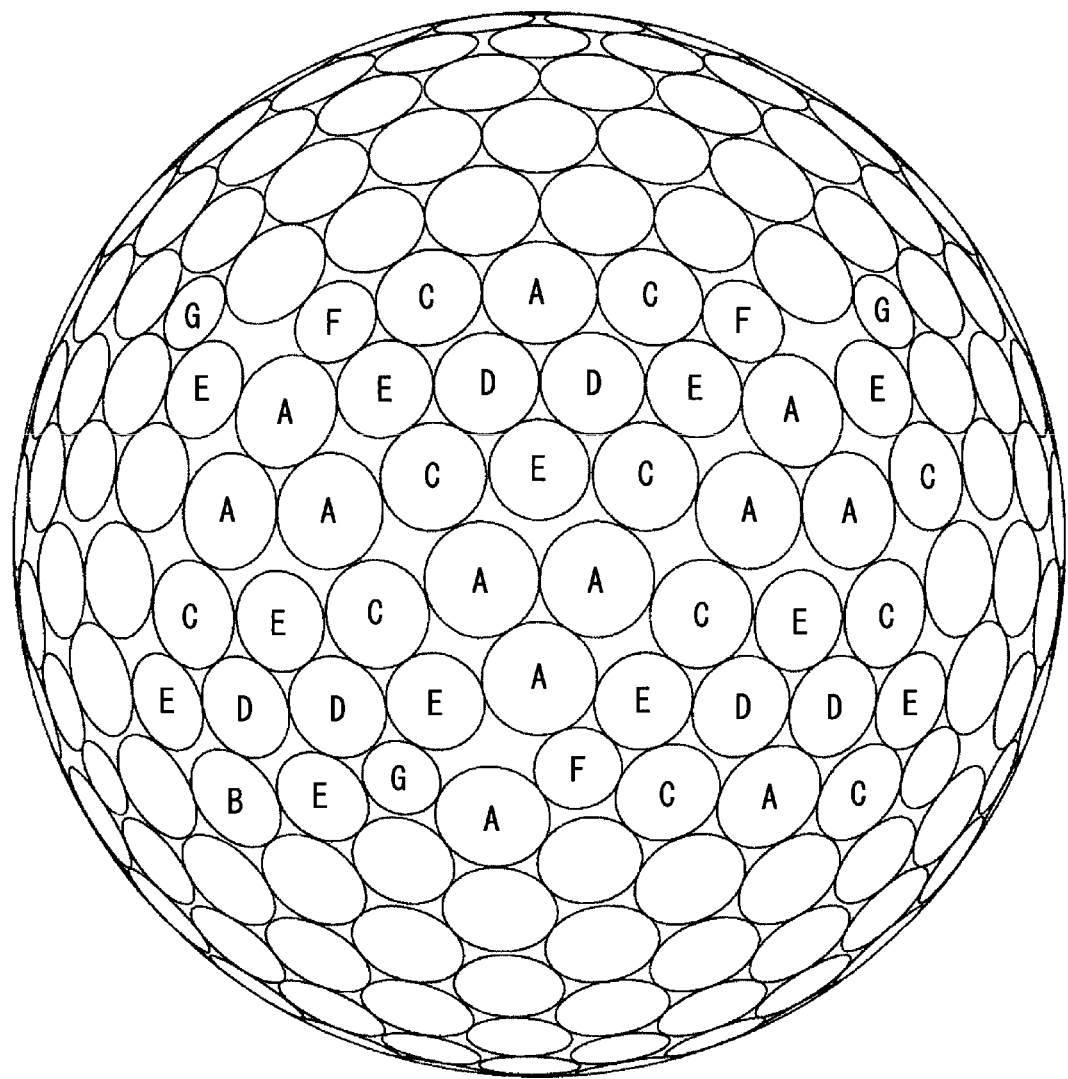
FIG. 31 is a front view illustrating the golf ball shown in FIG. 28.
Figure 32:
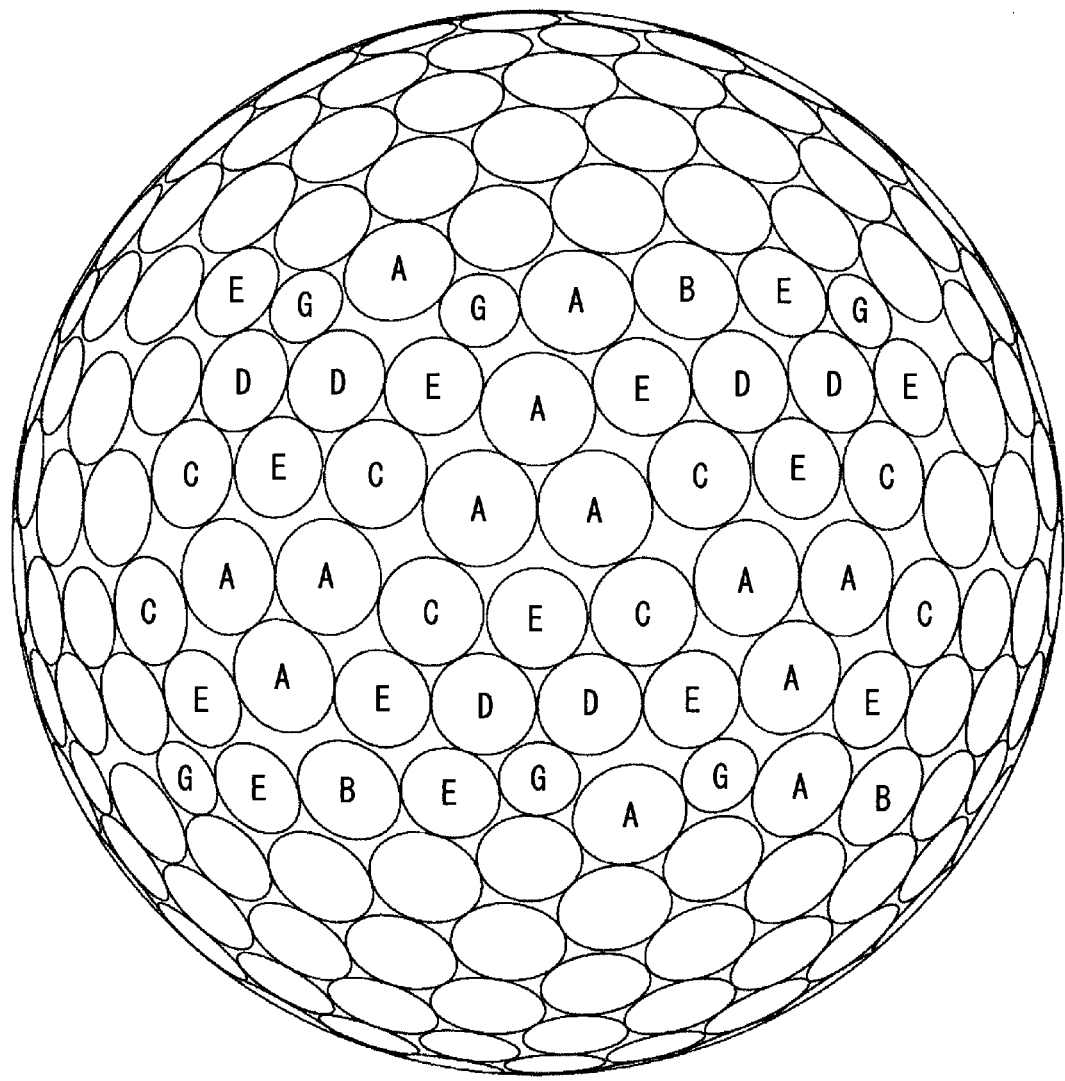
FIG. 32 is a left side view illustrating the golf ball shown in FIG. 28.
Figure 33:
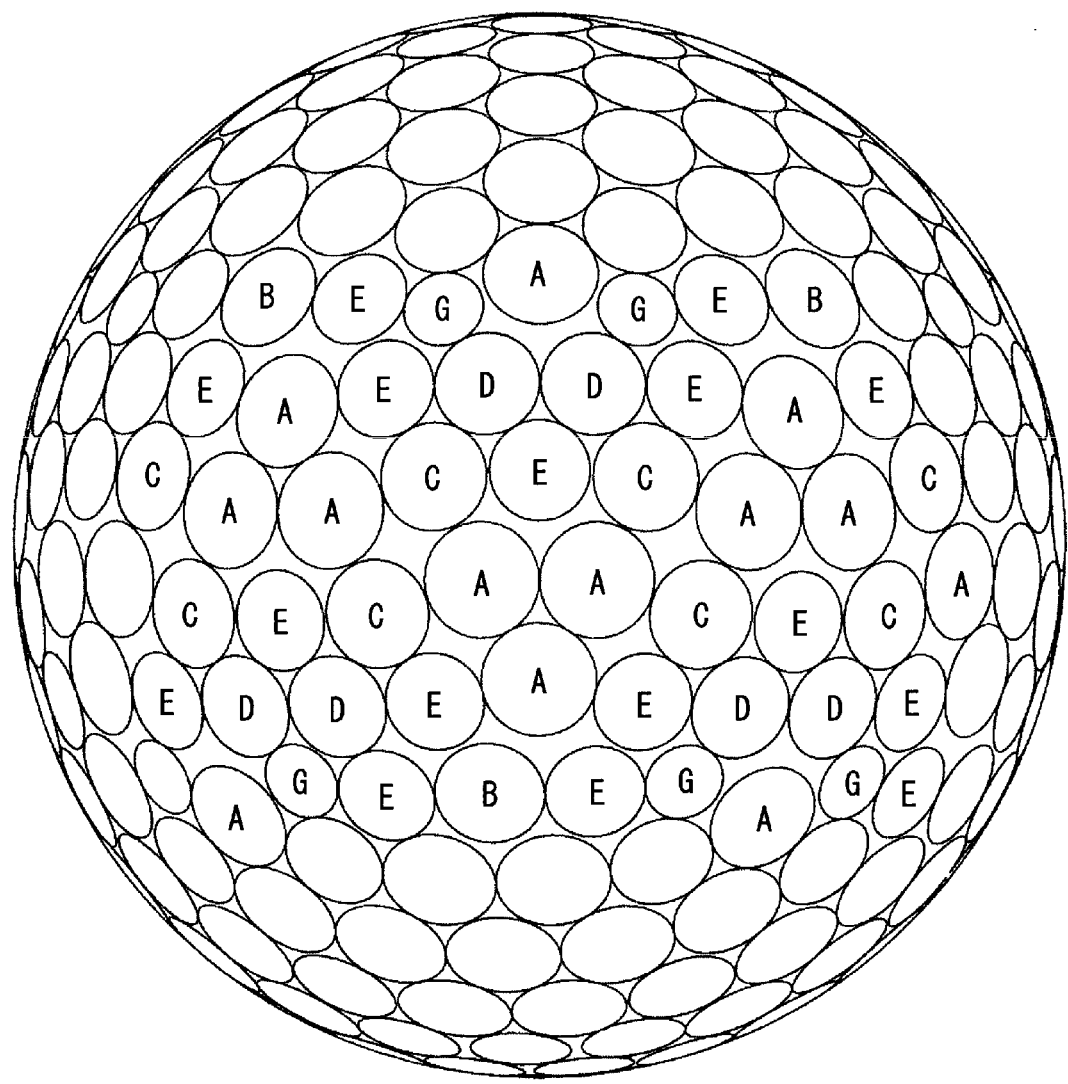
FIG. 33 is a back view illustrating the golf ball shown in FIG. 28.

| | Dimple pattern | | | |
|---|---|---|---|---|
| | D1 | D2 | D3 | D4 |
| Top plan view | FIG. 16 | FIG. 2 | FIG. 22 | FIG. 28 |
| Bottom view | FIG. 17 | FIG. 3 | FIG. 23 | FIG. 29 |
| Right side view | FIG. 18 | FIG. 4 | FIG. 24 | FIG. 30 |
| Front view | FIG. 19 | FIG. 5 | FIG. 25 | FIG. 31 |
| Left side view | FIG. 20 | FIG. 6 | FIG. 26 | FIG. 32 |
| Back view | FIG. 21 | FIG. 7 | FIG. 27 | FIG. 33 |
| Number of dimples N | 344 | 324 | 324 | 322 |
| Occupation ratio X | 0.853 | 0.830 | 0.804 | 0.860 |
| Standard deviation Y (mm) | 0.223 | 0.109 | 0.097 | 0.360 |
| Formula (I) | Satisfy | Satisfy | Satisfy | Satisfy |
| Formula (II) | Satisfy | Satisfy | Satisfy | Not satisfy |
| Formula (III) | Satisfy | Satisfy | Not satisfy | Not satisfy |

TABLE 10

Figure 34:
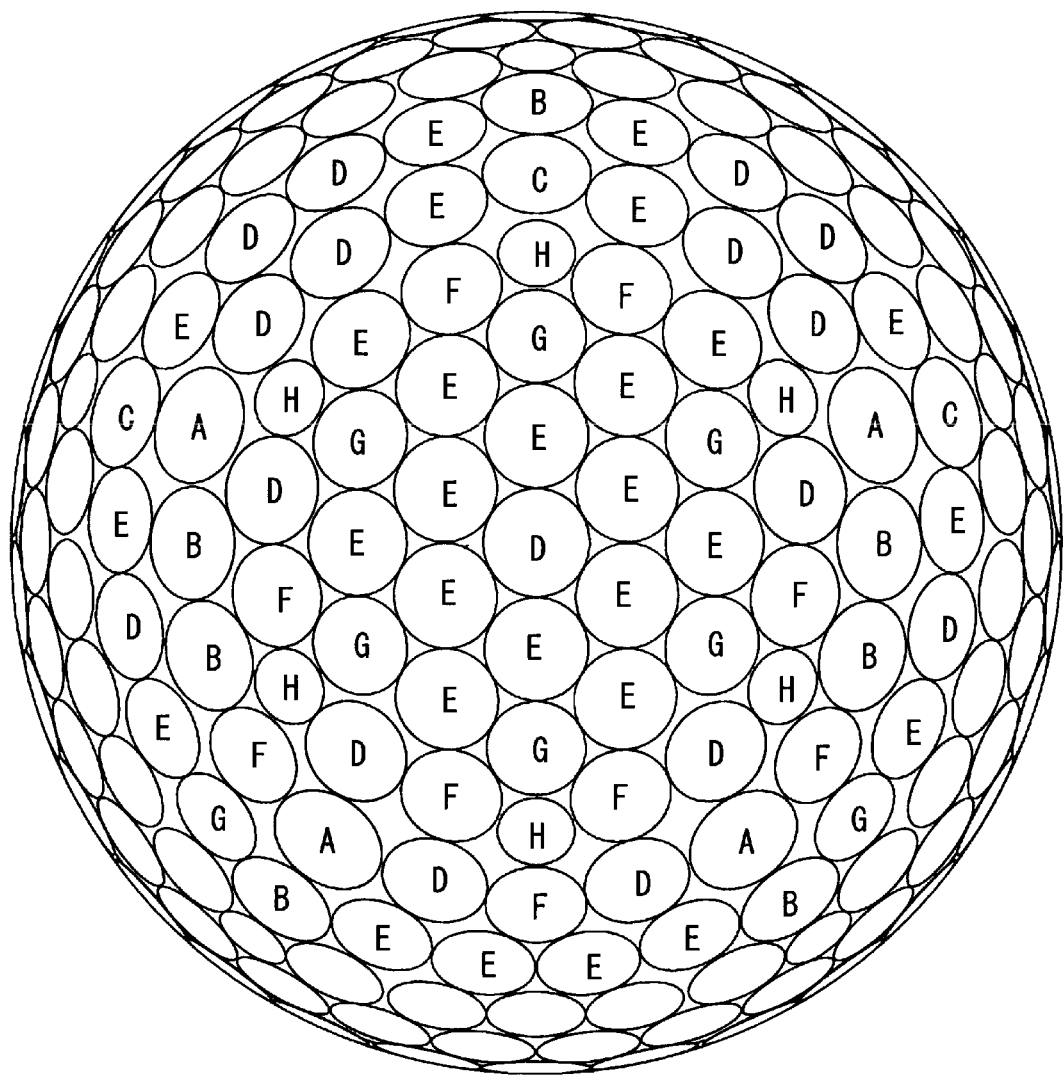
FIG. 34 is a top plan view illustrating the golf ball having the dimple pattern D5.
Figure 35:
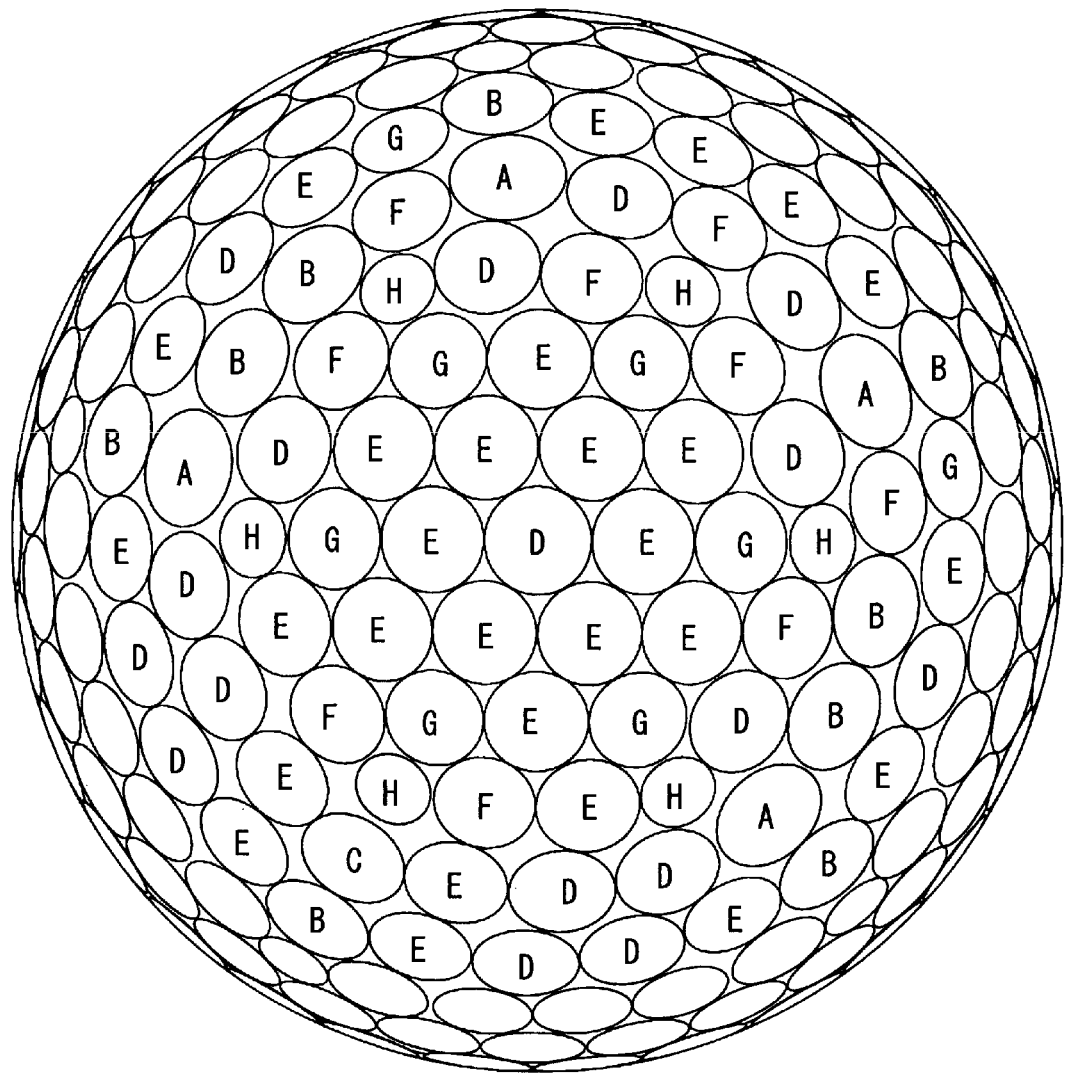
FIG. 35 is a bottom view illustrating the golf ball shown in FIG. 34.
Figure 36:
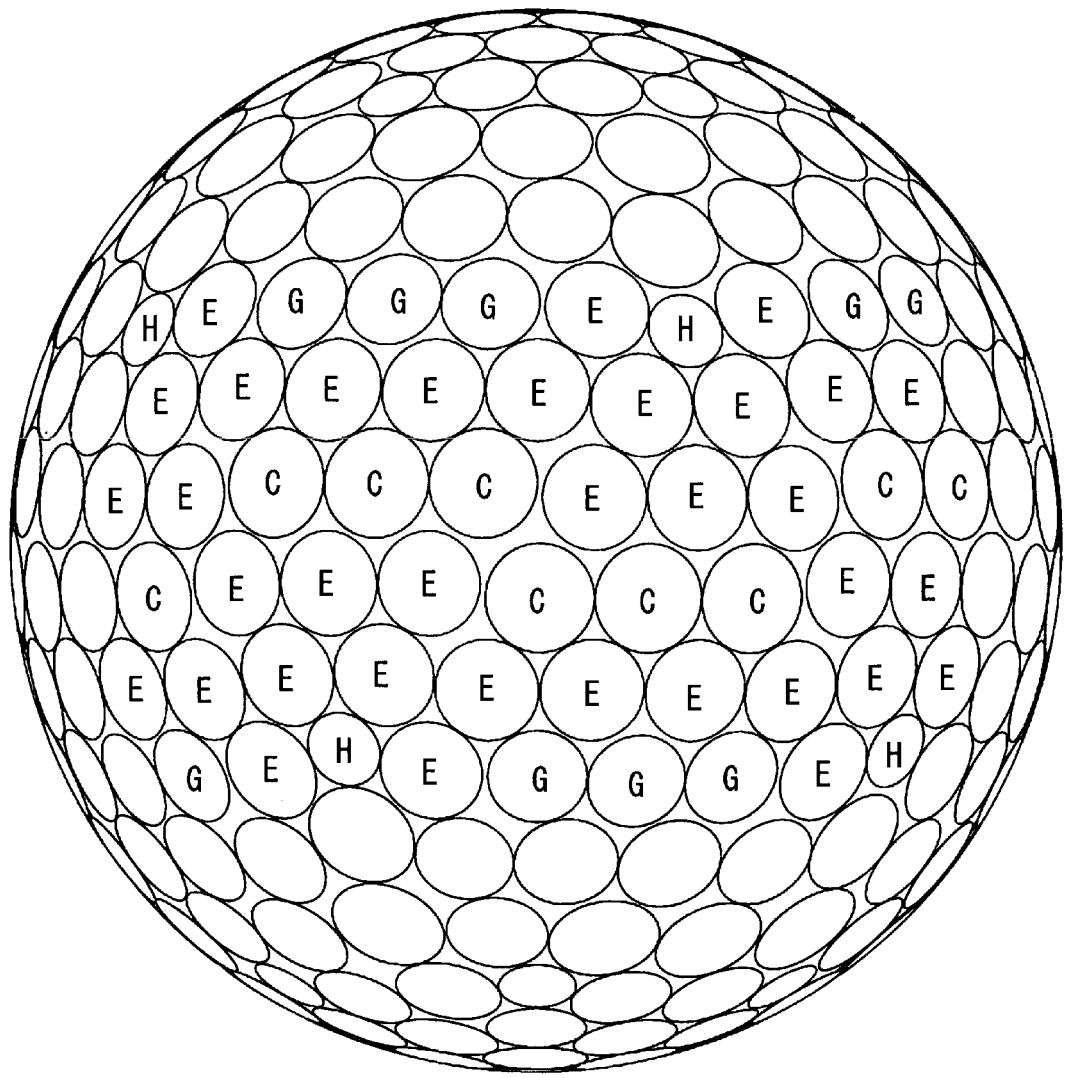
FIG. 36 is a right side view illustrating the golf ball shown in FIG. 34.
Figure 37:
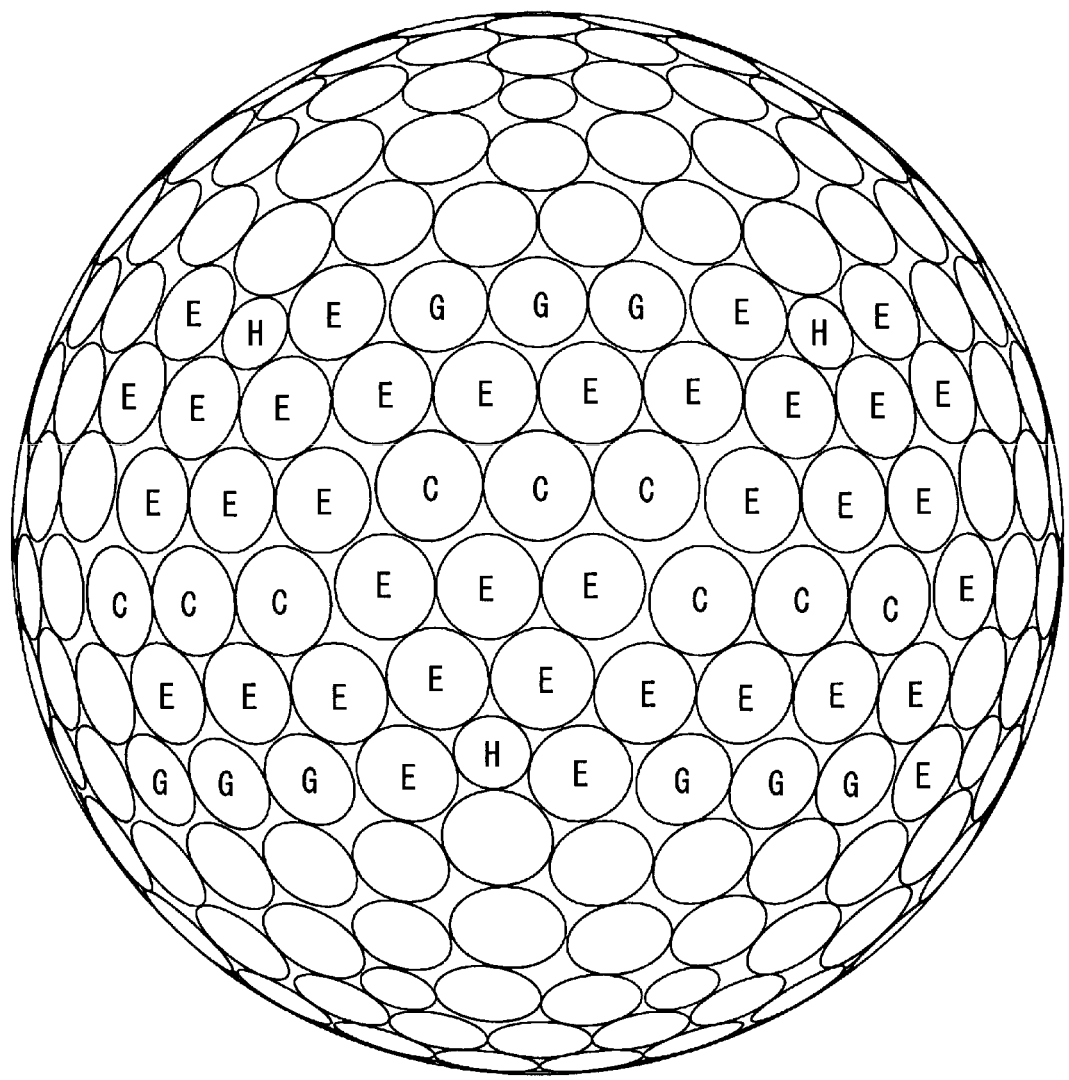
FIG. 37 is a front view illustrating the golf ball shown in FIG. 34.
Figure 38:
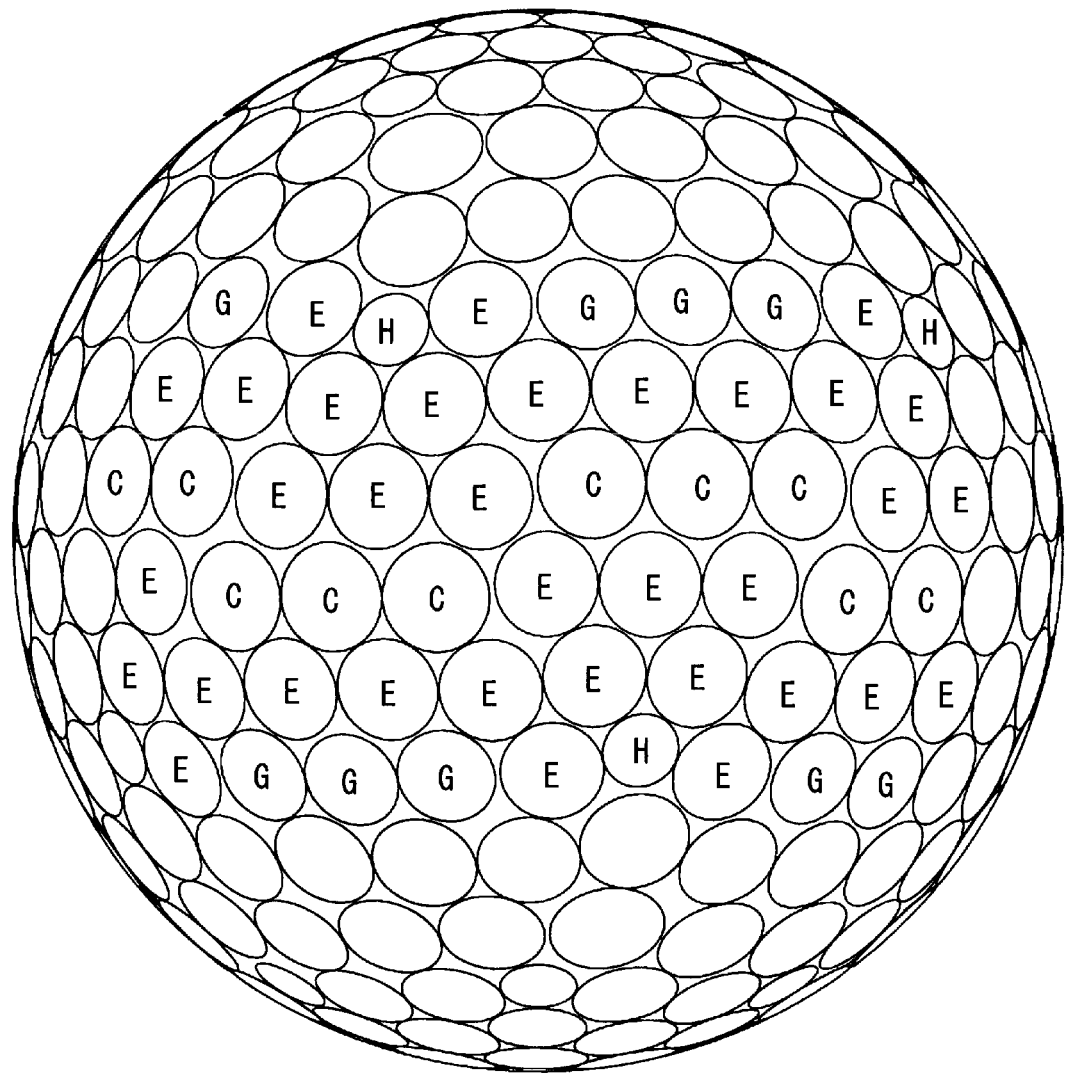
FIG. 38 is a left side view illustrating the golf ball shown in FIG. 34.
Figure 39:
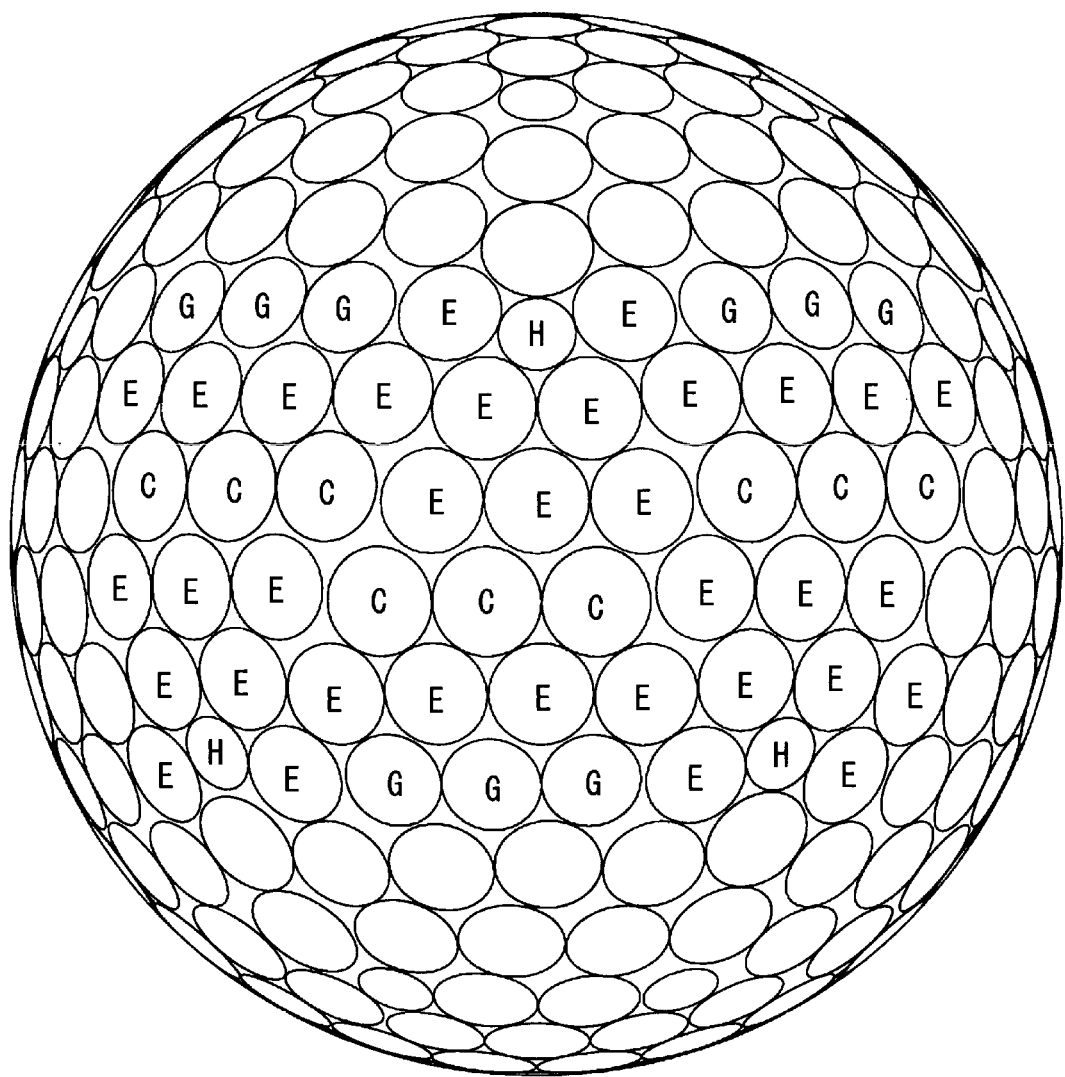
FIG. 39 is a back view illustrating the golf ball shown in FIG. 34.
Figure 40:
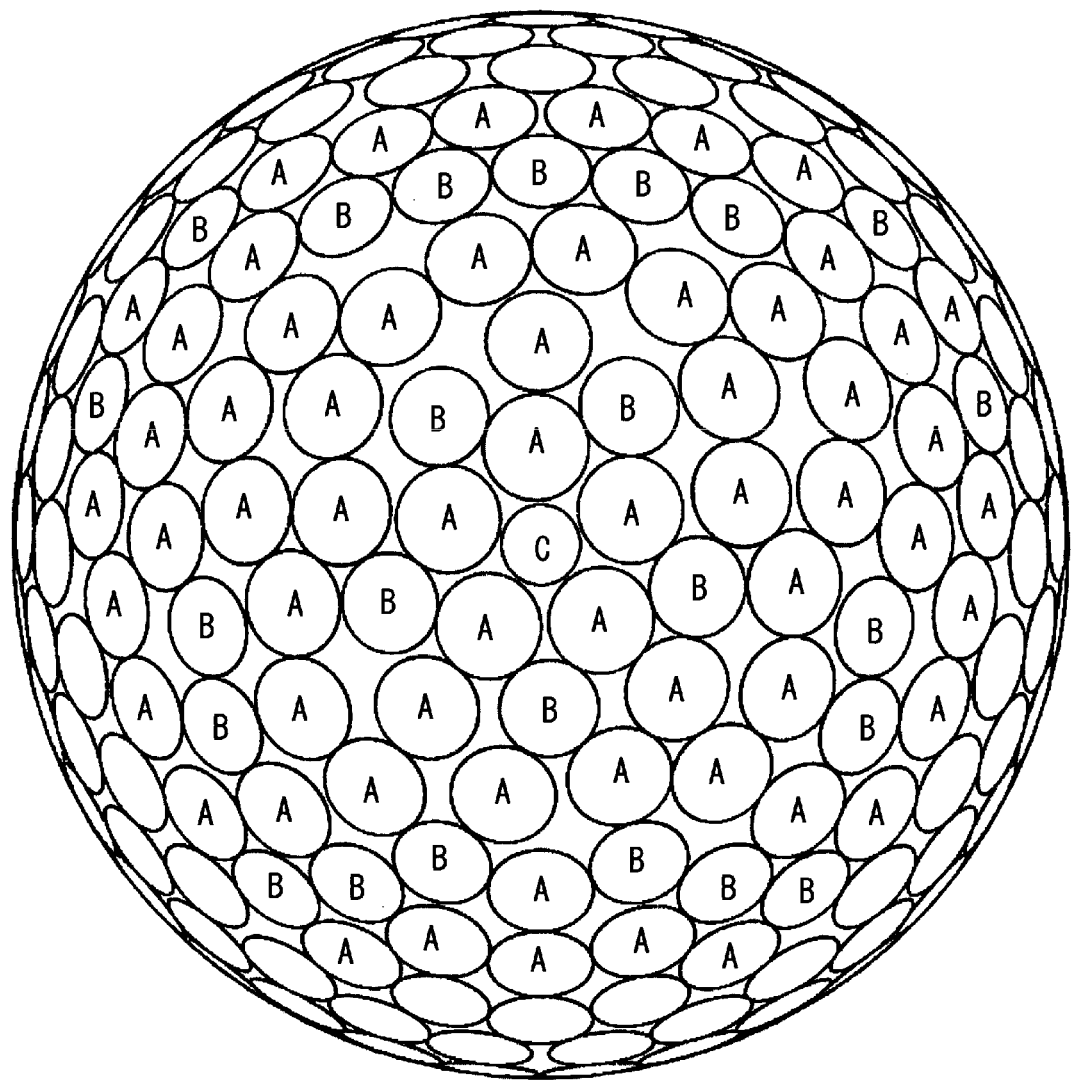
FIG. 40 is a top plan view illustrating the golf ball having the dimple pattern D6.
Figure 41:
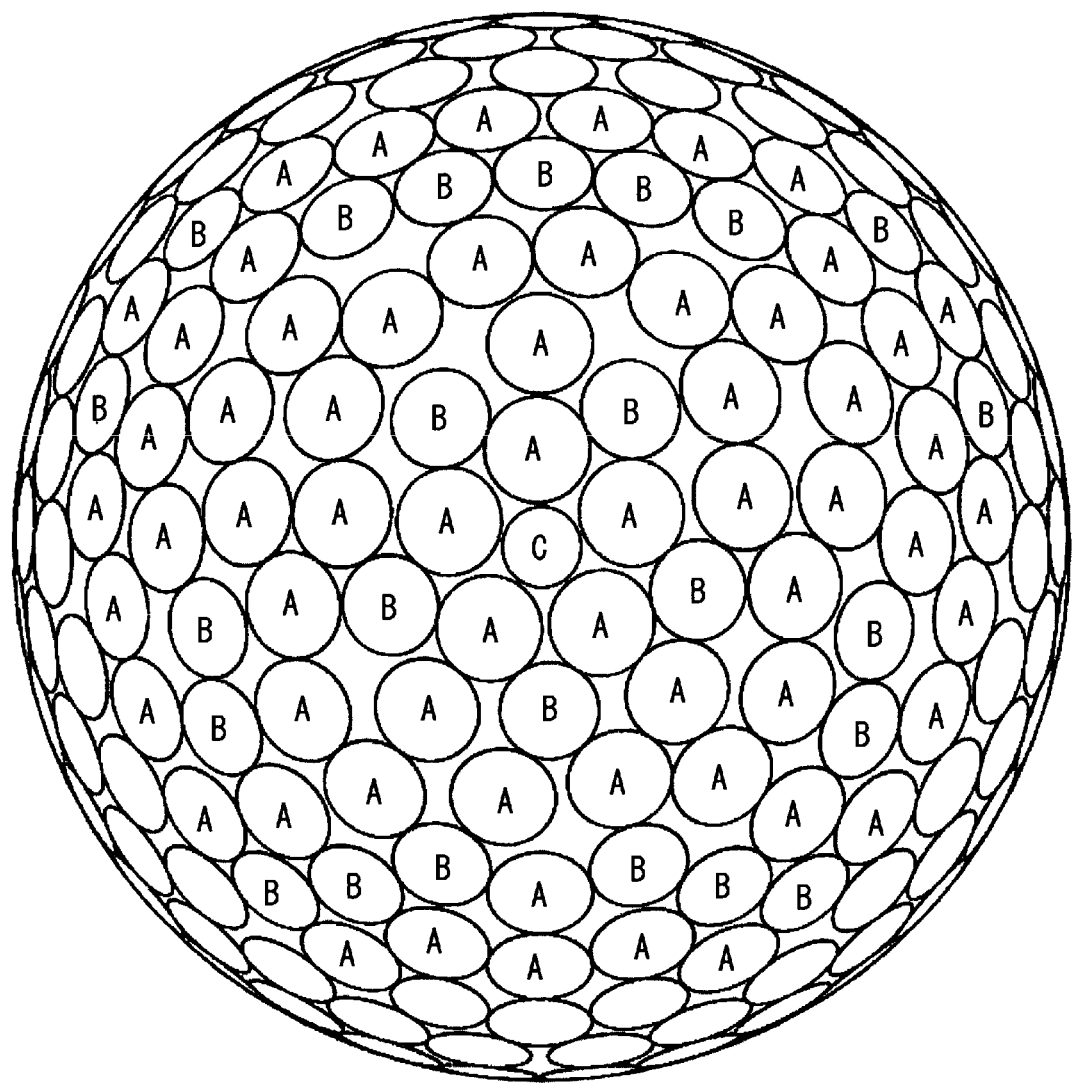
FIG. 41 is a bottom view illustrating the golf ball shown in FIG. 40.
Figure 42:
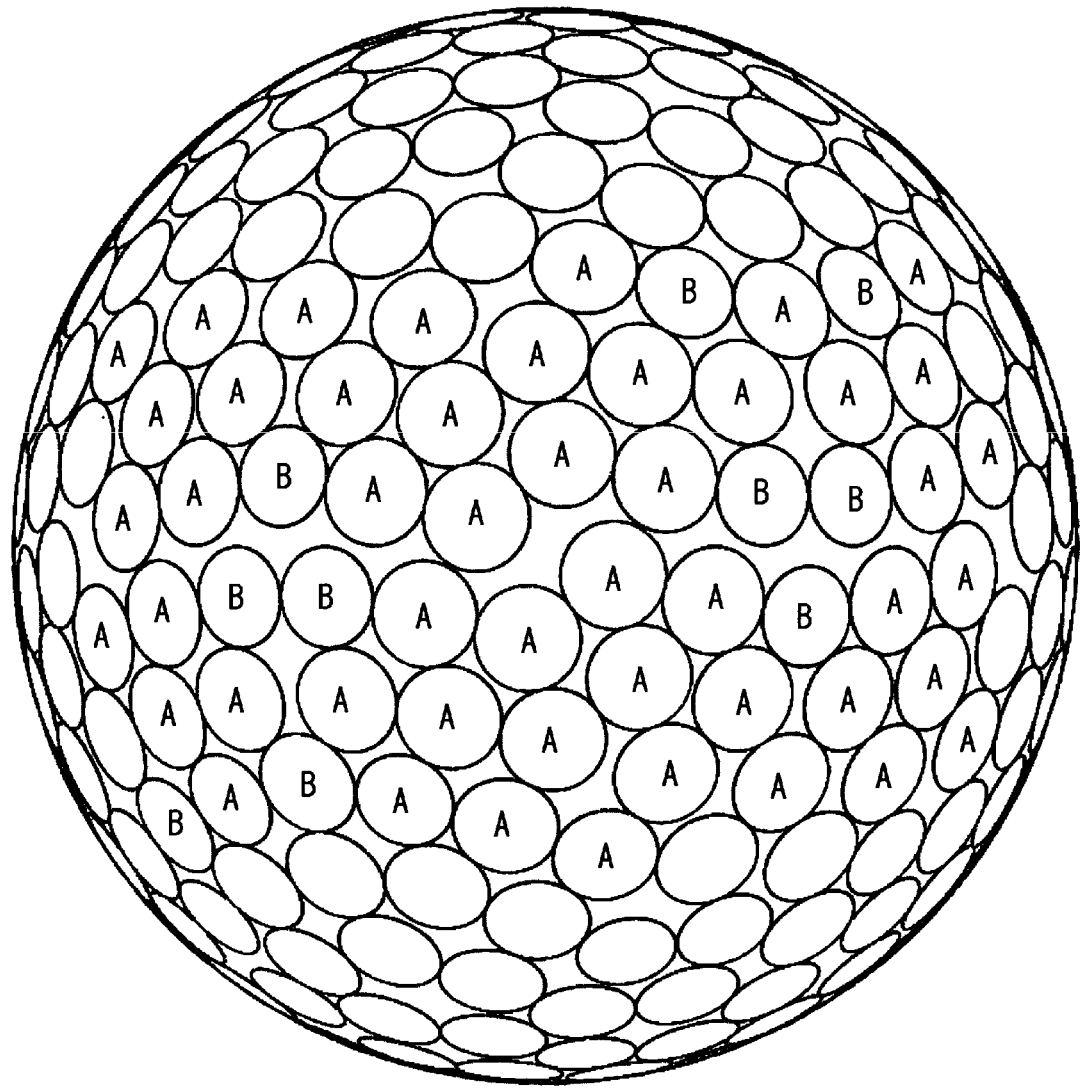
FIG. 42 is a right side view illustrating the golf ball shown in FIG. 40.
Figure 43:
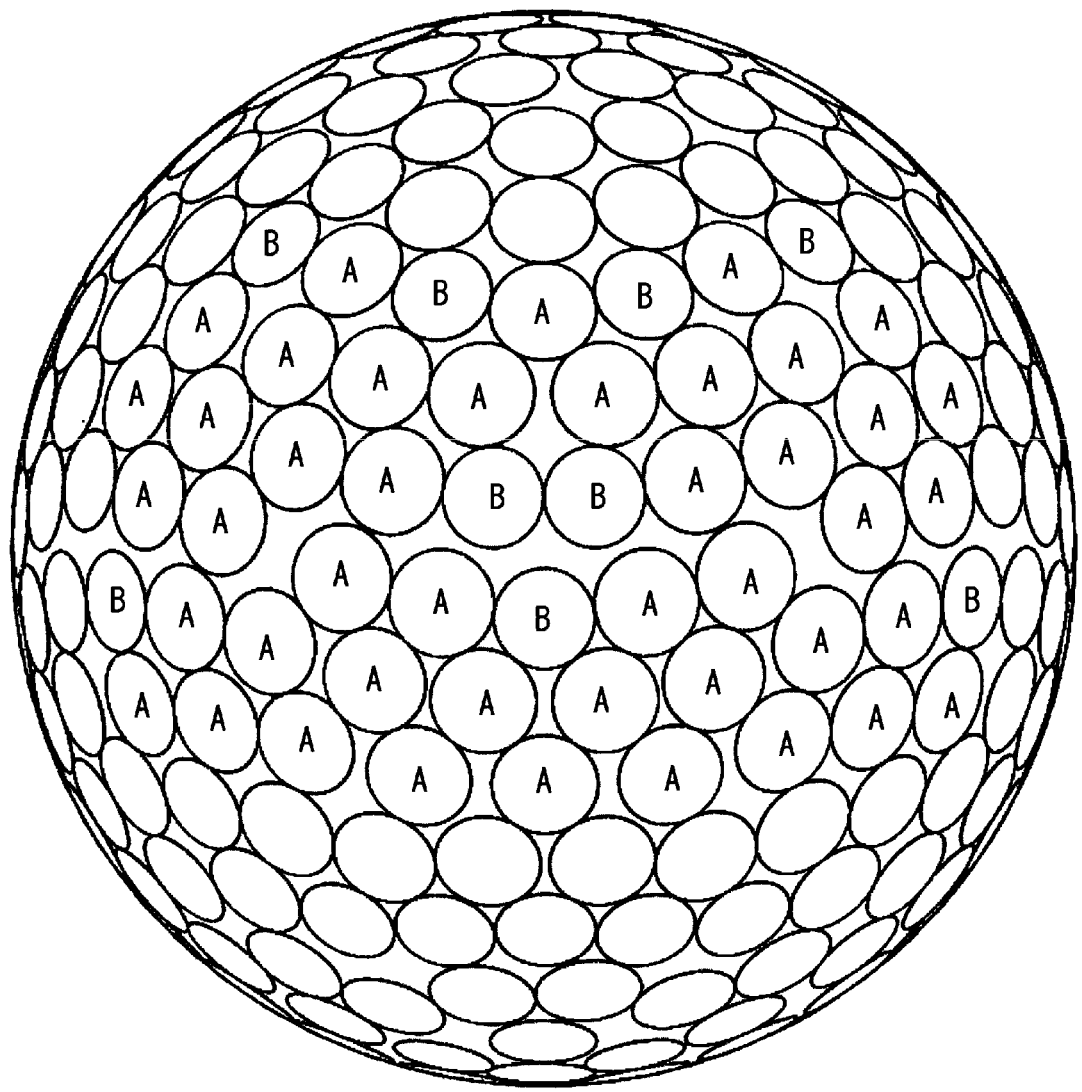
FIG. 43 is a front view illustrating the golf ball shown in FIG. 40.
Figure 44:
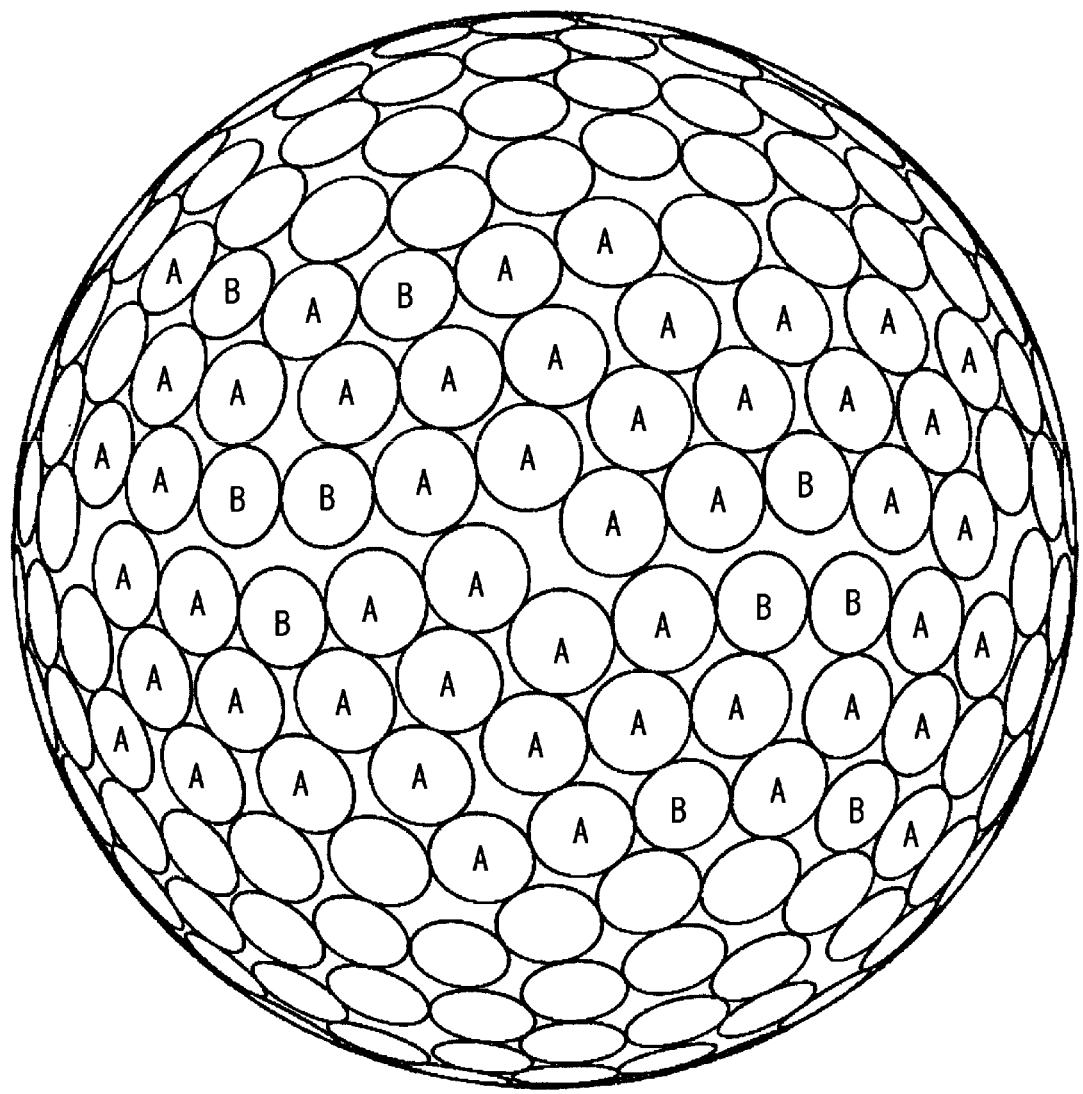
FIG. 44 is a left side view illustrating the golf ball shown in FIG. 40.
Figure 45:
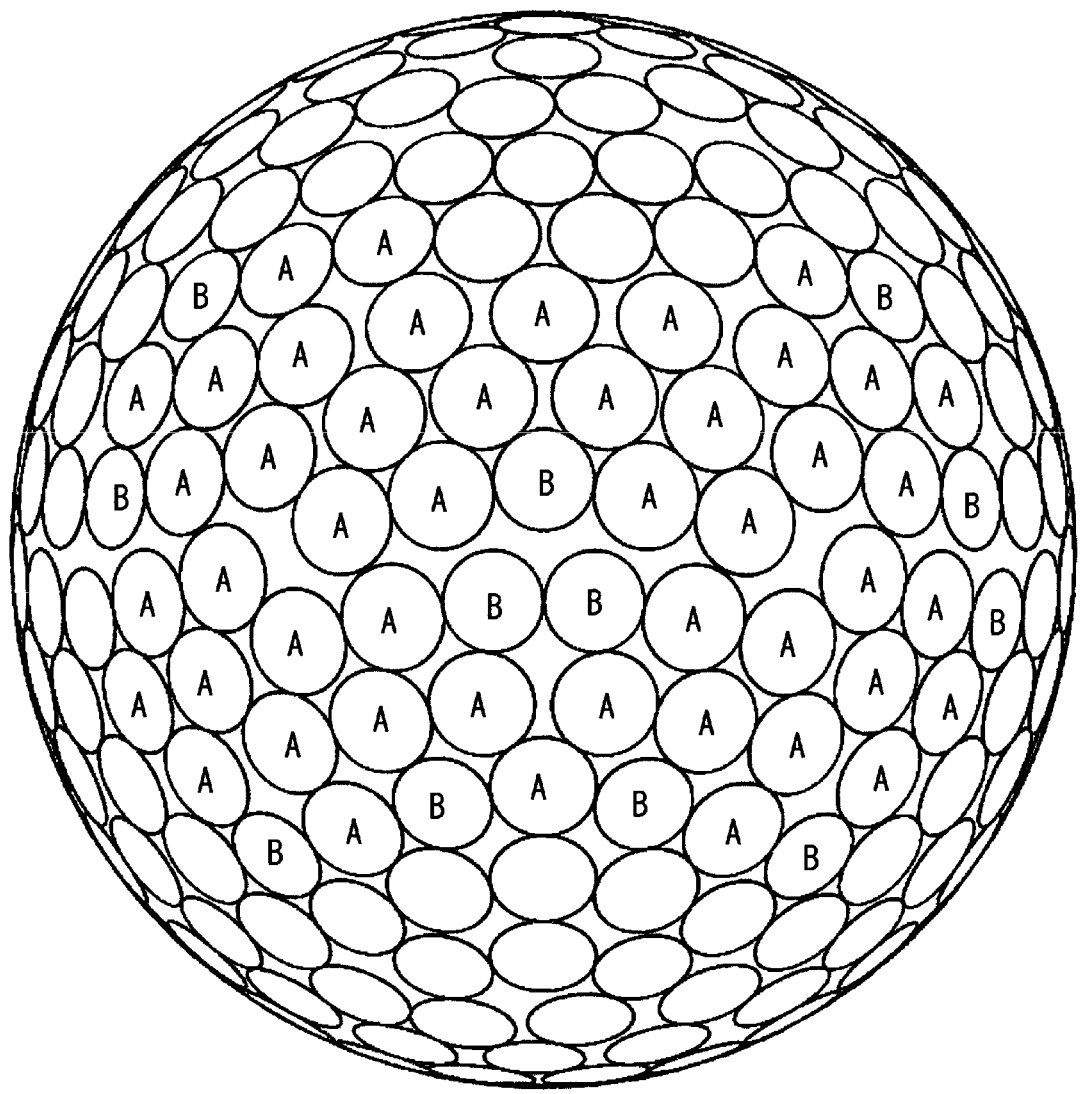
FIG. 45 is a back view illustrating the golf ball shown in FIG. 40.
Figure 46:
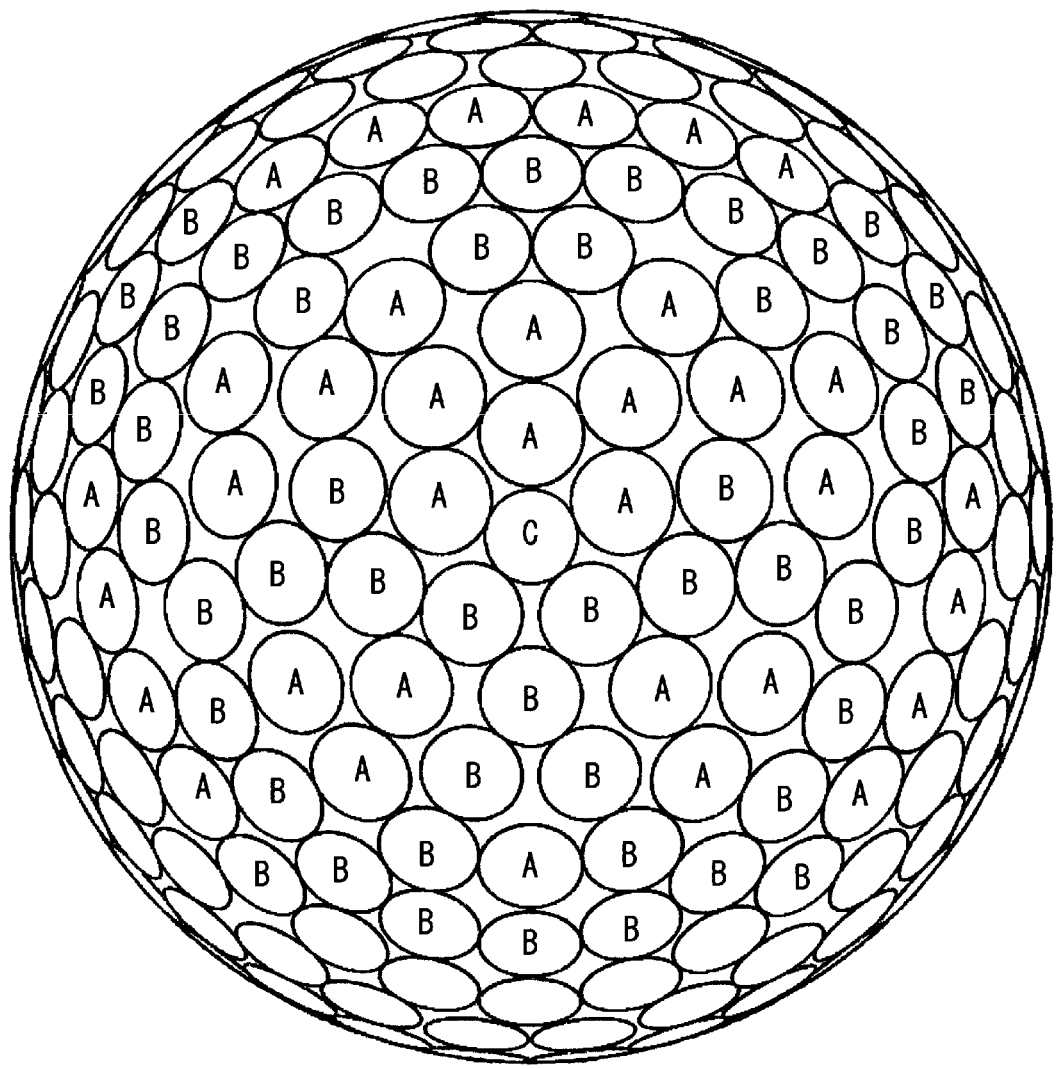
FIG. 46 is a plan view illustrating the golf ball having the dimple pattern D7.
Figure 47:
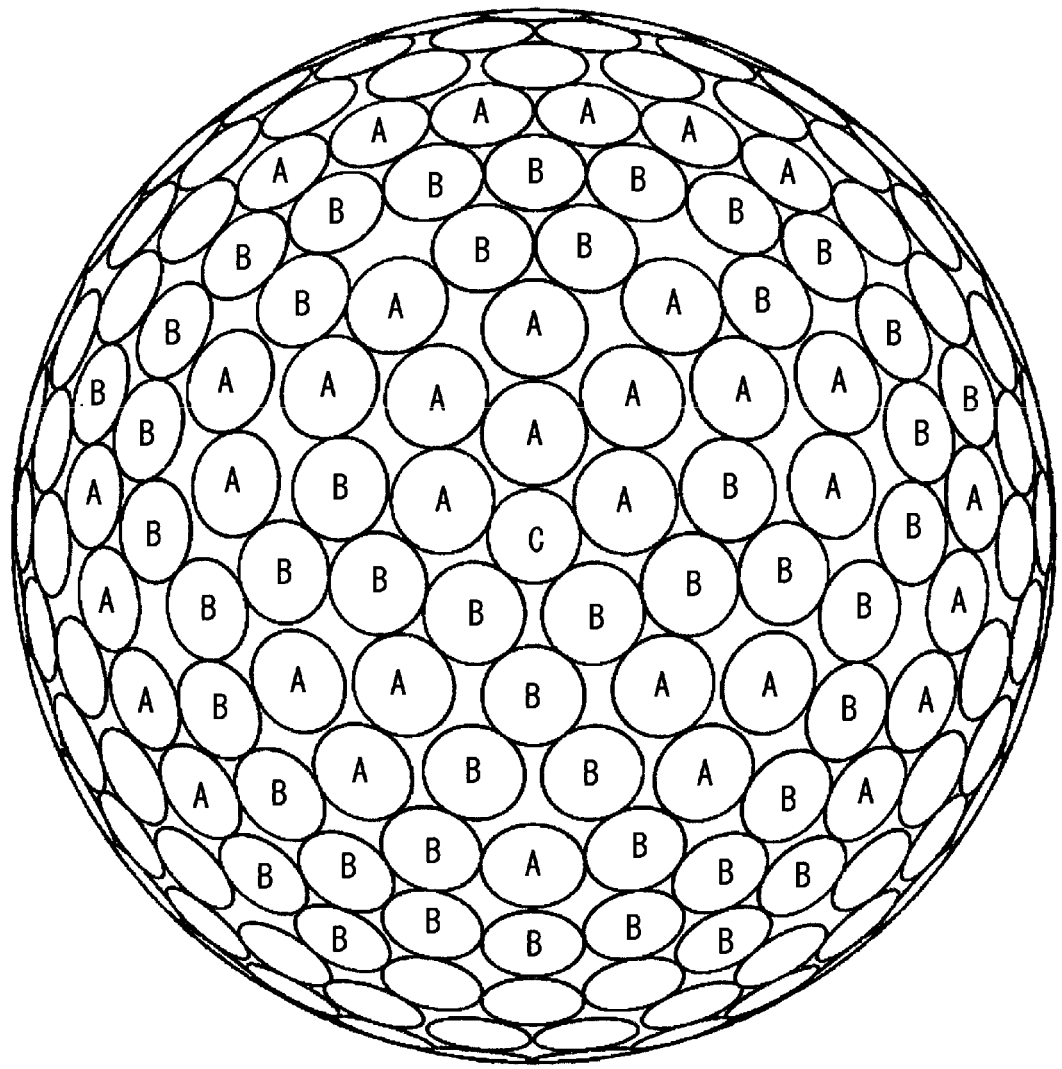
FIG. 47 is a bottom view illustrating the golf ball shown in FIG. 46.
Figure 48:
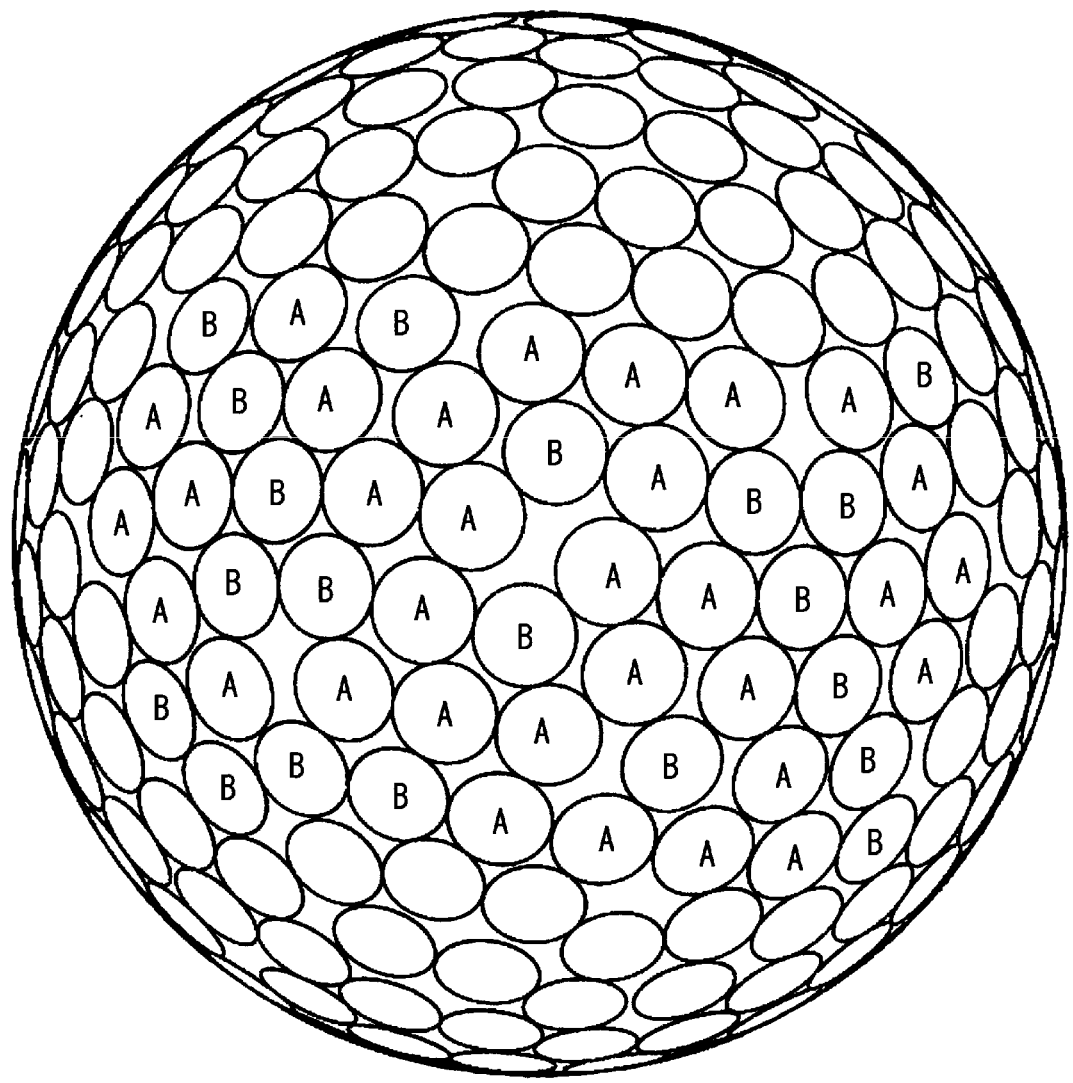
FIG. 48 is a right side view illustrating the golf ball shown in FIG. 46.
Figure 49:
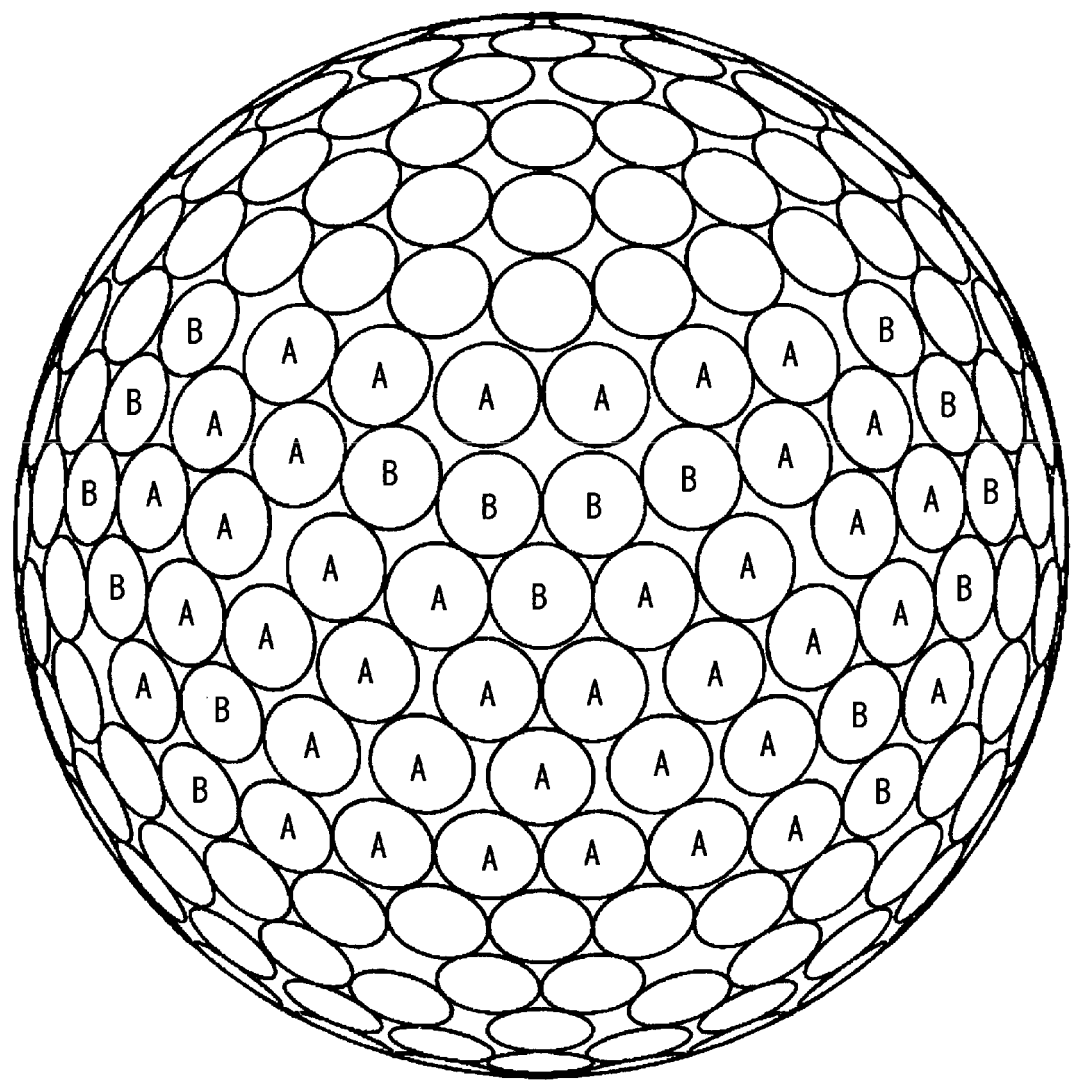
FIG. 49 is a front view illustrating the golf ball shown in FIG. 46.
Figure 50:
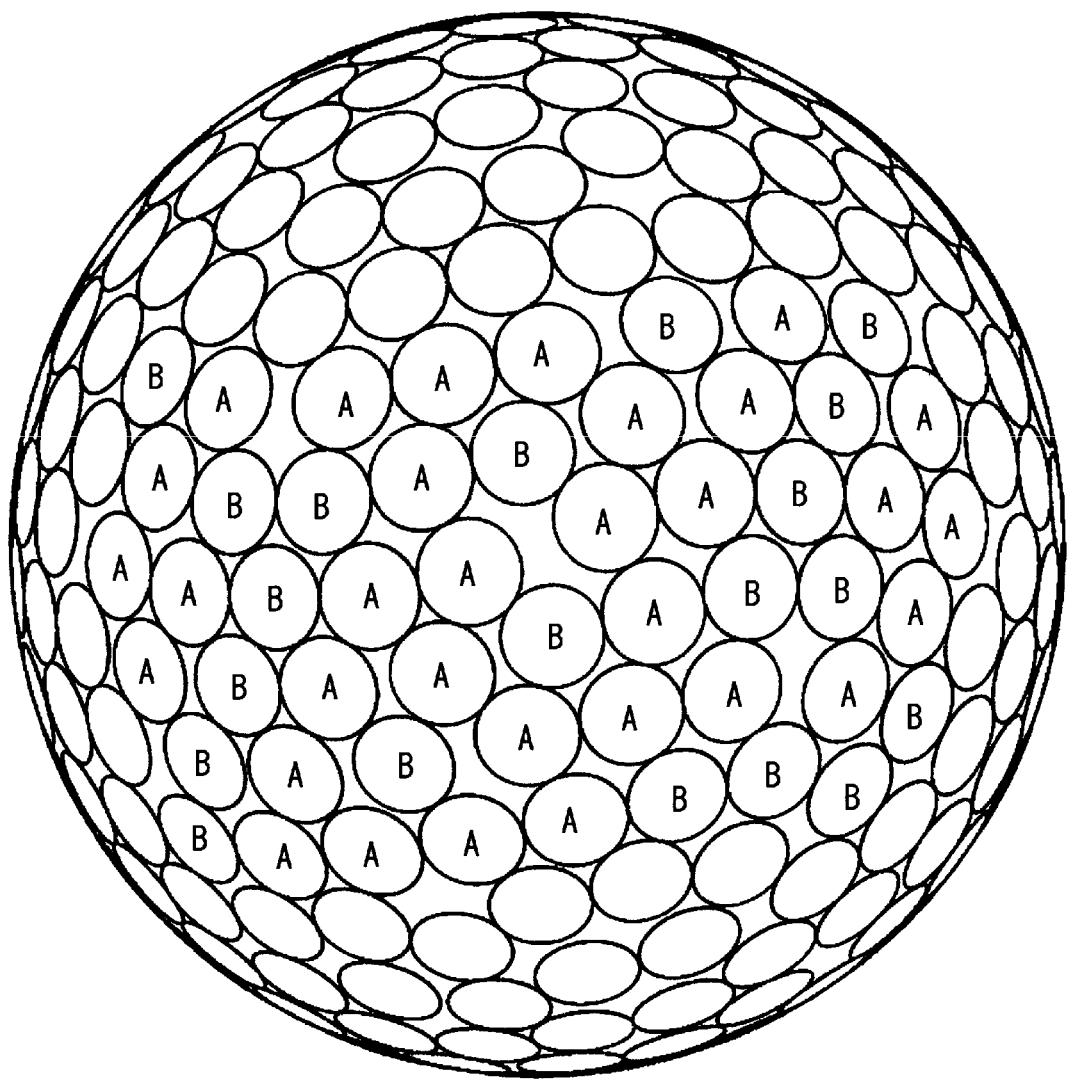
FIG. 50 is a left side view illustrating the golf ball shown in FIG. 46.
Figure 51:
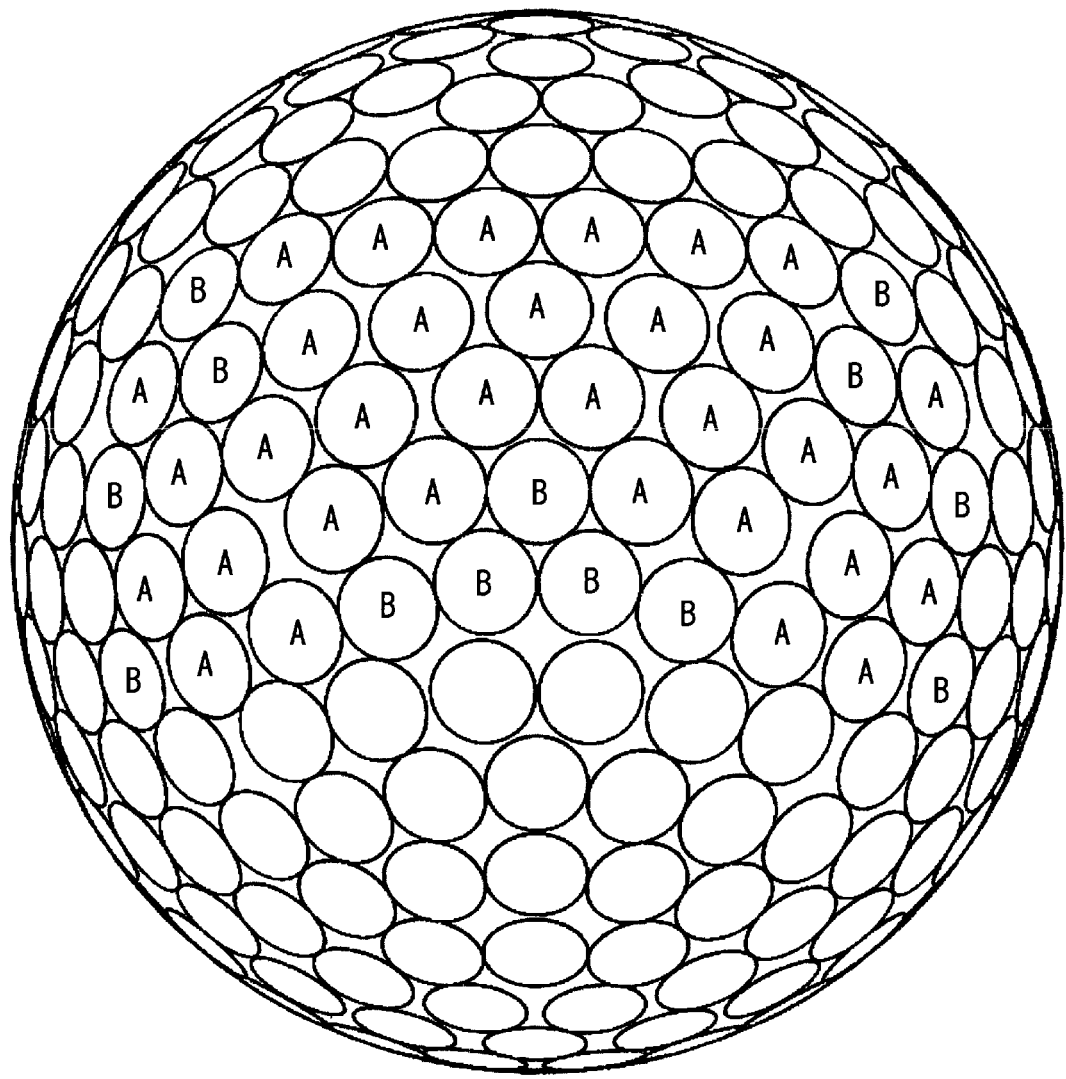
FIG. 51 is a back view illustrating the golf ball shown in FIG. 46.

| | Dimple pattern | | |
|---|---|---|---|
| | D5 | D6 | D7 |
| Top plan view | FIG. 34 | FIG. 40 | FIG. 46 |
| Bottom view | FIG. 35 | FIG. 41 | FIG. 47 |
| Right side view | FIG. 36 | FIG. 42 | FIG. 48 |
| Front view | FIG. 37 | FIG. 43 | FIG. 49 |
| Left side view | FIG. 38 | FIG. 44 | FIG. 50 |
| Back view | FIG. 39 | FIG. 45 | FIG. 51 |
| Number of dimples N | 344 | 324 | 324 |
| Occupation ratio X | 0.858 | 0.799 | 0.805 |
| Standard deviation Y (mm) | 0.310 | 0.131 | 0.057 |
| Formula (I) | Satisfy | Satisfy | Satisfy |
| Formula (II) | Satisfy | Not satisfy | Satisfy |
| Formula (III) | Not satisfy | Not satisfy | Satisfy |

TABLE 11

| | Dimple pattern | | | | |
|---|---|---|---|---|---|
| | D8 | D9 | D10 | D11 | D12 |
| Number of dimples N | 324 | 360 | 332 | 324 | 332 |
| Occupation ratio X | 0.806 | 0.773 | 0.849 | 0.820 | 0.844 |
| Standard deviation Y (mm) | 0.192 | 0.076 | 0.357 | 0.235 | 0.377 |
| Formula (I) | Not satisfy | Not satisfy | Not satisfy | Not satisfy | Not satisfy |
| Formula (II) | Not satisfy | Not satisfy | Not satisfy | Not satisfy | Not satisfy |
| Formula (III) | Not satisfy | Not satisfy | Not satisfy | Not satisfy | Not satisfy |

(5) Preparation of Paint

The polyol and the polyisocyanate shown in Table 12 were blended to prepare paints. The base resin was prepared by using a mixed solvent of MEK and toluene to have the polyol component content of 30 mass %. The curing agent was prepared by using a mixed solvent of MEK, n-butyl acetate and toluene as a solvent to have the polyisocyanate component content of 60 mass %.

TABLE 12

| Paint No. | | | A | B | C | D | E | F | G | H |
|---|---|---|---|---|---|---|---|---|---|---|
| Paint Formulation | Curing agent *2) | Biuret-modified HDI/HDI isocyanurate | 30/30 | 30/30 | 30/30 | 30/30 | 30/30 | 30/30 | 30/30 | 45/45 |
| | | IPDI component (IPDI isocyanurate) | 40 | 40 | 40 | 40 | 40 | 40 | 40 | 10 |
| | Base resin / curing agent (NCO/OH mole ratio) | | 0.2/1.0 | 0.38/1.0 | 0.5/1.0 | 0.8/1.0 | 1.0/1.0 | 1.2/1.0 | 1.6/1.0 | 0.5/1.0 |
| Paint film Properties | Coefficient of Friction | | 0.55 | 0.46 | 0.42 | 0.38 | 0.35 | 0.32 | 0.28 | 0.63 |
| | Martens Hardness (mgf/μm²) | | 0.09 | 0.14 | 0.25 | 2.80 | 3.60 | 4.30 | 6.50 | 0.07 |
| | 100% elastic modulus (kgf/cm²) | | 16 | 22 | 90 | 201 | 240 | 279 | *1) | 10 |
| | 50% elastic modulus (kgf/cm²) | | 12 | 14 | 58 | 148 | 180 | 209 | 251 | 10 |
| | 10% elastic modulus (kgf/cm²) | | 5 | 8 | 38 | 126 | 160 | 186 | 275 | 2 |

*1) Elongation: less than 100 %
*2) Curing agent formulation: mass ratio

Material used in Tables 12 are follows.

Base Resin

Polin #950 available from SHINTO PAINT: urethane polyol with a hydroxyl value of 128 mgKOH/g, and composed of the polyol component (trimethylolpropane and polytetramethylene ether glycol) and the polyisocyanate component (isophorone diisocyanate)

Curing Agent

Figure 15:
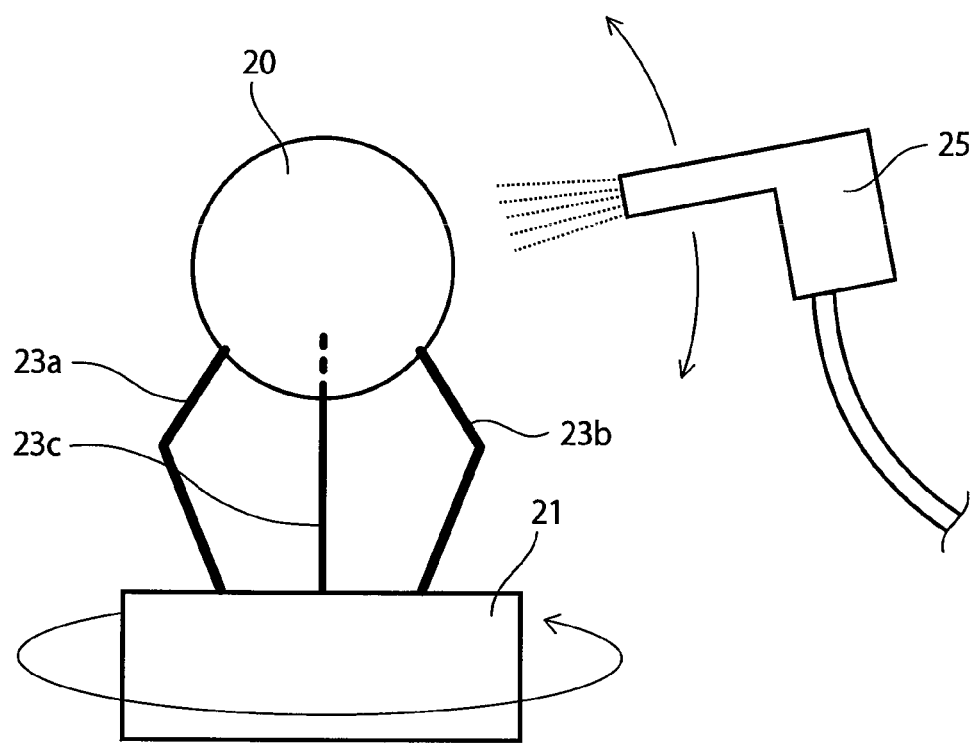
FIG. 15 is a schematic view illustrating an embodiment of applying the paint with an air gun.

Isocyanurate of hexamethylene diisocyanate: Duranate TKA-100 (NCO content: 21.7%) available from Asahi Kasei Corporation Biuret-modified product of hexamethylene diisocyanate: Duranate 21S-75E (NCO content: 15.5° A)) available from Asahi Kasei Corporation Isocyanurate of isophorone diisocyanate: VESTANAT T1890 (NCO content: 12.0%) available from Degussa (6) Formation of Paint Film The surfaces of the golf ball bodies obtained in (5) were subjected to the sandblast treatment, and the marks were formed. Then, the paints were applied to the golf ball bodies with the spray-gun, and the paints were dried in the oven heated at 40° C. for 24 hours to prepare the golf balls having a diameter of 42.7 mm and a mass of 45.6 g. The thickness of the paint film was 20 μm. The golf ball bodies 20 were placed in the rotating member 21 (23a to 23b: prong) shown in FIG. 15, which rotated at 300 rpm. The application of the paint was conducted by spacing a spray distance (7 cm) between the air gun 25 and the golf ball body 20 while moving the air gun 25 in a up and down direction. The painting interval in the overpainting operation was set to 1.0 second. Application of the paint was conducted under the spraying conditions of spraying air pressure: 0.15 MPa, compressed air tank pressure: 0.10 MPa, and painting time per one application: 1 second, atmosphere temperature: 20° C. to 27° C., and atmosphere humidity: 65% or less.

The characteristics and results of the golf ball of the present invention were shown in Tables 13 and 19.

TABLE 13

| | Golf ball No. | | 1 | 2 | 3 | 4 | 5 | 6 |
|---|---|---|---|---|---|---|---|---|
| Spherical core | Core structure | | Single layer | Single layer | Single layer | Single layer | Single layer | Single layer |
| | Rubber composition No. | | 1 | 2 | 3 | 4 | 5 | 6 |
| | Vulcanization condition | Temperature (° C.) | 170 | 170 | 170 | 170 | 170 | 170 |
| | | Time (min.) | 25 | 25 | 25 | 25 | 25 | 25 |
| | Diameter (mm) | | 39.7 | 39.7 | 39.7 | 39.7 | 39.7 | 39.7 |
| | Hardness distribution (JIS-C) | 0% point hardness | 57.0 | 55.0 | 55.0 | 56.5 | 55.5 | 53.5 |
| | | 12.5% point hardness | 68.0 | 64.0 | 62.0 | 59.5 | 59.0 | 58.5 |
| | | 25% point hardness | 73.0 | 68.0 | 67.5 | 64.5 | 64.0 | 61.5 |
| | | 37.5% point hardness | 74.0 | 70.0 | 69.5 | 67.0 | 67.0 | 65.0 |
| | | 50% point hardness | 74.0 | 73.5 | 71.5 | 70.0 | 69.5 | 68.0 |
| | | 62.5% point hardness | 74.0 | 75.0 | 72.5 | 74.0 | 72.0 | 70.5 |
| | | 75% point hardness | 78.0 | 76.5 | 77.5 | 80.5 | 80.0 | 73.5 |
| | | 87.5% point hardness | 82.0 | 81.5 | 82.5 | 85.0 | 84.0 | 76.0 |
| | | 100% point hardness | 87.0 | 86.0 | 86.5 | 89.0 | 87.0 | 81.0 |
| | Inner core layer hardness difference Hs1-Ho (JIS-C) | | — | — | — | — | — | — |
| | Outer core layer hardness difference Hs2-Hb (JIS-C) | | — | — | — | — | — | — |
| | Spherical core hardness difference Hs-Ho (JIS-C) | | 30.0 | 31.0 | 31.5 | 32.5 | 31.5 | 27.5 |
| | $R^2$ of approximated curve | | 0.88 | 0.95 | 0.96 | 0.99 | 0.99 | 0.99 |
| | Slope of approximated curve | | 0.23 | 0.26 | 0.28 | 0.33 | 0.32 | 0.26 |
| Intermediate layer | Intermediate layer composition No. | | a | a | a | a | a | a |
| | Slab hardness Hm (Shore D) | | 65 | 65 | 65 | 65 | 65 | 65 |
| | Diameter (mm) | | 41.7 | 41.7 | 41.7 | 41.7 | 41.7 | 41.7 |
| | Thickness (mm) | | 1.0 | 1.0 | 1.0 | 1.0 | 1.0 | 1.0 |
| Cover | Cover composition No. | | A | A | A | A | A | A |
| | Slab hardness Hc (Shore D) | | 29 | 29 | 29 | 29 | 29 | 29 |
| | Thickness (mm) | | 0.5 | 0.5 | 0.5 | 0.5 | 0.5 | 0.5 |
| | Hardness difference Hm-Hc (Shore D) | | 36 | 36 | 36 | 36 | 36 | 36 |
| | Paint No. | | B | B | B | B | B | B |
| | Dimple pattern | | D1 | D1 | D1 | D1 | D1 | D1 |
| Ball properties | Compression deformation amount (mm) | | 2.8 | 2.8 | 2.8 | 2.8 | 2.8 | 2.8 |
| | Driver spin rate (rpm) | | 3300 | 3150 | 3100 | 3000 | 3050 | 3100 |
| | Driver flying distance (m) | | 233 | 238 | 239 | 242 | 241 | 239 |
| | Approach: spin rate (rpm) | | 7050 | 7050 | 7050 | 7000 | 7000 | 7000 |
| | (around the greens) Approach: spin rate (rpm) | | 2800 | 2800 | 2800 | 2750 | 2750 | 2750 |
| | Durability | | 100 | 108 | 110 | 115 | 113 | 110 |

TABLE 14

| | Golf ball No. | | 7 | 8 | 9 | 10 | 11 | 12 |
|---|---|---|---|---|---|---|---|---|
| Spherical core | Core structure | | Single layer | Single layer | Single layer | Single layer | Single layer | Single layer |
| | Rubber composition No. | | 7 | 8 | 9 | 10 | 11 | 12 |
| | Vulcanization condition | Temperature (° C.) | 170 | 170 | 170 | 170 | 170 | 170 |
| | | Time (min.) | 25 | 25 | 25 | 25 | 25 | 25 |
| | Diameter (mm) | | 39.7 | 39.7 | 39.7 | 39.7 | 39.7 | 39.7 |
| | Hardness distribution (JIS-C) | 0% point hardness | 64.0 | 57.5 | 56.0 | 57.0 | 56.0 | 56.5 |
| | | 12.5% point hardness | 68.0 | 61.0 | 59.0 | 60.5 | 59.5 | 59.5 |
| | | 25% point hardness | 69.5 | 65.5 | 62.0 | 65.0 | 64.5 | 65.0 |
| | | 37.5% point hardness | 71.0 | 68.0 | 65.5 | 68.0 | 67.5 | 67.0 |

TABLE 14-continued

| | Golf ball No. | 7 | 8 | 9 | 10 | 11 | 12 |
|---|---|---|---|---|---|---|---|
| | 50% point hardness | 71.5 | 70.0 | 69.0 | 70.0 | 69.5 | 70.0 |
| | 62.5% point hardness | 72.5 | 71.5 | 71.0 | 72.0 | 72.0 | 74.0 |
| | 75% point hardness | 73.5 | 81.0 | 80.0 | 80.5 | 80.5 | 80.0 |
| | 87.5% point hardness | 76.0 | 85.0 | 82.0 | 85.0 | 84.5 | 85.0 |
| | 100% point hardness | 77.0 | 89.0 | 86.0 | 89.0 | 87.5 | 89.0 |
| | Inner core layer hardness difference Hs1-Ho (JIS-C) | — | — | — | — | — | — |
| | Outer core layer hardness difference Hs2-Hb (JIS-C) | — | — | — | — | — | — |
| | Spherical core hardness difference Hs-Ho (JIS-C) | 13.0 | 31.5 | 30.0 | 32.0 | 31.5 | 32.5 |
| | $R^2$ of approximated curve | 0.95 | 0.97 | 0.98 | 0.97 | 0.98 | 0.98 |
| | Slope of approximated curve | 0.11 | 0.31 | 0.31 | 0.32 | 0.32 | 0.32 |
| Intermediate layer | Intermediate layer composition No. | a | a | a | a | a | a |
| | Slab hardness Hm (Shore D) | 65 | 65 | 65 | 65 | 65 | 65 |
| | Diameter (mm) | 41.7 | 41.7 | 41.7 | 41.7 | 41.7 | 41.7 |
| | Thickness (mm) | 1.0 | 1.0 | 1.0 | 1.0 | 1.0 | 1.0 |
| Cover | Cover composition No. | A | A | A | A | A | A |
| | Slab hardness Hc (Shore D) | 29 | 29 | 29 | 29 | 29 | 29 |
| | Thickness (mm) | 0.5 | 0.5 | 0.5 | 0.5 | 0.5 | 0.5 |
| | Hardness difference Hm-Hc (Shore D) | 36 | 36 | 36 | 36 | 36 | 36 |
| | Paint No. | B | B | B | B | B | B |
| | Dimple pattern | D1 | D1 | D1 | D1 | D1 | D1 |
| Ball properties | Compression deformation amount (mm) | 2.8 | 2.8 | 2.8 | 2.8 | 2.8 | 2.8 |
| | Driver spin rate (rpm) | 3200 | 3100 | 3050 | 3100 | 3050 | 3050 |
| | Driver flying distance (m) | 237 | 239 | 241 | 238 | 240 | 241 |
| | Approach: spin rate (rpm) | 7050 | 7050 | 7000 | 7050 | 7000 | 7000 |
| | (around the greens) Approach: spin rate (rpm) | 2800 | 2800 | 2750 | 2800 | 2750 | 2750 |
| | Durability | 107 | 110 | 111 | 110 | 112 | 113 |

TABLE 15

| | Golf ball No. | 13 | 14 | 15 | 16 | 17 | 18 |
|---|---|---|---|---|---|---|---|
| Spherical core | Core structure | Single layer | Single layer | Single layer | Single layer | Single layer | Single layer |
| | Rubber composition No. | 13 | 4 | 4 | 14 | 4 | 14 |
| Vulcanization condition | Temperature (° C.) | 170 | 170 | 170 | 170 | 170 | 170 |
| | Time (min.) | 25 | 25 | 25 | 25 | 25 | 25 |
| | Diameter (mm) | 39.7 | 39.7 | 39.7 | 39.7 | 38.9 | 38.3 |
| Hardness distribution (JIS-C) | 0% point hardness | 56.5 | 56.5 | 56.5 | 56.0 | 56.5 | 56.0 |
| | 12.5% point hardness | 59.5 | 59.5 | 59.5 | 59.0 | 59.5 | 59.0 |
| | 25% point hardness | 64.5 | 64.5 | 64.5 | 64.0 | 64.5 | 64.0 |
| | 37.5% point hardness | 67.0 | 67.0 | 67.0 | 66.5 | 67.0 | 66.5 |
| | 50% point hardness | 71.0 | 70.0 | 70.0 | 69.5 | 70.0 | 69.5 |
| | 62.5% point hardness | 74.0 | 74.0 | 74.0 | 73.5 | 74.0 | 73.5 |
| | 75% point hardness | 80.5 | 80.5 | 80.5 | 80.0 | 80.5 | 80.0 |
| | 87.5% point hardness | 85.0 | 85.0 | 85.0 | 84.5 | 85.0 | 84.5 |
| | 100% point hardness | 89.0 | 89.0 | 89.0 | 88.5 | 89.0 | 88.5 |
| | Inner core layer hardness difference Hs1-Ho (JIS-C) | — | — | — | — | — | — |
| | Outer core layer hardness difference Hs2-Hb (JIS-C) | — | — | — | — | — | — |
| | Spherical core hardness difference Hs-Ho (JIS-C) | 32.5 | 32.5 | 32.5 | 32.5 | 32.5 | 32.5 |
| | $R^2$ of approximated curve | 0.99 | 0.99 | 0.99 | 0.99 | 0.99 | 0.99 |
| | Slope of approximated curve | 0.33 | 0.33 | 0.33 | 0.33 | 0.33 | 0.33 |
| Intermediate layer | Intermediate layer composition No. | a | a | a | b | a | a |
| | Slab hardness Hm (Shore D) | 65 | 65 | 65 | 65 | 65 | 65 |
| | Diameter (mm) | 41.7 | 41.7 | 41.7 | 41.7 | 40.9 | 41.7 |
| | Thickness (mm) | 1.0 | 1.0 | 1.0 | 1.0 | 1.0 | 1.7 |
| Cover | Cover composition No. | A | B | C | D | A | A |
| | Slab hardness Hc (Shore D) | 29 | 36 | 47 | 60 | 29 | 29 |
| | Thickness (mm) | 0.5 | 0.5 | 0.5 | 0.5 | 0.9 | 0.5 |
| | Hardness difference Hm-Hc (Shore D) | 36 | 29 | 18 | -4 | 36 | 36 |
| | Paint No. | B | B | B | B | B | B |
| | Dimple pattern | D1 | D1 | D1 | D1 | D1 | D1 |
| Ball properties | Compression deformation amount (mm) | 2.8 | 2.8 | 2.8 | 2.8 | 2.8 | 2.7 |
| | Driver spin rate (rpm) | 3000 | 2900 | 2850 | 2750 | 3150 | 2950 |
| | Driver flying distance (m) | 242 | 244 | 245 | 247 | 238 | 239 |
| | Approach: spin rate (rpm) | 7000 | 6850 | 6700 | 6000 | 7200 | 6900 |
| | (around the greens) Approach: spin rate (rpm) | 2750 | 2650 | 2600 | 2300 | 2900 | 2700 |
| | Durability | 115 | 109 | 106 | 103 | 118 | 117 |

TABLE 16

| | | | 19 | 20 | 21 | 22 | 23 | 24 |
|---|---|---|---|---|---|---|---|---|
| Golf ball No. | | | | | | | | |
| Spherical core | Core structure | | Single layer | Single layer | Single layer | Single layer | Single layer | Single layer |
| | Rubber composition No. | | 4 | 4 | 4 | 4 | 4 | 4 |
| | Vulcanization condition | Temperature (° C.) | 170 | 170 | 170 | 170 | 170 | 170 |
| | | Time (min.) | 25 | 25 | 25 | 25 | 25 | 25 |
| | Diameter (mm) | | 39.7 | 39.7 | 39.7 | 39.7 | 39.7 | 39.7 |
| | Hardness distribution (JIS-C) | 0% point hardness | 56.5 | 56.5 | 56.5 | 56.5 | 56.5 | 56.5 |
| | | 12.5% point hardness | 59.5 | 59.5 | 59.5 | 59.5 | 59.5 | 59.5 |
| | | 25% point hardness | 64.5 | 64.5 | 64.5 | 64.5 | 64.5 | 64.5 |
| | | 37.5% point hardness | 67.0 | 67.0 | 67.0 | 67.0 | 67.0 | 67.0 |
| | | 50% point hardness | 70.0 | 70.0 | 70.0 | 70.0 | 70.0 | 70.0 |
| | | 62.5% point hardness | 74.0 | 74.0 | 74.0 | 74.0 | 74.0 | 74.0 |
| | | 75% point hardness | 80.5 | 80.5 | 80.5 | 80.5 | 80.5 | 80.5 |
| | | 87.5% point hardness | 85.0 | 85.0 | 85.0 | 85.0 | 85.0 | 85.0 |
| | | 100% point hardness | 89.0 | 89.0 | 89.0 | 89.0 | 89.0 | 89.0 |
| | Inner core layer hardness difference Hs1-Ho (JIS-C) | | — | — | — | — | — | — |
| | Outer core layer hardness difference Hs2-Hb (JIS-C) | | — | — | — | — | — | — |
| | Spherical core hardness difference Hs-Flo (JIS-C) | | 32.5 | 32.5 | 32.5 | 32.5 | 32.5 | 32.5 |
| | $R^2$ of approximated curve | | 0.99 | 0.99 | 0.99 | 0.99 | 0.99 | 0.99 |
| | Slope of approximated curve | | 0.33 | 0.33 | 0.33 | 0.33 | 0.33 | 0.33 |
| Intermediate layer | Intermediate layer composition No. | | a | a | a | a | a | a |
| | Slab hardness Hm (Shore D) | | 65 | 65 | 65 | 65 | 65 | 65 |
| | Diameter (mm) | | 41.7 | 41.7 | 41.7 | 41.7 | 41.7 | 41.7 |
| | Thickness (mm) | | 1.0 | 1.0 | 1.0 | 1.0 | 1.0 | 1.0 |
| Cover | Cover composition No. | | A | A | A | A | A | A |
| | Slab hardness Hc (Shore D) | | 29 | 29 | 29 | 29 | 29 | 29 |
| | Thickness (mm) | | 0.5 | 0.5 | 0.5 | 0.5 | 0.5 | 0.5 |
| | Hardness difference Hm-Hc (Shore D) | | 36 | 36 | 36 | 36 | 36 | 36 |
| | Paint No. | | A | C | D | E | H | F |
| | Dimple pattern | | D1 | D1 | D1 | D1 | D1 | D1 |
| Ball properties | Compression deformation amount (mm) | | 2.8 | 2.8 | 2.8 | 2.8 | 2.8 | 2.8 |
| | Driver spin rate (rpm) | | 3000 | 3000 | 3000 | 3000 | 3000 | 3000 |
| | Driver flying distance (m) | | 242 | 242 | 242 | 242 | 242 | 242 |
| | Approach: spin rate (rpm) | | 6950 | 6950 | 6800 | 6700 | 6600 | 6600 |
| | (around the greens) Approach: spin rate (rpm) | | 2750 | 2750 | 2700 | 2650 | 2300 | 2300 |
| | Durability | | 115 | 115 | 115 | 115 | 115 | 115 |

TABLE 17

| | | | 25 | 26 | 27 | 28 | 29 | 30 |
|---|---|---|---|---|---|---|---|---|
| Golf ball No. | | | | | | | | |
| Spherical core | Core structure | | Single layer | Single layer | Single layer | Single layer | Single layer | Single layer |
| | Rubber composition No. | | 4 | 4 | 4 | 4 | 4 | 4 |
| | Vulcanization condition | Temperature (° C.) | 170 | 170 | 170 | 170 | 170 | 170 |
| | | Time (min.) | 25 | 25 | 25 | 25 | 25 | 25 |
| | Diameter (mm) | | 39.7 | 39.7 | 39.7 | 39.7 | 39.7 | 39.7 |
| | Hardness distribution (JIS-C) | 0% point hardness | 56.5 | 56.5 | 56.5 | 56.5 | 56.5 | 56.5 |
| | | 12.5% point hardness | 59.5 | 59.5 | 59.5 | 59.5 | 59.5 | 59.5 |
| | | 25% point hardness | 64.5 | 64.5 | 64.5 | 64.5 | 64.5 | 64.5 |
| | | 37.5% point hardness | 67.0 | 67.0 | 67.0 | 67.0 | 67.0 | 67.0 |
| | | 50% point hardness | 70.0 | 70.0 | 70.0 | 70.0 | 70.0 | 70.0 |
| | | 62.5% point hardness | 74.0 | 74.0 | 74.0 | 74.0 | 74.0 | 74.0 |
| | | 75% point hardness | 80.5 | 80.5 | 80.5 | 80.5 | 80.5 | 80.5 |
| | | 87.5% point hardness | 85.0 | 85.0 | 85.0 | 85.0 | 85.0 | 85.0 |
| | | 100% point hardness | 89.0 | 89.0 | 89.0 | 89.0 | 89.0 | 89.0 |
| | Inner core layer hardness difference Hs1-Ho (JIS-C) | | — | — | — | — | — | — |
| | Outer core layer hardness difference Hs2-Hb (JIS-C) | | — | — | — | — | — | — |
| | Spherical core hardness difference Hs-Ho (JIS-C) | | 32.5 | 32.5 | 32.5 | 32.5 | 32.5 | 32.5 |
| | $R^2$ of approximated curve | | 0.99 | 0.99 | 0.99 | 0.99 | 0.99 | 0.99 |
| | Slope of approximated curve | | 0.33 | 0.33 | 0.33 | 0.33 | 0.33 | 0.33 |
| Intermediate layer | Intermediate layer composition No. | | a | a | a | a | a | a |
| | Slab hardness Hm (Shore D) | | 65 | 65 | 65 | 65 | 65 | 65 |
| | Diameter (mm) | | 41.7 | 41.7 | 41.7 | 41.7 | 41.7 | 41.7 |
| | Thickness (mm) | | 1.0 | 1.0 | 1.0 | 1.0 | 1.0 | 1.0 |
| Cover | Cover composition No. | | A | A | A | A | A | A |
| | Slab hardness Hc (Shore D) | | 29 | 29 | 29 | 29 | 29 | 29 |
| | Thickness (mm) | | 0.5 | 0.5 | 0.5 | 0.5 | 0.5 | 0.5 |
| | Hardness difference Hm-Hc (Shore D) | | 36 | 36 | 36 | 36 | 36 | 36 |
| | Paint No. | | G | B | B | B | B | B |
| | Dimple pattern | | D1 | D2 | D3 | D4 | D4 | D6 |
| Ball properties | Compression deformation amount (mm) | | 2.8 | 2.8 | 2.8 | 2.8 | 2.8 | 2.8 |
| | Driver spin rate (rpm) | | 3000 | 3000 | 3000 | 3000 | 3000 | 3000 |
| | Driver flying distance (m) | | 242 | 241 | 239 | 238 | 240 | 238 |
| | Approach; spin rate (rpm) | | 6450 | 7000 | 7000 | 7000 | 7000 | 7000 |

TABLE 17-continued

| Golf ball No. | 25 | 26 | 27 | 28 | 29 | 30 |
|---|---|---|---|---|---|---|
| (around the greens) Approach: spin rate (rpm) | 2200 | 2800 | 2800 | 2800 | 2800 | 2800 |
| Durability | 115 | 115 | 115 | 115 | 115 | 115 |

TABLE 18

| | | | 31 | 32 | 33 | 34 | 35 | 36 |
|---|---|---|---|---|---|---|---|---|
| | Golf ball No. | | | | | | | |
| Spherical core | Core structure | | Single layer | Single layer | Single layer | Single layer | Single layer | Single layer |
| | Rubber composition No. | | 4 | 4 | 4 | 4 | 4 | 4 |
| | Vulcanization condition | Temperature (° C.) | 170 | 170 | 170 | 170 | 170 | 170 |
| | | Time (min.) | 25 | 25 | 25 | 25 | 25 | 25 |
| | Diameter (mm) | | 39.7 | 39.7 | 39.7 | 39.7 | 39.7 | 39.7 |
| | Hardness distribution (JIS-C) | 0% point hardness | 56.5 | 56.5 | 56.5 | 56.5 | 56.5 | 56.5 |
| | | 12.5% point hardness | 59.5 | 59.5 | 59.5 | 59.5 | 59.5 | 59.5 |
| | | 25% point hardness | 64.5 | 64.5 | 64.5 | 64.5 | 64.5 | 64.5 |
| | | 37.5% point hardness | 67.0 | 67.0 | 67.0 | 67.0 | 67.0 | 67.0 |
| | | 50% point hardness | 70.0 | 70.0 | 70.0 | 70.0 | 70.0 | 70.0 |
| | | 62.5% point hardness | 74.0 | 74.0 | 74.0 | 74.0 | 74.0 | 74.0 |
| | | 75% point hardness | 80.5 | 80.5 | 80.5 | 80.5 | 80.5 | 80.5 |
| | | 87.5% point hardness | 85.0 | 85.0 | 85.0 | 85.0 | 85.0 | 85.0 |
| | | 100% point hardness | 89.0 | 89.0 | 89.0 | 89.0 | 89.0 | 89.0 |
| | Inner core layer hardness difference Ha1-Ho (JIS-C) | | — | — | — | — | — | — |
| | Outer core layer hardness difference Hs2-Hb (JIS-C) | | — | — | — | — | — | — |
| | Spherical core hardness difference Hs-Ho (JIS-C) | | 32.5 | 32.5 | 32.5 | 32.5 | 32.5 | 32.5 |
| | $R^2$ of approximated curve | | 0.99 | 0.99 | 0.99 | 0.99 | 0.99 | 0.99 |
| | Slope of approximated curve | | 0.33 | 0.33 | 0.33 | 0.33 | 0.33 | 0.33 |
| Intermediate layer | Intermediate layer composition No. | | a | a | a | a | a | a |
| | Slab hardness Hm (Shore D) | | 65 | 65 | 65 | 65 | 65 | 65 |
| | Diameter (mm) | | 41.7 | 41.7 | 41.7 | 41.7 | 41.7 | 41.7 |
| | Thickness (mm) | | 1.0 | 1.0 | 1.0 | 1.0 | 1.0 | 1.0 |
| Cover | Cover composition No. | | A | A | A | A | A | A |
| | Slab hardness Hc (Shore D) | | 29 | 29 | 29 | 29 | 29 | 29 |
| | Thickness (mm) | | 0.5 | 0.5 | 0.5 | 0.5 | 0.5 | 0.5 |
| | Hardness difference Hm-Hc (Shore D) | | 36 | 36 | 36 | 36 | 36 | 36 |
| | Paint No. | | B | B | B | B | B | B |
| | Dimple pattern | | D7 | D8 | D9 | D10 | D11 | D12 |
| Ball properties | Compression deformation amount (mm) | | 2.8 | 2.8 | 2.8 | 2.8 | 2.8 | 2.8 |
| | Driver spin rate (rpm) | | 3000 | 3000 | 3000 | 3000 | 3000 | 3000 |
| | Driver flying distance (m) | | 240 | 236 | 233 | 233 | 236 | 236 |
| | Approach: spin rate (rpm) | | 7000 | 7000 | 7000 | 7000 | 7000 | 7000 |
| | (around the greens) Approach: spin rate (rpm) | | 2800 | 2800 | 2800 | 2800 | 2800 | 2800 |
| | Durability | | 115 | 115 | 115 | 115 | 115 | 115 |

TABLE 19

| | | | 37 | | 38 | |
|---|---|---|---|---|---|---|
| | Golf ball No. | | | | | |
| Spherical core | Core structure | | Inner core layer | Outer core layer | Inner core layer | Outer core layer |
| | Rubber composition No. | | 15 | 16 | 15 | 17 |
| | Vulcanization condition | Temperature (° C.) | 170 | 170 | 170 | 170 |
| | | Time (min.) | 25 | 25 | 25 | 25 |
| | Diameter (mm) | | 15.0 | 39.7 | 15.0 | 39.7 |
| | Hardness distribution (JIS-C) | 0% point hardness | 57.0 | 64.0 | 57.0 | 63.5 |
| | | 12.5% point hardness | 58.0 | 74.0 | 58.0 | 66.0 |
| | | 25% point hardness | 58.5 | 78.0 | 58.5 | 69.5 |
| | | 37.5% point hardness | 59.0 | 78.0 | 59.0 | 71.0 |
| | | 50% point hardness | 59.0 | 78.0 | 59.0 | 73.0 |
| | | 62.5% point hardness | 59.0 | 79.0 | 59.0 | 76.5 |
| | | 75% point hardness | 59.0 | 80.0 | 59.0 | 82.5 |
| | | 87.5% point hardness | 60.0 | 84.0 | 60.0 | 87.0 |
| | | 100% point hardness | 61.0 | 89.0 | 61.0 | 91.0 |
| | Inner core layer hardness difference Hs1-Ho (JIS-C) | | 4.0 | — | 4.0 | — |
| | Outer core layer hardness difference Hs2-Hb (JIS-C) | | — | 25.0 | — | 27.5 |
| | Spherical core hardness difference Hs-Ho (JIS-C) | | | 32.0 | | 34.0 |
| | $R^2$ of approximated curve | | 0.86 | 0.81 | 0.86 | 0.97 |
| | Slope of approximated curve | | 0.03 | 0.18 | 0.03 | 0.27 |
| Intermediate layer | Intermediate layer composition No. | | | a | | a |
| | Slab hardness Hm (Shore D) | | | 65 | | 65 |
| | Diameter (mm) | | | 41.7 | | 41.7 |
| | Thickness (mm) | | | 1.0 | | 1.0 |
| Cover | Cover composition No. | | | A | | A |
| | Slab hardness Hc (Shore D) | | | 29 | | 29 |

TABLE 19-continued

| | Golf ball No. | 37 | 38 |
|---|---|---|---|
| | Thickness (mm) | 0.5 | 0.5 |
| | Hardness difference Hm-Hc (Shore D) | 36 | 36 |
| | Paint No. | B | B |
| | Dimple pattern | D1 | D1 |
| Ball properties | Compression deformation amount (mm) | 2.3 | 2.3 |
| | Driver spin rate (rpm) | 3400 | 3000 |
| | Driver flying distance (m) | 238 | 246 |
| | Approach: spin rate (rpm) | 7050 | 7000 |
| | (around the greens) Approach: spin rate (rpm) | 2850 | 2800 |
| | Durability | 88 | 105 |

As is clear from Tables 13 to 19, the present invention has a great fight distance on driver shots, great controllability on 40-yard to 100-yard approach shots and approach shots from around the greens, and excellent durability.

The golf ball of the preset invention travels a great flight distance, and has an excellent approach performance and durability. This application is based on Japanese Patent applications No. 2012-126602 filed on Jun. 1, 2012, the contents of which are hereby incorporated by reference.

The invention claimed is:

1. A golf ball comprising
a golf ball body having
  a spherical core composed of at least one layer,
  an intermediate layer disposed outside the spherical core,
  a cover disposed outside the intermediate layer, and
  a paint film formed on a surface of the golf ball body,
wherein
  the golf ball has a plurality of dimples on a surface thereof, the dimples satisfying a following mathematical formula (I);

$$Y \leq 3.8 \ast X - 2.894 \quad (I)$$

wherein X represents a ratio of a total area of all the dimples to a surface area of a phantom sphere of the golf ball, and Y represents a standard deviation (mm) of diameters of all the dimples,
  at least one layer of the spherical core is a rubber layer formed from a rubber composition, wherein if the JIS-C hardness values of the rubber layer are measured at nine points obtained by dividing a thickness of the rubber layer into equal parts having 12.5% intervals in a radial direction of the spherical core and including innermost and outermost portions of the rubber layer, and the hardness values are plotted against distance (%) from an innermost point of the rubber layer, then $R^2$ of a linear approximation curve obtained from a least square method is 0.95 or higher;
  the rubber layer has a hardness at an outermost point which is greater than a hardness at the innermost point; and
  the intermediate layer has a slab hardness (Hm) which is greater than a slab hardness (Hc) of the cover.

2. The golf ball according to claim 1, wherein the spherical core has a center hardness (Ho) ranging from 40 to 70 in JIS-C hardness and a surface hardness (Hs) ranging from 76 to 96 in JIS-C hardness.

3. The golf ball according to claim 1, wherein the spherical core surface hardness (Hs) is greater than the center hardness (Ho) by a difference of 15 or more in JIS-C hardness.

4. The golf ball according to claim 1, wherein the intermediate layer slab hardness (Hm) is greater than the cover slab hardness (Hc) by a difference of 30 or more in JIS-C hardness.

5. The golf ball according to claim 1, wherein the intermediate layer has a thickness ranging from 0.5 mm to 1.6 mm, and the cover has a thickness of 0.8 mm or less.

6. The golf ball according to claim 1, wherein the rubber layer is formed from a rubber composition containing
  (a) a base rubber,
  (b1) an α,β-unsaturated carboxylic acid having 3 to 8 carbon atoms and/or (b2) a metal salt of the α,β-unsaturated carboxylic acid having 3 to 8 carbon atoms as (b) a co-crosslinking agent,
  (c) a crosslinking initiator, and
  (d) an acid and/or a salt thereof excluding the (b) co-crosslinking agent α,β-unsaturated carboxylic acid having 3 to 8 carbon atoms and metal salt thereof.

7. The golf ball according to claim 6, wherein (d) the acid and/or the salt thereof is a carboxylic acid and/or a salt thereof.

8. The golf ball according to claim 7, wherein (d) the carboxylic acid and/or the salt thereof is a fatty acid and/or a salt thereof.

9. The golf ball according to claim 8, wherein (d) the carboxylic acid and/or the salt thereof has a fatty acid component having 1 to 30 carbon atoms.

10. The golf ball according to claim 6, wherein the rubber composition contains (d) the acid and/or the salt thereof in an amount of 1 part by mass or more and less than 40 parts by mass with respect to 100 parts by mass of (a) the base rubber.

11. The golf ball according to claim 1, wherein a base resin constituting the paint film is a polyurethane obtained by a reaction between a polyol and two or more polyisocyanates.

12. The golf ball according to claim 11, wherein the two or more polyisocyanates include a derivative of hexamethylene diisocyanate and a derivative of isophorone diisocyanate.

13. The golf ball according to claim 12, wherein the derivative of hexamethylene diisocyanate includes a biuret-modified product of hexamethylene diisocyanate and isocyanurate of hexamethylene diisocyanate.

14. The golf ball according to claim 12, wherein the derivative of isophorone diisocyanate includes isocyanurate of isophorone diisocyanate.

15. The golf ball according to claim 11, wherein a molar ratio (NCO/OH) of the isocyanate group (NCO) of the two or more polyisocyanates to the hydroxyl group (OH) of the polyol is 0.1 or more and 1.0 or less in the reaction between the two or more polyisocyanates and the polyol.

16. The golf ball according to claim 1, wherein the ratio X is 0.78 or more.

17. The golf ball according to claim 1, wherein the standard deviation Y (mm) of diameters of all the dimples is 0.30 mm or less.

18. The golf ball according to claim 1, wherein a total number of dimples is 300 or more and 400 or less.

19. The golf ball according to claim 1, wherein each of the dimples has a contour in a circular shape.

20. The golf ball according to claim 1, further satisfying the following mathematical formula (II):

$$Y \leq 3.8*X - 2.944 \quad \text{(II)}.$$

21. The golf ball according to claim 1, further satisfying the following mathematical formula (III):

$$Y \leq 3.8*X - 2.994 \quad \text{(III)}.$$

22. The golf ball according to claim 6, wherein (d) the acid and/or the salt thereof is a carboxylic acid having 1 to 13 carbon atoms and /or a salt thereof.

23. The gold ball according to claim 6, wherein
a base resin constituting the paint film is a polyurethane obtained by a reaction between a polyol and two or more polyisocyanates, and
a molar ratio (NCO/OH) of the isocyanate group (NCO) of the two or more polyisocyanates to the hydroxyl group (OH) of the polyol is 0.1 or more and 1.0 or less in the reaction between the two or more polyisocyanates and the polyol.

24. The gold ball according to claim 6, wherein
a base resin constituting the paint film is a polyurethane obtained by a reaction between a polyol and two or more polyisocyanates, and
the two or more polyisocyanates include a derivative of hexamethylene diisocyanate including a biuret-modified product of hexamethylene diisocyanate and isocyanurate of hexamethylene diisocyanate and a derivative of isophorone diisocyanate including isocyanurate of isophorone diisocyanate.

25. The golf ball according to claim 6, wherein
a base resin constituting the paint film is a polyurethane obtained by a reaction between a polyol and two or more polyisocyanates,
the polyol includes a urethane polyol obtained by a reaction between a polyol component and a polyisocyanate component, and
the polyol component constituting the urethane polyol includes a triol component and a diol component, and a mixing ratio (triol component / diol component) of the triol component to the diol component is 0.2 or more and 6.0 or less in a mass ratio.

* * * * *